Jan. 26, 1965 W. L. McDERMID ETAL 3,167,743

UNAMBIGUOUS IDENTIFICATION SYSTEMS

Filed Dec. 19, 1960 32 Sheets-Sheet 1

INVENTORS
WILLIAM L. McDERMID
HAROLD E. PETERSEN
GLENMORE L. SHELTON, JR.

BY Francis J. Thomas
ATTORNEY

PATTERN f(x,y)
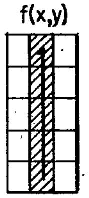
AUTO-CORRELATION FUNCTION $D_R(x',y')$
| | | | | |
|---|---|---|---|---|
| | | 5 | 0 | 0 |
| 0 | 0 | 4 | 0 | 0 |
| 0 | 0 | 3 | 0 | 0 |
| 0 | 0 | 2 | 0 | 0 |
| 0 | 0 | 1 | 0 | 0 |
NORMALIZED AUTOCORRELATION FUNCTION $Z_R(x',y')$
| | | | | |
|---|---|---|---|---|
| | | 0.5423 | 0 | 0 |
| 0 | 0 | 0.4339 | 0 | 0 |
| 0 | 0 | 0.3254 | 0 | 0 |
| 0 | 0 | 0.2169 | 0 | 0 |
| 0 | 0 | 0.1085 | 0 | 0 |
NORMALIZED "SECOND-DIFFERENCE" AUTOCORRELATION FUNCTION $Y_R(x',y')$
| | | | | | | | | |
|---|---|---|---|---|---|---|---|---|
| | | | | 1.781 | -1.018 | 0.212 | 0 | 0 |
| 0 | 0 | 0.170 | -0.679 | 0.933 | -0.679 | 0.170 | 0 | 0 |
| 0 | 0 | 0.127 | -0.509 | 0.763 | -0.509 | 0.127 | 0 | 0 |
| 0 | 0 | 0.085 | -0.339 | 0.509 | -0.339 | 0.085 | 0 | 0 |
| 0 | 0 | 0.042 | -0.170 | 0.297 | -0.170 | 0.042 | 0 | 0 |
| 0 | 0 | 0 | 0.085 | -0.254 | 0.085 | 0 | 0 | 0 |
| 0 | 0 | 0 | 0 | 0.042 | 0 | 0 | 0 | 0 |
175
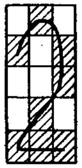
| | | | | |
|---|---|---|---|---|
| | | 8 | 2 | 2 |
| 0 | 3 | 2 | 2 | 1 |
| 1 | 2 | 1 | 2 | 0 |
| 1 | 1 | 3 | 1 | 1 |
| 0 | 1 | 1 | 1 | 0 |
| | | | | |
|---|---|---|---|---|
| | | 0.6172 | 0.1543 | 0.1543 |
| 0 | 0.2315 | 0.1543 | 0.1543 | 0.0772 |
| 0.0772 | 0.1543 | 0.0772 | 0.1543 | 0 |
| 0.0772 | 0.0772 | 0.2315 | 0.0772 | 0.0772 |
| 0 | 0.0772 | 0.0772 | 0.0772 | 0 |
| | | | | | | | | |
|---|---|---|---|---|---|---|---|---|
| | | | | 3.368 | -1.767 | 0.966 | -0.331 | 0.055 |
| 0 | 0.248 | -0.994 | 1.132 | -1.380 | 0359 | -0.028 | -0.055 | 0.028 |
| 0.028 | -0.110 | 0.193 | 0.248 | -0.773 | 0.745 | -0.635 | 0.166 | 0 |
| 0.028 | -0.138 | 0.359 | -0.718 | 1.215 | -0.801 | 0.607 | -0.193 | 0.028 |
| 0 | 0.083 | -0.331 | 0.414 | -0.414 | 0.414 | -0.359 | 0.083 | 0 |
| 0 | 0 | 0.083 | -0.138 | -0.028 | -0.138 | 0.083 | 0 | 0 |
| 0 | 0 | 0 | 0.028 | 0.028 | 0.028 | 0 | 0 | 0 |
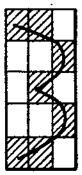
| | | | | |
|---|---|---|---|---|
| | | 7 | 2 | 0 |
| 1 | 2 | 0 | 2 | 1 |
| 0 | 1 | 3 | 1 | 0 |
| 1 | 1 | 0 | 1 | 1 |
| 0 | 1 | 2 | 1 | 0 |
| | | | | |
|---|---|---|---|---|
| | | 0.6417 | 0.1833 | 0 |
| 0.0917 | 0.1833 | 0 | 0.1833 | 0.0917 |
| 0 | 0.0917 | 0.2750 | 0.0917 | 0 |
| 0.0917 | 0.0917 | 0 | 0.0917 | 0.0917 |
| 0 | 0.0917 | 0.1833 | 0.0917 | 0 |
| | | | | | | | | |
|---|---|---|---|---|---|---|---|---|
| | | | | 3.250 | -1.000 | -0.425 | 0.150 | 0 |
| 0.025 | -0.150 | 0.300 | 0.825 | -2.450 | 0.825 | 0.300 | -0.150 | 0.025 |
| 0 | 0.125 | -0.375 | -0.500 | 1.625 | -0.500 | -0.375 | 0.125 | 0 |
| 0.025 | -0.175 | 0.425 | 0.225 | -1.150 | 0.225 | 0.425 | -0.175 | 0.025 |
| 0 | 0.075 | -0.300 | 0 | 0.775 | 0 | -0.300 | 0.075 | 0 |
| 0 | 0 | 0.075 | -0.075 | -0.300 | -0.075 | 0.075 | 0 | 0 |
| 0 | 0 | 0 | 0.025 | 0.050 | 0.025 | 0 | 0 | 0 |
FIG. 12 f(x,y)
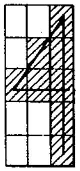
$D_R(x',y')$
| | | | | |
|---|---|---|---|---|
| | | 8 | 3 | 1 |
| 1 | 3 | 5 | 2 | 1 |
| 1 | 1 | 3 | 2 | 1 |
| 0 | 0 | 2 | 1 | 0 |
| 0 | 0 | 1 | 0 | 0 |
$Z_R(x',y')$
| | | | | |
|---|---|---|---|---|
| | | 0.5547 | 0.2080 | 0.0693 |
| 0.0693 | 0.2080 | 0.3467 | 0.1387 | 0.0693 |
| 0.0693 | 0.0693 | 0.2080 | 0.1387 | 0.0693 |
| 0 | 0 | 0.1387 | 0.0693 | 0 |
| 0 | 0 | 0.0693 | 0 | 0 |
$Y_R(x',y')$
| | | | | | | | | |
|---|---|---|---|---|---|---|---|---|
| | | | | 2.860 | -1.049 | 0 | -0.048 | 0.048 |
| 0.048 | -0.048 | -0.286 | 0.477 | -0.048 | -0.715 | 0.191 | -0.095 | 0.048 |
| 0.048 | -0.238 | 0.667 | -0.715 | 0.143 | 0.191 | 0.286 | -0.191 | 0.048 |
| 0 | 0.095 | -0.143 | -0.477 | 0.524 | 0 | -0.429 | 0.143 | 0 |
| 0 | 0 | -0.095 | -0.143 | 0.429 | -0.477 | 0.191 | 0 | 0 |
| 0 | 0 | 0 | 0.095 | -0.286 | 0.143 | 0 | 0 | 0 |
| 0 | 0 | 0 | 0 | 0.048 | 0 | 0 | 0 | 0 |
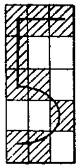
| | | | | |
|---|---|---|---|---|
| | | 9 | 4 | 1 |
| 2 | 2 | 2 | 2 | 1 |
| 1 | 3 | 4 | 2 | 1 |
| 0 | 0 | 2 | 2 | 1 |
| 1 | 2 | 2 | 1 | 0 |
| | | | | |
|---|---|---|---|---|
| | | 0.5704 | 0.2535 | 0.0634 |
| 0.1267 | 0.1267 | 0.1267 | 0.1267 | 0.0634 |
| 0.0634 | 0.1901 | 0.2535 | 0.1267 | 0.0634 |
| 0 | 0 | 0.1267 | 0.1267 | 0.0634 |
| 0.0634 | 0.1267 | 0.1267 | 0.0634 | 0 |
| | | | | | | | | |
|---|---|---|---|---|---|---|---|---|
| | | | | 3.165 | -0.259 | -0.489 | 0.058 | 0.029 |
| 0.058 | -0.288 | 0.719 | -0.403 | -1.813 | 0.115 | 0.144 | -0.058 | 0.029 |
| 0.029 | -0.029 | -0.288 | 0.691 | 0.949 | -0.345 | 0.029 | -0.058 | 0.029 |
| 0 | 0.115 | -0.058 | -1.036 | -0.144 | 0.230 | 0.144 | -0.115 | 0.029 |
| 0.029 | -0.173 | 0.201 | 0.691 | 0.259 | -0.058 | -0.259 | 0.086 | 0 |
| 0 | 0.058 | -0.115 | -0.288 | -0.230 | -0.058 | 0.086 | 0 | 0 |
| 0 | 0 | 0.029 | 0.058 | 0.058 | 0.029 | 0 | 0 | 0 |
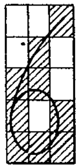
| | | | | |
|---|---|---|---|---|
| | | 9 | 3 | 2 |
| 1 | 4 | 4 | 2 | 2 |
| 1 | 3 | 2 | 3 | 1 |
| 1 | 1 | 2 | 1 | 0 |
| 1 | 1 | 1 | 0 | 0 |
| | | | | |
|---|---|---|---|---|
| | | 0.5614 | 0.1871 | 0.1248 |
| 0.0624 | 0.2495 | 0.2495 | 0.1248 | 0.1248 |
| 0.0624 | 0.1871 | 0.1248 | 0.1871 | 0.0624 |
| 0.0624 | 0.0624 | 0.1248 | 0.0624 | 0 |
| 0.0624 | 0.0624 | 0.0624 | 0 | 0 |
| | | | | | | | | |
|---|---|---|---|---|---|---|---|---|
| | | | | 3.330 | -1.498 | 0.499 | -0.233 | 0.067 |
| 0.033 | 0.067 | -0.566 | 0.832 | -0.766 | -0.633 | 0.566 | -0.266 | 0.067 |
| 0.033 | -0.033 | -0.166 | 0.633 | -0.932 | 1.132 | -0.333 | -0.033 | 0.033 |
| 0.033 | -0.100 | 0.233 | -0.699 | 0.633 | -0.300 | -0.200 | 0.100 | 0 |
| 0.033 | -0.166 | 0.266 | 0.166 | -0.100 | -0.266 | 0.133 | 0 | 0 |
| 0 | 0.067 | -0.166 | -0.100 | -0.133 | 0.100 | 0 | 0 | 0 |
| 0 | 0 | 0.033 | 0.033 | 0.033 | 0 | 0 | 0 | 0 |
FIG. 13 f(x,y)

$D_R(x',y')$

| | | | | |
|---|---|---|---|---|
| | | 7 | 2 | 1 |
| 0 | 1 | 3 | 1 | 1 |
| 0 | 2 | 2 | 1 | 0 |
| 0 | 2 | 1 | 1 | 0 |
| 0 | 1 | 1 | 1 | 0 |

| | | | | |
|---|---|---|---|---|
| | | 11 | 4 | 4 |
| 2 | 4 | 4 | 4 | 2 |
| 1 | 2 | 4 | 2 | 1 |
| 2 | 2 | 4 | 2 | 2 |
| 1 | 2 | 3 | 2 | 1 |

| | | | | |
|---|---|---|---|---|
| | | 9 | 3 | 2 |
| 1 | 4 | 4 | 2 | 2 |
| 1 | 3 | 2 | 3 | 1 |
| 1 | 1 | 2 | 1 | 0 |
| 1 | 1 | 1 | 0 | 0 |

| | | | | |
|---|---|---|---|---|
| | | 8 | 0 | 3 |
| 2 | 2 | 4 | 2 | 2 |
| 1 | 2 | 2 | 2 | 1 |
| 0 | 2 | 0 | 2 | 0 |
| 0 | 0 | 1 | 0 | 0 |

$Z_R(x',y')$

| | | | | |
|---|---|---|---|---|
| | | 0.6417 | 0.1833 | 0.0917 |
| 0 | 0.0917 | 0.2750 | 0.0917 | 0.0917 |
| 0 | 0.1833 | 0.1833 | 0.0917 | 0 |
| 0 | 0.1833 | 0.0917 | 0.0917 | 0 |
| 0 | 0.0917 | 0.0917 | 0.0917 | 0 |

| | | | | |
|---|---|---|---|---|
| | | 0.5180 | 0.1884 | 0.1884 |
| 0.0942 | 0.1884 | 0.1884 | 0.1884 | 0.0942 |
| 0.0471 | 0.0942 | 0.1884 | 0.0942 | 0.0471 |
| 0.0942 | 0.0942 | 0.1884 | 0.0942 | 0.0942 |
| 0.0471 | 0.0942 | 0.1413 | 0.0942 | 0.0471 |

| | | | | |
|---|---|---|---|---|
| | | 0.5614 | 0.1871 | 0.1248 |
| 0.0624 | 0.2495 | 0.2495 | 0.1248 | 0.1248 |
| 0.0624 | 0.1871 | 0.1248 | 0.1871 | 0.0624 |
| 0.0624 | 0.0624 | 0.1248 | 0.0624 | 0 |
| 0.0624 | 0.0624 | 0.0624 | 0 | 0 |

| | | | | |
|---|---|---|---|---|
| | | 0.5774 | 0 | 0.2165 |
| 0.1443 | 0.1443 | 0.2887 | 0.1443 | 0.1443 |
| 0.0722 | 0.1443 | 0.1443 | 0.1443 | 0.0722 |
| 0 | 0.1443 | 0 | 0.1443 | 0 |
| 0 | 0 | 0.0722 | 0 | 0 |

$Y_R(x',y')$

| | | | | | | | | |
|---|---|---|---|---|---|---|---|---|
| | | | | 3.303 | -0.937 | 0.312 | -0.179 | 0.045 |
| 0 | 0.134 | -0.179 | -0.536 | -0.402 | -0.580 | 0.580 | -0.223 | 0.045 |
| 0 | 0.089 | -0.312 | 0.536 | 0.089 | 0.134 | -0.402 | 0.134 | 0 |
| 0 | 0.089 | -0.402 | 0.714 | -0.669 | 0.223 | -0.089 | 0.045 | 0 |
| 0 | 0.045 | -0.134 | 0.045 | 0.179 | 0.357 | -0.223 | 0.045 | 0 |
| 0 | 0 | 0.089 | -0.179 | -0.134 | -0.223 | 0.089 | 0 | 0 |
| 0 | 0 | 0 | 0.045 | 0.045 | 0.045 | 0 | 0 | 0 |

| | | | | | | | | |
|---|---|---|---|---|---|---|---|---|
| | | | | 3.558 | -1.830 | 1.144 | -0.508 | 0.102 |
| 0.051 | -0.051 | -0.305 | 0.864 | -1.728 | 0.864 | -0.305 | -0.051 | 0.051 |
| 0.025 | 0.051 | -0.178 | -0.407 | 0.610 | -0.407 | -0.178 | 0.051 | 0.025 |
| 0.051 | -0.254 | 0.559 | -0.407 | 0.407 | -0.407 | 0.559 | -0.254 | 0.051 |
| 0.025 | -0.051 | -0.102 | 0.203 | 0.254 | 0.203 | -0.102 | -0.051 | 0.025 |
| 0 | 0.051 | -0.051 | -0.152 | -0.305 | -0.152 | -0.051 | 0.051 | 0 |
| 0 | 0 | 0.025 | 0.051 | 0.076 | 0.051 | 0.025 | 0 | 0 |

| | | | | | | | | |
|---|---|---|---|---|---|---|---|---|
| | | | | 3.330 | -1.498 | -0.499 | -0.233 | 0.067 |
| 0.033 | 0.067 | -0.566 | 0.832 | -0.766 | -0.633 | 0.566 | -0.266 | 0.067 |
| 0.033 | -0.033 | -0.166 | 0.633 | -0.932 | 1.132 | -0.333 | -0.033 | 0.033 |
| 0.033 | -0.100 | 0.233 | -0.699 | 0.633 | -0.300 | -0.200 | 0.100 | 0 |
| 0.033 | -0.166 | 0.266 | 0.166 | -0.100 | -0.266 | 0.133 | 0 | 0 |
| 0 | 0.067 | -0.166 | -0.100 | -0.133 | 0.100 | 0 | 0 | 0 |
| 0 | 0 | 0.033 | 0.033 | 0.033 | 0 | 0 | 0 | 0 |

| | | | | | | | | |
|---|---|---|---|---|---|---|---|---|
| | | | | 3081 | -2.323 | 1.162 | -0.404 | 0.076 |
| 0.051 | -0.152 | 0.051 | 0.253 | -0.404 | 0.253 | 0.051 | -0.152 | 0.051 |
| 0.025 | -0.051 | 0.025 | -0.051 | 0.076 | -0.051 | 0.025 | -0.051 | 0.025 |
| 0 | 0.101 | -0.455 | 0.909 | -1.111 | 0.909 | -0.455 | 0.101 | 0 |
| 0 | 0 | 0.152 | -0.556 | 0.758 | -0.556 | 0.152 | 0 | 0 |
| 0 | 0 | 0 | 0.101 | -0.202 | 0.101 | 0 | 0 | 0 |
| 0 | 0 | 0 | 0 | 0.025 | 0 | 0 | 0 | 0 |

FIG. 15a

NORMALIZED COMPARISON

| INPUT PATTERN \ REFERENCE PATTERN | 1 | 2 | 3 | 4 | 5 | 6 | 7 | 8 | 9 | 0 |
|---|---|---|---|---|---|---|---|---|---|---|
| 1 | 9.22 | 5.86 | 5.23 | 7.49 | 6.15 | 6.18 | 7.06 | 6.26 | 6.95 | 6.21 |
| 2 | 8.24 | 12.96 | 10.63 | 11.37 | 11.41 | 12.23 | 11.55 | 12.24 | 10.88 | 10.68 |
| 3 | 6.18 | 8.95 | 10.91 | 8.46 | 9.82 | 8.80 | 9.08 | 9.46 | 8.46 | 8.08 |
| 4 | 11.71 | 12.65 | 11.18 | 14.42 | 12.80 | 13.60 | 12.83 | 12.90 | 13.60 | 12.41 |
| 5 | 10.52 | 13.89 | 14.21 | 14.01 | 15.78 | 14.28 | 14.03 | 14.55 | 14.11 | 12.56 |
| 6 | 10.74 | 15.12 | 12.93 | 15.12 | 14.51 | 16.03 | 14.58 | 14.83 | 14.51 | 14.29 |
| 7 | 8.35 | 9.72 | 9.08 | 9.71 | 9.70 | 9.92 | 10.91 | 9.75 | 9.47 | 9.53 |
| 8 | 14.43 | 20.06 | 18.43 | 19.00 | 19.58 | 19.65 | 18.98 | 21.24 | 19.24 | 18.04 |
| 9 | 14.97 | 16.66 | 15.40 | 18.72 | 17.74 | 17.96 | 17.23 | 17.99 | 19.85 | 17.32 |
| 0 | 9.33 | 11.42 | 10.27 | 11.93 | 11.03 | 12.35 | 12.10 | 11.77 | 12.09 | 13.86 |

FIG. 15b

NORMALIZED "SECOND-DIFFERENCE" COMPARISON

| INPUT PATTERN \ REFERENCE PATTERN | 1 | 2 | 3 | 4 | 5 | 6 | 7 | 8 | 9 | 0 |
|---|---|---|---|---|---|---|---|---|---|---|
| 1 | 23.58 | 5.19 | 3.35 | 17.73 | 6.96 | 7.66 | 11.52 | 9.76 | 17.88 | 9.70 |
| 2 | 7.97 | 36.22 | 15.10 | 19.07 | 15.59 | 29.90 | 18.21 | 28.82 | 12.86 | 15.25 |
| 3 | 5.68 | 16.68 | 40.00 | 12.87 | 28.94 | 14.32 | 20.00 | 27.75 | 14.13 | 17.37 |
| 4 | 15.78 | 11.04 | 6.75 | 20.98 | 10.01 | 14.78 | 11.52 | 11.74 | 14.53 | 10.86 |
| 5 | 10.26 | 14.96 | 25.15 | 16.59 | 34.76 | 17.45 | 19.64 | 21.10 | 20.76 | 10.66 |
| 6 | 9.75 | 24.79 | 10.75 | 21.17 | 15.08 | 30.03 | 19.01 | 19.01 | 14.60 | 17.32 |
| 7 | 10.94 | 4.26 | 11.20 | 12.30 | 12.66 | 14.18 | 22.41 | 12.05 | 13.43 | 15.81 |
| 8 | 16.29 | 31.31 | 27.30 | 22.03 | 23.88 | 24.91 | 21.16 | 39.34 | 22.43 | 21.57 |
| 9 | 22.65 | 10.60 | 10.55 | 20.69 | 17.84 | 14.52 | 18.57 | 17.03 | 29.87 | 14.09 |
| 0 | 16.29 | 16.68 | 17.20 | 20.50 | 12.14 | 22.84 | 27.94 | 20.71 | 18.68 | 39.60 |

FLIP-FLIP

"AND" GATES

"OR" GATES

INVERTER

AMPLIFIER

LIMITER

DELAY CIRCUIT

SINGLE-SHOT MULTIVIBRATOR

RING COUNTER

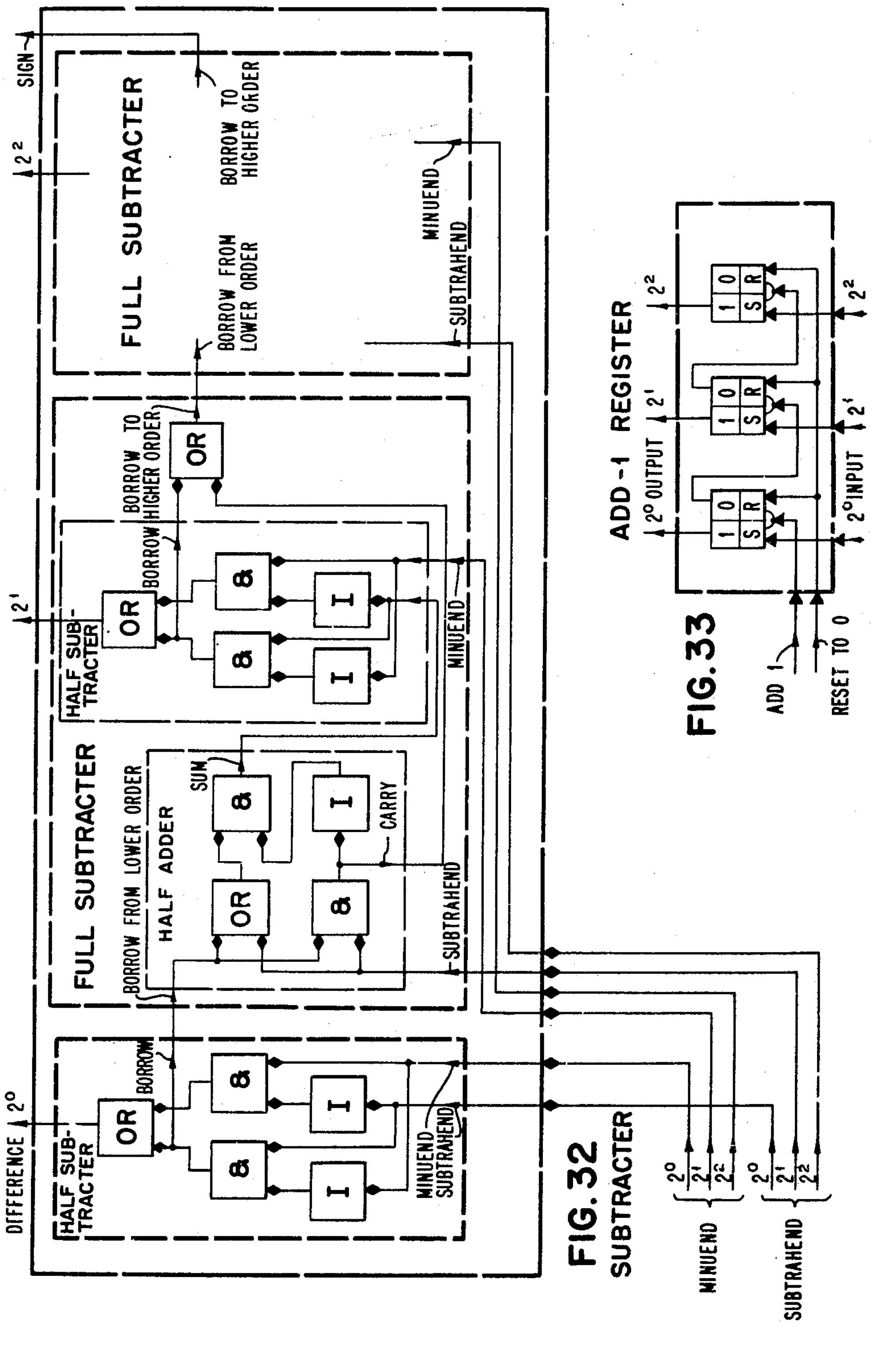
FIG. 32 SUBTRACTER, FIG. 33

Jan. 26, 1965 W. L. McDERMID ETAL 3,167,743

UNAMBIGUOUS IDENTIFICATION SYSTEMS

Filed Dec. 19, 1960 32 Sheets-Sheet 18

Jan. 26, 1965 W. L. McDERMID ETAL 3,167,743

UNAMBIGUOUS IDENTIFICATION SYSTEMS

Filed Dec. 19, 1960 32 Sheets-Sheet 23

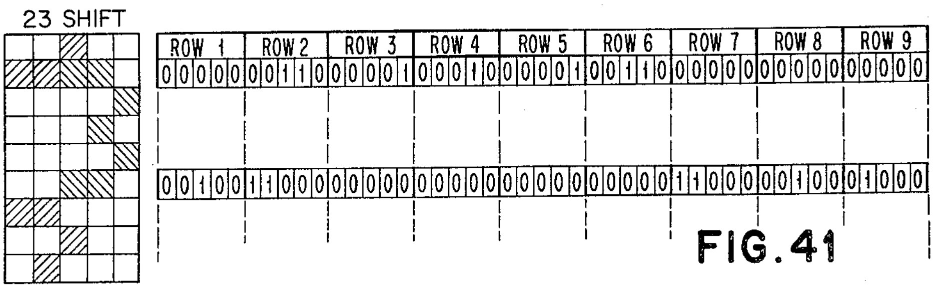
FIG. 41
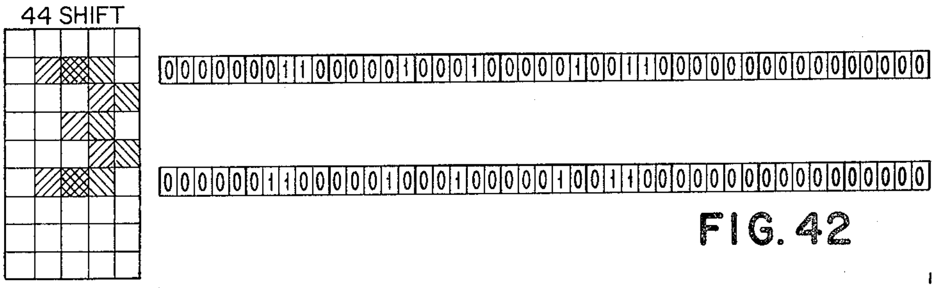
FIG. 42
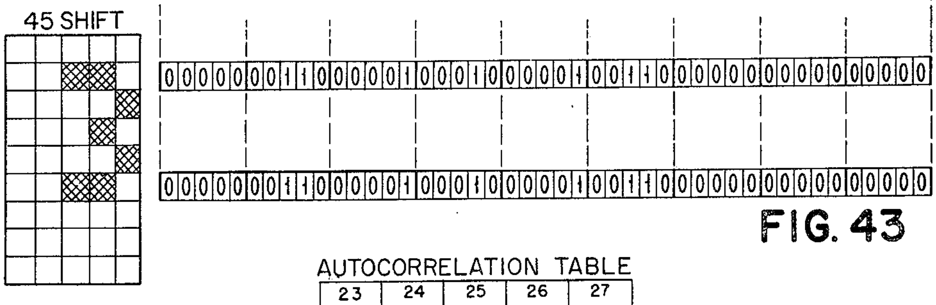
FIG. 43
AUTOCORRELATION TABLE
| | | | | |
|---|---|---|---|---|
| 23<br>0 | 24<br>1 | 25<br>2 | 26<br>1 | 27<br>0 |
| 28<br>1 | 29<br>1 | 30<br>0 | 31<br>1 | 32<br>1 |
| 33<br>0 | 34<br>1 | 35<br>3 | 36<br>1 | 37<br>0 |
| 38<br>1 | 39<br>2 | 40<br>0 | 41<br>2 | 42<br>1 |
| 43<br>0 | 44<br>2 | 0<br>7 | 1<br>2 | 2<br>0 |
| 3<br>1 | 4<br>2 | 5<br>0 | 6<br>2 | 7<br>1 |
| 8<br>0 | 9<br>1 | 10<br>3 | 11<br>1 | 12<br>0 |
| 13<br>1 | 14<br>1 | 15<br>0 | 16<br>1 | 17<br>1 |
| 18<br>0 | 19<br>1 | 20<br>2 | 21<br>1 | 22<br>0 |
FIG. 44

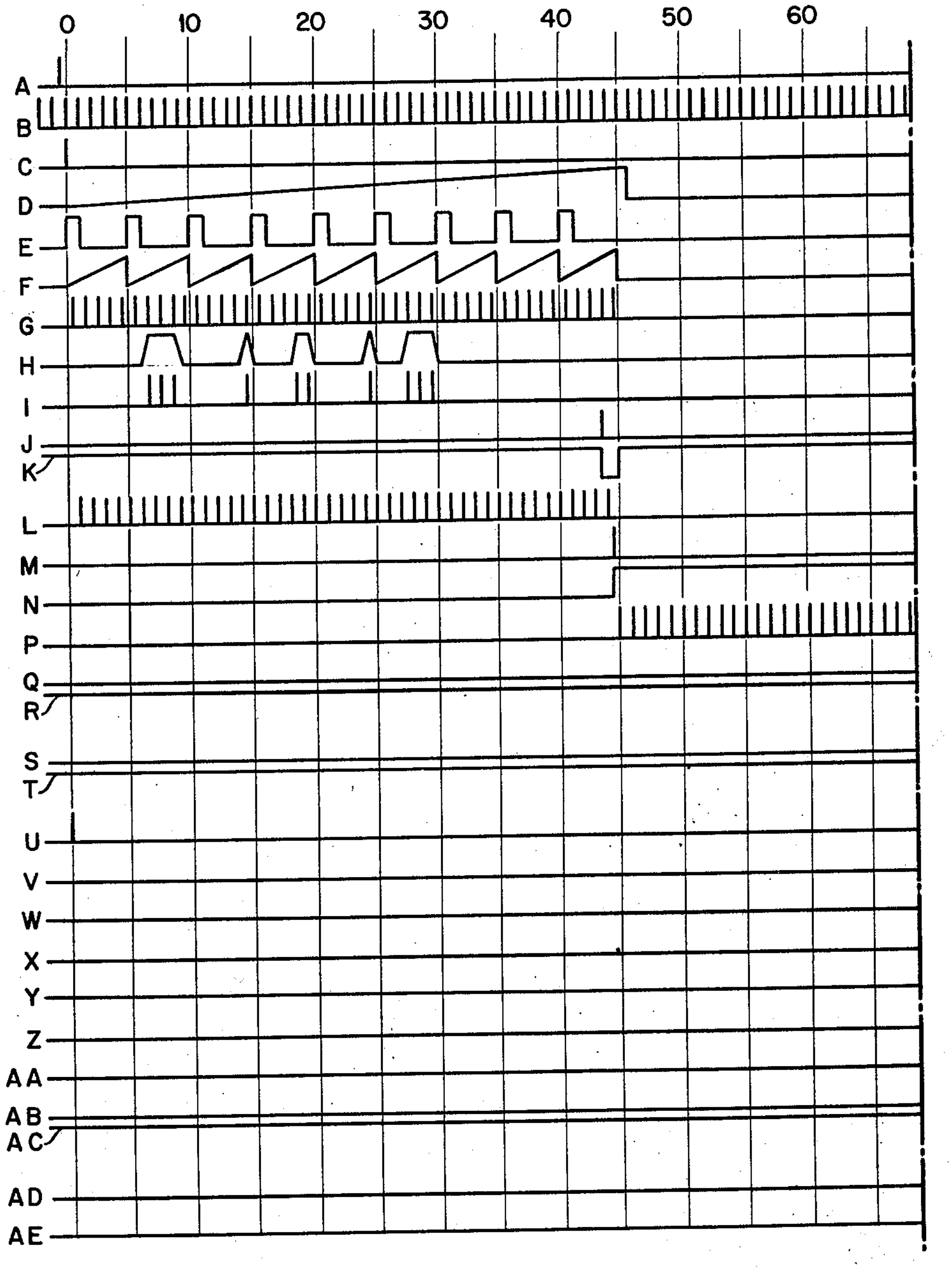
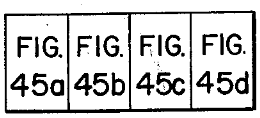
FIG. 45
FIG. 45a

Jan. 26, 1965 W. L. McDERMID ETAL 3,167,743

UNAMBIGUOUS IDENTIFICATION SYSTEMS

Filed Dec. 19, 1960 32 Sheets-Sheet 26

Jan. 26, 1965 W. L. McDERMID ETAL 3,167,743

UNAMBIGUOUS IDENTIFICATION SYSTEMS

Filed Dec. 19, 1960 32 Sheets-Sheet 27

Jan. 26, 1965 W. L. McDERMID ETAL 3,167,743

UNAMBIGUOUS IDENTIFICATION SYSTEMS

Filed Dec. 19, 1960 32 Sheets-Sheet 28

$D_S(t')=\sum_t f(t)\cdot f(t+t')$

| t \ t' | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| $t_i$=10 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 12 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 13 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 14 | 2 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 15 | 2 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 16 | 2 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 17 | 2 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 18 | 3 | 0 | 0 | 0 | 2 | 0 | 0 | 0 | 1 | 0 | 0 | 0 | 0 | 0 | 0 | 0 | 0 | 0 | 0 | 0 | 0 | 0 | 0 |
| 19 | 4 | 1 | 0 | 0 | 2 | 1 | 0 | 0 | 1 | 1 | 0 | 0 | 0 | 0 | 0 | 0 | 0 | 0 | 0 | 0 | 0 | 0 | 0 |
| 20 | 4 | 1 | 0 | 0 | 2 | 1 | 0 | 0 | 1 | 1 | 0 | 0 | 0 | 0 | 0 | 0 | 0 | 0 | 0 | 0 | 0 | 0 | 0 |
| $t_i$+11=21 | 4 | 1 | 0 | 0 | 2 | 1 | 0 | 0 | 1 | 1 | 0 | 0 | 0 | 0 | 0 | 0 | 0 | 0 | 0 | 0 | 0 | 0 | 0 |
| 22 | 4 | 1 | 0 | 0 | 2 | 1 | 0 | 0 | 1 | 1 | 0 | 0 | 0 | 0 | 0 | 0 | 0 | 0 | 0 | 0 | 0 | 0 | 0 |
| 23 | 5 | 1 | 0 | 0 | 3 | 2 | 0 | 0 | 1 | 2 | 0 | 0 | 0 | 1 | 0 | 0 | 0 | 0 | 0 | 0 | 0 | 0 | 0 |
| 24 | 5 | 1 | 0 | 0 | 3 | 2 | 0 | 0 | 1 | 2 | 0 | 0 | 0 | 1 | 0 | 0 | 0 | 0 | 0 | 0 | 0 | 0 | 0 |
| 25 | 6 | 1 | 1 | 0 | 3 | 2 | 1 | 1 | 1 | 2 | 0 | 1 | 0 | 1 | 0 | 1 | 0 | 0 | 0 | 0 | 0 | 0 | 0 |
| 26 | 6 | 1 | 1 | 0 | 3 | 2 | 1 | 1 | 1 | 2 | 0 | 1 | 0 | 1 | 0 | 1 | 0 | 0 | 0 | 0 | 0 | 0 | 0 |
| 27 | 6 | 1 | 1 | 0 | 3 | 2 | 1 | 1 | 1 | 2 | 0 | 1 | 0 | 1 | 0 | 1 | 0 | 0 | 0 | 0 | 0 | 0 | 0 |
| 28 | 7 | 1 | 1 | 1 | 3 | 3 | 1 | 1 | 1 | 3 | 1 | 1 | 0 | 1 | 1 | 1 | 0 | 0 | 1 | 0 | 0 | 0 | 0 |
| 29 | 8 | 2 | 1 | 1 | 4 | 3 | 2 | 1 | 1 | 3 | 2 | 2 | 0 | 1 | 1 | 2 | 0 | 0 | 1 | 1 | 0 | 0 | 0 |
| 30 | 9 | 3 | 2 | 1 | 4 | 4 | 2 | 2 | 1 | 3 | 2 | 3 | 1 | 1 | 1 | 2 | 1 | 0 | 1 | 1 | 1 | 0 | 0 |
| 31 | 9 | 3 | 2 | 1 | 4 | 4 | 2 | 2 | 1 | 3 | 2 | 3 | 1 | 1 | 1 | 2 | 1 | 0 | 1 | 1 | 1 | 0 | 0 |
| 32 | 9 | 3 | 2 | 1 | 4 | 4 | 2 | 2 | 1 | 3 | 2 | 3 | 1 | 1 | 1 | 2 | 1 | 0 | 1 | 1 | 1 | 0 | 0 |
| 33 | 9 | 3 | 2 | 1 | 4 | 4 | 2 | 2 | 1 | 3 | 2 | 3 | 1 | 1 | 1 | 2 | 1 | 0 | 1 | 1 | 1 | 0 | 0 |
| 34 | 9 | 3 | 2 | 1 | 4 | 4 | 2 | 2 | 1 | 3 | 2 | 3 | 1 | 1 | 1 | 2 | 1 | 0 | 1 | 1 | 1 | 0 | 0 |
| 35 | 9 | 3 | 2 | 1 | 4 | 4 | 2 | 2 | 1 | 3 | 2 | 3 | 1 | 1 | 1 | 2 | 1 | 0 | 1 | 1 | 1 | 0 | 0 |
| 36 | 9 | 3 | 2 | 1 | 4 | 4 | 2 | 2 | 1 | 3 | 2 | 3 | 1 | 1 | 1 | 2 | 1 | 0 | 1 | 1 | 1 | 0 | 0 |
| 37 | 9 | 3 | 2 | 1 | 4 | 4 | 2 | 2 | 1 | 3 | 2 | 3 | 1 | 1 | 1 | 2 | 1 | 0 | 1 | 1 | 1 | 0 | 0 |
| 38 | 9 | 3 | 2 | 1 | 4 | 4 | 2 | 2 | 1 | 3 | 2 | 3 | 1 | 1 | 1 | 2 | 1 | 0 | 1 | 1 | 1 | 0 | 0 |
| 39 | 9 | 3 | 2 | 1 | 4 | 4 | 2 | 2 | 1 | 3 | 2 | 3 | 1 | 1 | 1 | 2 | 1 | 0 | 1 | 1 | 1 | 0 | 0 |
| 40 | 9 | 3 | 2 | 1 | 4 | 4 | 2 | 2 | 1 | 3 | 2 | 3 | 1 | 1 | 1 | 2 | 1 | 0 | 1 | 1 | 1 | 0 | 0 |
| 41 | 9 | 3 | 2 | 1 | 4 | 4 | 2 | 2 | 1 | 3 | 2 | 3 | 1 | 1 | 1 | 2 | 1 | 0 | 1 | 1 | 1 | 0 | 0 |
| 42 | 9 | 3 | 2 | 1 | 4 | 4 | 2 | 2 | 1 | 3 | 2 | 3 | 1 | 1 | 1 | 2 | 1 | 0 | 1 | 1 | 1 | 0 | 0 |
| 43 | 9 | 3 | 2 | 1 | 4 | 4 | 2 | 2 | 1 | 3 | 2 | 3 | 1 | 1 | 1 | 2 | 1 | 0 | 1 | 1 | 1 | 0 | 0 |
| 44 | 9 | 3 | 2 | 1 | 4 | 4 | 2 | 2 | 1 | 3 | 2 | 3 | 1 | 1 | 1 | 2 | 1 | 0 | 1 | 1 | 1 | 0 | 0 |
| 45 | 9 | 3 | 2 | 1 | 4 | 4 | 2 | 2 | 1 | 3 | 2 | 3 | 1 | 1 | 1 | 2 | 1 | 0 | 1 | 1 | 1 | 0 | 0 |

$D_S(t')=\sum_t f(t)\cdot f(t+t')$

| t \ t' | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 17 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 19 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 21 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| $t_i$=22 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 23 | 2 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| 24 | 3 | 2 | 1 | 0 | 0 | 0 | 0 | 0 | 0 | 0 | 0 | 0 | 0 | 0 | 0 | 0 | 0 | 0 | 0 | 0 | 0 | 0 | 0 |
| 25 | 3 | 2 | 1 | 0 | 0 | 0 | 0 | 0 | 0 | 0 | 0 | 0 | 0 | 0 | 0 | 0 | 0 | 0 | 0 | 0 | 0 | 0 | 0 |
| 26 | 3 | 2 | 1 | 0 | 0 | 0 | 0 | 0 | 0 | 0 | 0 | 0 | 0 | 0 | 0 | 0 | 0 | 0 | 0 | 0 | 0 | 0 | 0 |
| 27 | 4 | 2 | 1 | 1 | 1 | 1 | 0 | 0 | 0 | 0 | 0 | 0 | 0 | 0 | 0 | 0 | 0 | 0 | 0 | 0 | 0 | 0 | 0 |
| 28 | 4 | 2 | 1 | 1 | 1 | 1 | 0 | 0 | 0 | 0 | 0 | 0 | 0 | 0 | 0 | 0 | 0 | 0 | 0 | 0 | 0 | 0 | 0 |
| 29 | 5 | 2 | 2 | 1 | 1 | 2 | 1 | 1 | 0 | 0 | 0 | 0 | 0 | 0 | 0 | 0 | 0 | 0 | 0 | 0 | 0 | 0 | 0 |
| 30 | 5 | 2 | 2 | 1 | 1 | 2 | 1 | 1 | 0 | 0 | 0 | 0 | 0 | 0 | 0 | 0 | 0 | 0 | 0 | 0 | 0 | 0 | 0 |
| 31 | 5 | 2 | 2 | 1 | 1 | 2 | 1 | 1 | 0 | 0 | 0 | 0 | 0 | 0 | 0 | 0 | 0 | 0 | 0 | 0 | 0 | 0 | 0 |
| 32 | 5 | 2 | 2 | 1 | 1 | 2 | 1 | 1 | 0 | 0 | 0 | 0 | 0 | 0 | 0 | 0 | 0 | 0 | 0 | 0 | 0 | 0 | 0 |
| $t_{i+11}$=33 | 6 | 2 | 2 | 1 | 2 | 2 | 2 | 1 | 0 | 1 | 1 | 1 | 0 | 0 | 0 | 0 | 0 | 0 | 0 | 0 | 0 | 0 | 0 |
| 34 | 7 | 3 | 2 | 1 | 2 | 3 | 2 | 2 | 0 | 1 | 2 | 2 | 1 | 0 | 0 | 0 | 0 | 0 | 0 | 0 | 0 | 0 | 0 |
| 35 | 7 | 3 | 2 | 1 | 2 | 3 | 2 | 2 | 0 | 1 | 2 | 2 | 1 | 0 | 0 | 0 | 0 | 0 | 0 | 0 | 0 | 0 | 0 |
| 36 | 7 | 3 | 2 | 1 | 2 | 3 | 2 | 2 | 0 | 1 | 2 | 2 | 1 | 0 | 0 | 0 | 0 | 0 | 0 | 0 | 0 | 0 | 0 |
| 37 | 7 | 3 | 2 | 1 | 2 | 3 | 2 | 2 | 0 | 1 | 2 | 2 | 1 | 0 | 0 | 0 | 0 | 0 | 0 | 0 | 0 | 0 | 0 |
| 38 | 8 | 3 | 2 | 1 | 3 | 4 | 2 | 2 | 0 | 2 | 2 | 3 | 1 | 0 | 1 | 1 | 1 | 0 | 0 | 0 | 0 | 0 | 0 |
| 39 | 8 | 3 | 2 | 1 | 3 | 4 | 2 | 2 | 0 | 2 | 2 | 3 | 1 | 0 | 1 | 1 | 1 | 0 | 0 | 0 | 0 | 0 | 0 |
| 40 | 8 | 3 | 2 | 1 | 3 | 4 | 2 | 2 | 0 | 2 | 2 | 3 | 1 | 0 | 1 | 1 | 1 | 0 | 0 | 0 | 0 | 0 | 0 |
| 41 | 8 | 3 | 2 | 1 | 3 | 4 | 2 | 2 | 0 | 2 | 2 | 3 | 1 | 0 | 1 | 1 | 1 | 0 | 0 | 0 | 0 | 0 | 0 |
| 42 | 9 | 3 | 2 | 1 | 4 | 4 | 2 | 2 | 1 | 3 | 2 | 3 | 1 | 1 | 1 | 2 | 1 | 0 | 1 | 1 | 1 | 0 | 0 |
| 43 | 9 | 3 | 2 | 1 | 4 | 4 | 2 | 2 | 1 | 3 | 2 | 3 | 1 | 1 | 1 | 2 | 1 | 0 | 1 | 1 | 1 | 0 | 0 |
| 44 | 9 | 3 | 2 | 1 | 4 | 4 | 2 | 2 | 1 | 3 | 2 | 3 | 1 | 1 | 1 | 2 | 1 | 0 | 1 | 1 | 1 | 0 | 0 |
| 45 | 9 | 3 | 2 | 1 | 4 | 4 | 2 | 2 | 1 | 3 | 2 | 3 | 1 | 1 | 1 | 2 | 1 | 0 | 1 | 1 | 1 | 0 | 0 |

United States Patent Office 3,167,743
Patented Jan. 26, 1965

3,167,743

UNAMBIGUOUS IDENTIFICATION SYSTEMS

William L. McDermid, Peekskill, Harold E. Petersen, Chappaqua, and Glenmore L. Shelton, Jr., Carmel, N.Y., assignors to International Business Machines Corporation, New York, N.Y., a corporation of New York Filed Dec. 19, 1960, Ser. No. 76,909
18 Claims. (Cl. 340—146.3)

This invention relates to methods and apparatus for overcoming ambiguity in function generating systems that otherwise provide the same output signals for several inputs. The principle of this invention is particularly shown with respect to a specimen identification system.

Many techniques for analyzing data are enhanced by the analysis of functions of the data, rather than analyzing the data directly. Some of these functions are ambiguous for classes of data. As an example, derivatives of functions that differ only by a constant are identical. This invention teaches techniques that retain the advantages of utilizing these enhancing functions while overcoming their inherent ambiguity.

Identification of specimens (such as printed characters) is enhanced by comparing certain functions of the specimens to similar functions of reference patterns, rather than comparing the specimen to reference patterns directly. The autocorrelation function is an example of a function which may be used in this manner to enhance specimen identification since the function is registration invariant. That is, horizontally or vertically misregistered specimens may be readily identified by comparing the autocorrelation pattern of the specimen with autocorrelation patterns of reference patterns. Specimen identification systems using autocorrelation comparison are also highly stable in the presence of noise.

These are situations where functions of different specimens are identical and hence ambiguous. Autocorrelation patterns of certain different specimens, may for example, be identical. This occurs when one specimen can be converted into a second specimen by a 180° rotation. In some type fonts this is true of "6" and "9," "M" and "*W*," "*b*" and "*q*," "*d*" and "*p*," etc. In these cases, an ambiguous autocorrelation function is generated by each of the pair of specimens and identification is hampered.

This problem of ambiguity may be overcome by generating an unambiguous control function from an unambiguous characteristic of the specimen or from an unambiguous function of the specimen and utilizing the control function as well as the ambiguous autocorrelation function to identify the specimen.

Accordingly, an object of this invention is to provide methods and apparatus for generating unambiguous outputs in systems that otherwise generate ambiguous outputs by utilizing unambiguous characteristics or functions of the inputs as well as the ambiguous functions.

A more particular object is to provide specimen identification methods and apparatus which utilize comparison of ambiguous and unambiguous functions of the specimens with ambiguous and unambiguous functions of reference patterns.

A further object is to provide methods and apparatus for overcoming the ambiguity in specimen identification systems utilizing autocorrelation pattern comparison.

A further object is to provide methods and apparatus for avoiding ambiguity in any function generating system where the completely generated functions are ambiguous but where the component elements of the functions differ in some respect.

In accordance with the embodiments of the invention, an autocorrelation function of the specimen is generated and compared with autocorrelation functions of reference patterns. The autocorrelation function is a measure of the correlation of a function with itself and is thus inherently registration invariant. If the specimen to be identified is considered to be a matrix of discrete areas having coordinates $(x,y)$ that are predominately black or predominantly white, depending upon the positions of the lines that the specimen comprises, there is a function $f(x,y)$ that is "1" for each instance where the area about the coordinates $(x,y)$ is black and "0" where white. The autocorrelation function defines the number of pairs of black areas separated by a given distance in a given direction, over all distances and directions. If $(x,y)$ is a point on the pattern, and $(x+x',y+y')$ is another point on the pattern separated from the point $(x,y)$ by $(x',y')$ then the product $(x,y)(x+x',y+y')=1$ only where both points are black. Since this procedure is performed on every pair of points in the pattern, the autocorrelation function $D(x',y')$ is defined as:

$$D(x',y')=\sum_{x,y} f(x,y)f(x+x',y+y')$$

The autocorrelation function $D_S(x',y')$ of the specimen "S" is then compared, point-by-point, to the normalized autocorrelation functions $Z_R(x',y')$ of all reference patterns R, where $Z_{Rn}(x',y')$ of reference pattern "R*n*" is defined as:

$$Z_{Rn}(x',y')=\frac{D_{Rn}(x',y')}{\left[\sum_{x',y'} D_{Rn}^2(x',y')\right]^{1/2}}$$

The comparison $$S_{S'Rn}(x',y')=\sum_{x',y'} D_S(x',y')\cdot Z_{Rn}(x',y')$$

The reference pattern "*n*" that produces the largest comparison sum determines the identification of the specimen. The reference pattern autocorrelation function must be normalized to guarantee that the largest sum will be caused by the reference pattern that is similar to the specimen. Normalization is accomplished by dividing each autocorrelation function $D_{Rn}(x',y')$ by the square root of the sum of the squares of the elements of the function, which is expressed as:

$$\left[\sum_{x',y'} D_{Rn}^2(x',y')\right]^{1/2}$$

A Schwartz inequality, as found on page 417 of a text authored by Wilfred Kaplan, entitled Advanced Calculus, 1952, published by the Addison-Wesley Publishing Co., may be used to show that, $$\frac{\sum_{x',y'} D_S(x',y')D_{Rn}(x',y'}{\left[\sum_{x',y'} D_{Rn}^2(x',y')\right]^{1/2}}$$

is a maximum when $D_S(x',y')=D_{Rn}(x',y')$

Some functions of the autocorrelation function have been found to provide better specimen identification than is achieved by using the autocorrelation function itself, either by improving the distinction between patterns having certain similarities, or by "smoothing" small differences between essentially similar patterns, such as "1" with and without a serif. One of the "discriminating" functions which improves distinction, the normalized "second-difference" function of the autocorrelation function is explained in detail below. Specimen identification using the autocorrelation function and the "second-difference" function of the autocorrelation function of the reference patterns are shown with respect to an electronic embodiment and the advantage of the latter is shown. The "second-difference" function is only one of many "discriminating" functions of the autocorrelation function that provide improved specimen identification.

One of the "smoothing" functions which over-rides small differences, the normalized "averaging" functions of the autocorrelation function is also explained in detail. Since the autocorrelation function and functions of the autocorrelation function are ambiguous for certain specimens, an unambiguous control function is used to distinguish these specimens.

Specimen identification systems utilizing autocorrelation function comparison are described as typical embodiments of the invention. These embodiments are merely illustrative examples of the large number of uses to which the invention applies. The invention may be practiced to avoid ambiguity in any system which otherwise provides ambiguous output functions of unambiguous input functions.

The foregoing and other objects, features and advantages of the invention will be apparent from the following more particular description of preferred embodiments of the invention, as illustrated in the accompanying drawings.

FIGURES 12–14 are diagrams showing a group of autocorrelation functions, normalized autocorrelation functions and normalized "second-difference" autocorrelation functions for ten Arabic numerals.

FIGURE 15*a* is a chart showing the stability of identification of ten Arabic numerals using autocorrelation function comparison.

FIGURE 15*b* is a chart showing the stability of identification of ten Arabic numerals using "second-difference" autocorrelation function comparison.

Figure 16A:
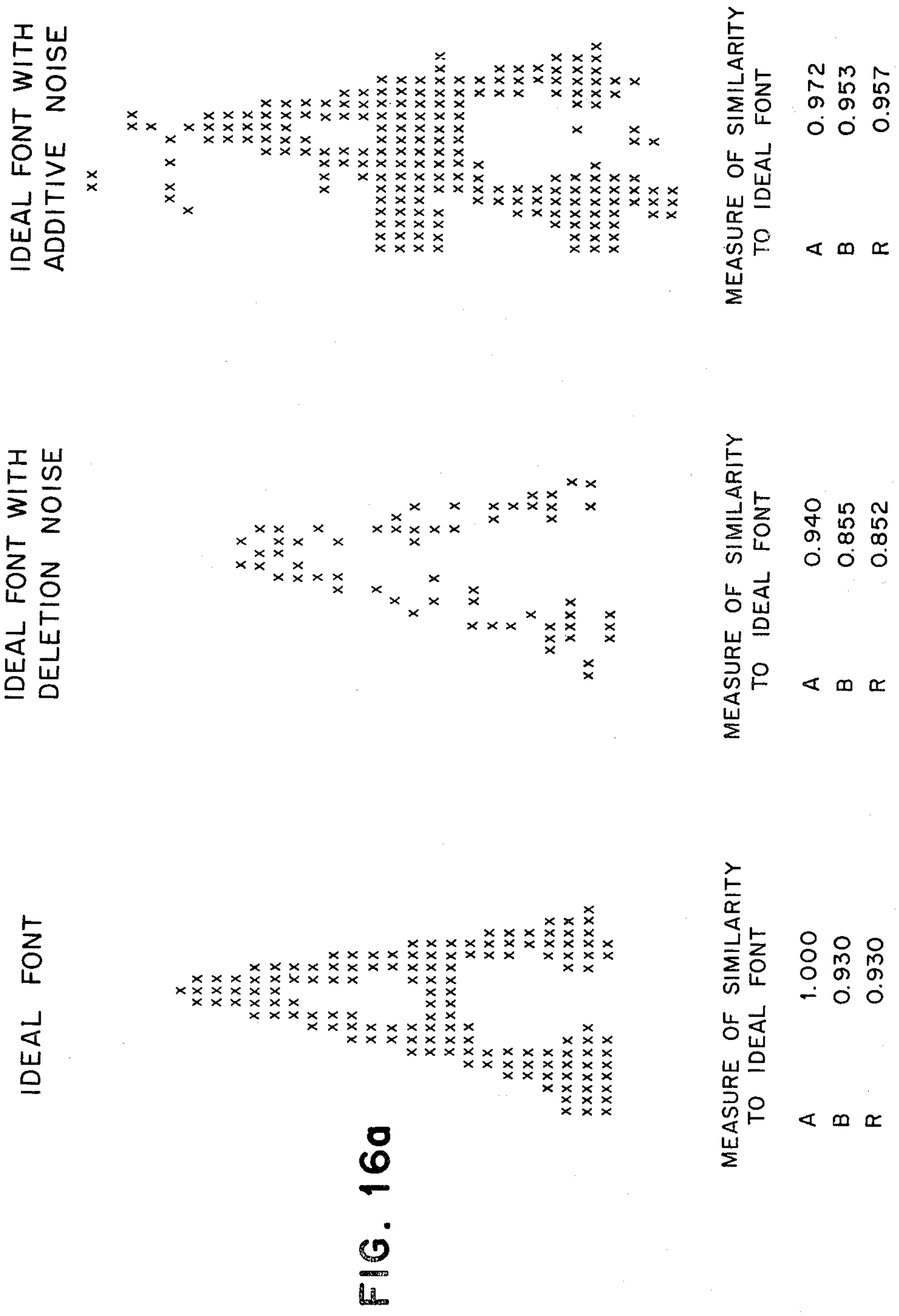
Figure 16B:
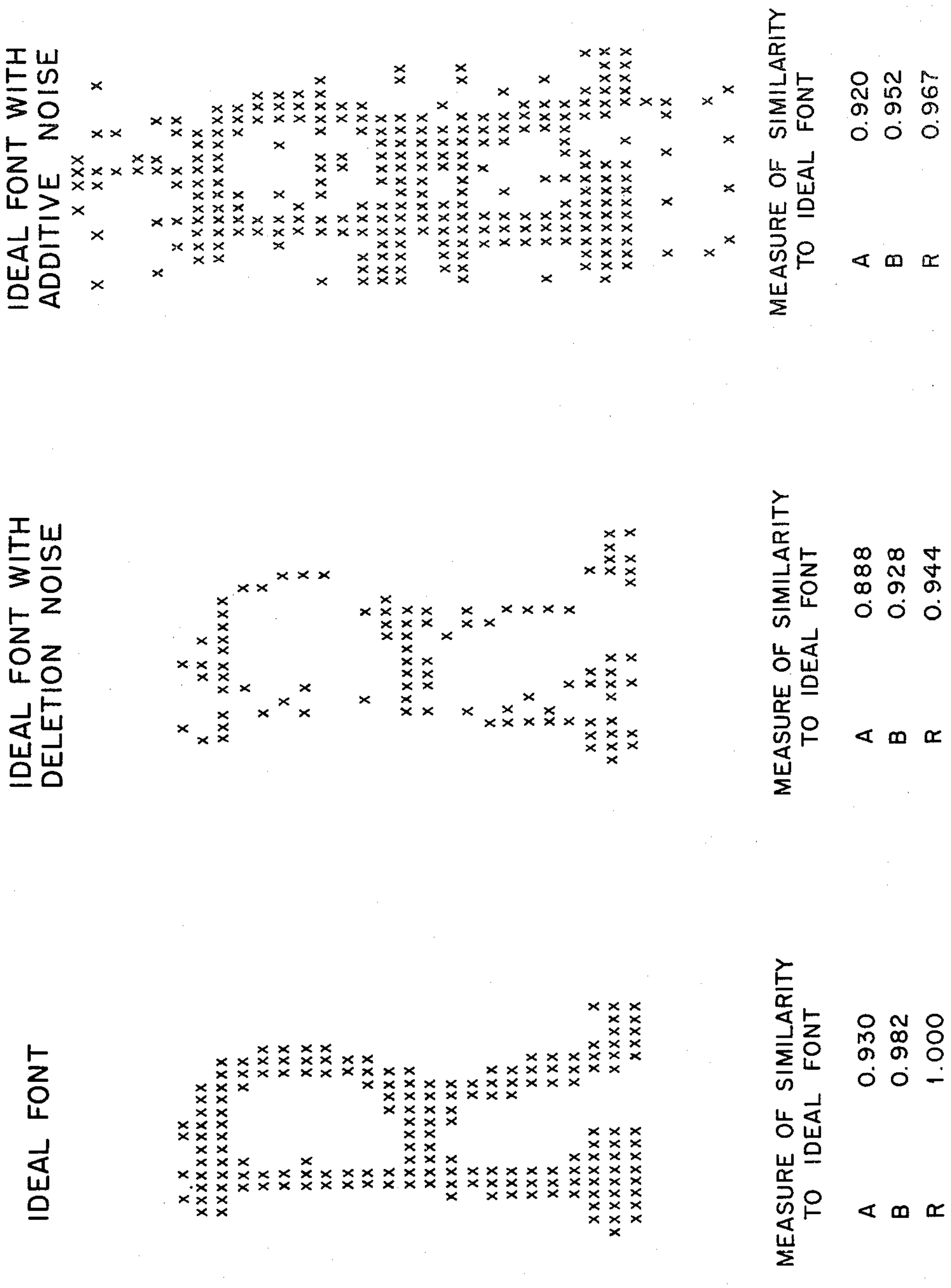

FIGURES 16*a* and 16*b* are a group of diagrams showing the stability of autocorrelation function specimen identification for typical specimens containing addition and deletion noise.

FIGURES 17–24 are diagrams showing the basic digital symbols used in FIGURES 25–35 and 46.

Figures 34, 34A:
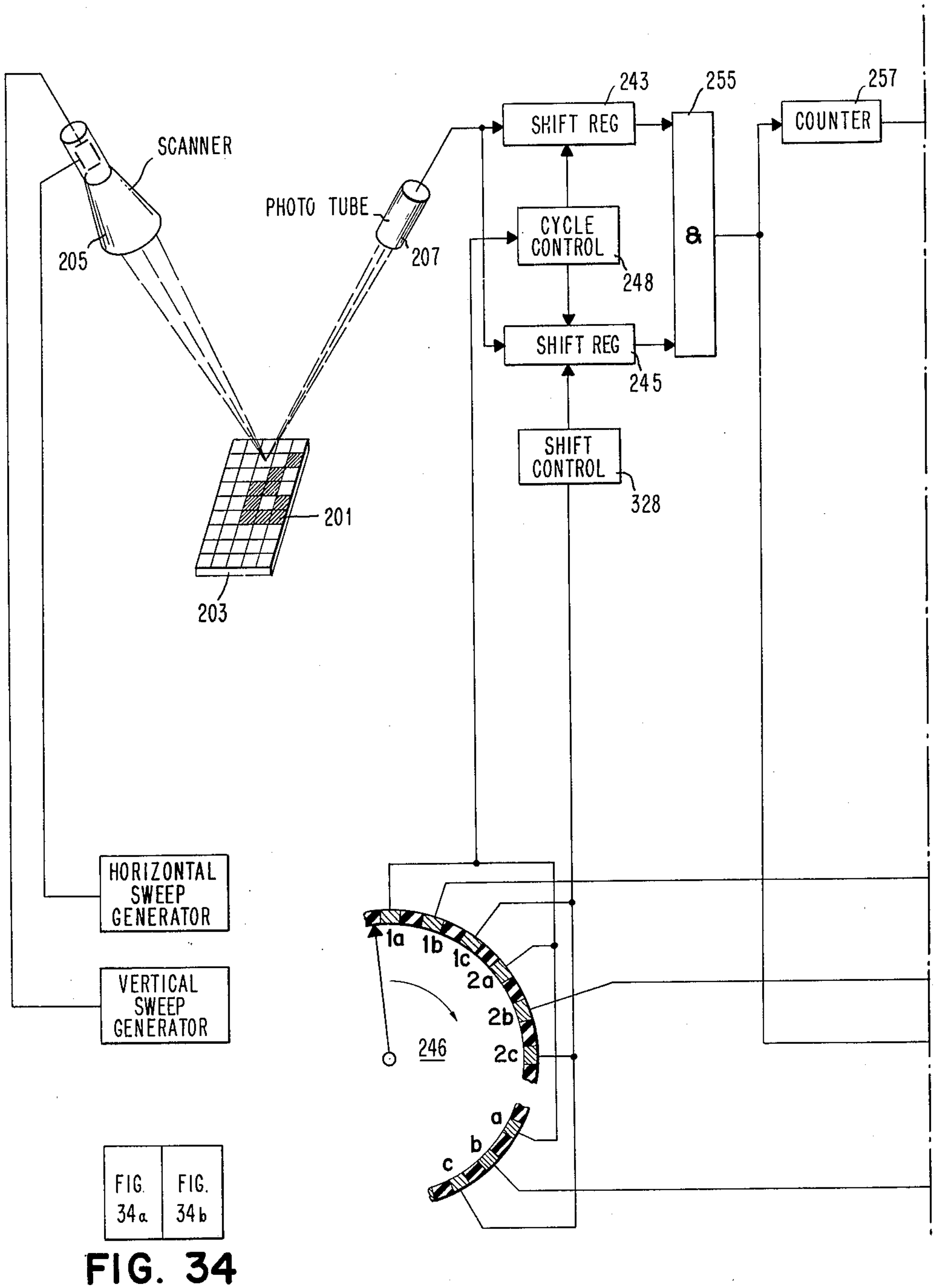
Figure 35A:
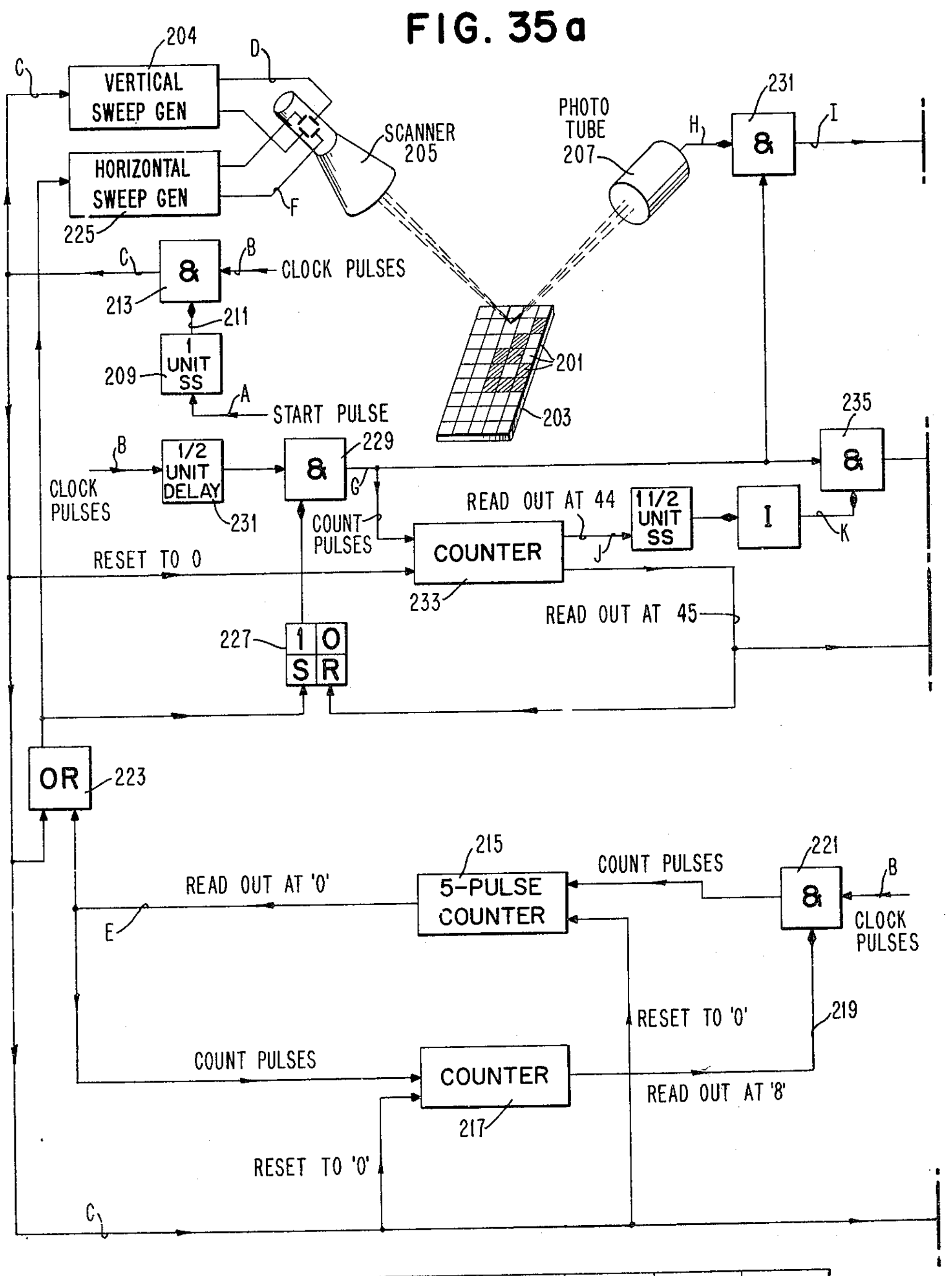
Figure 35:
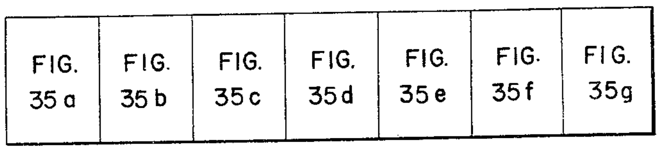
Figure 46A:
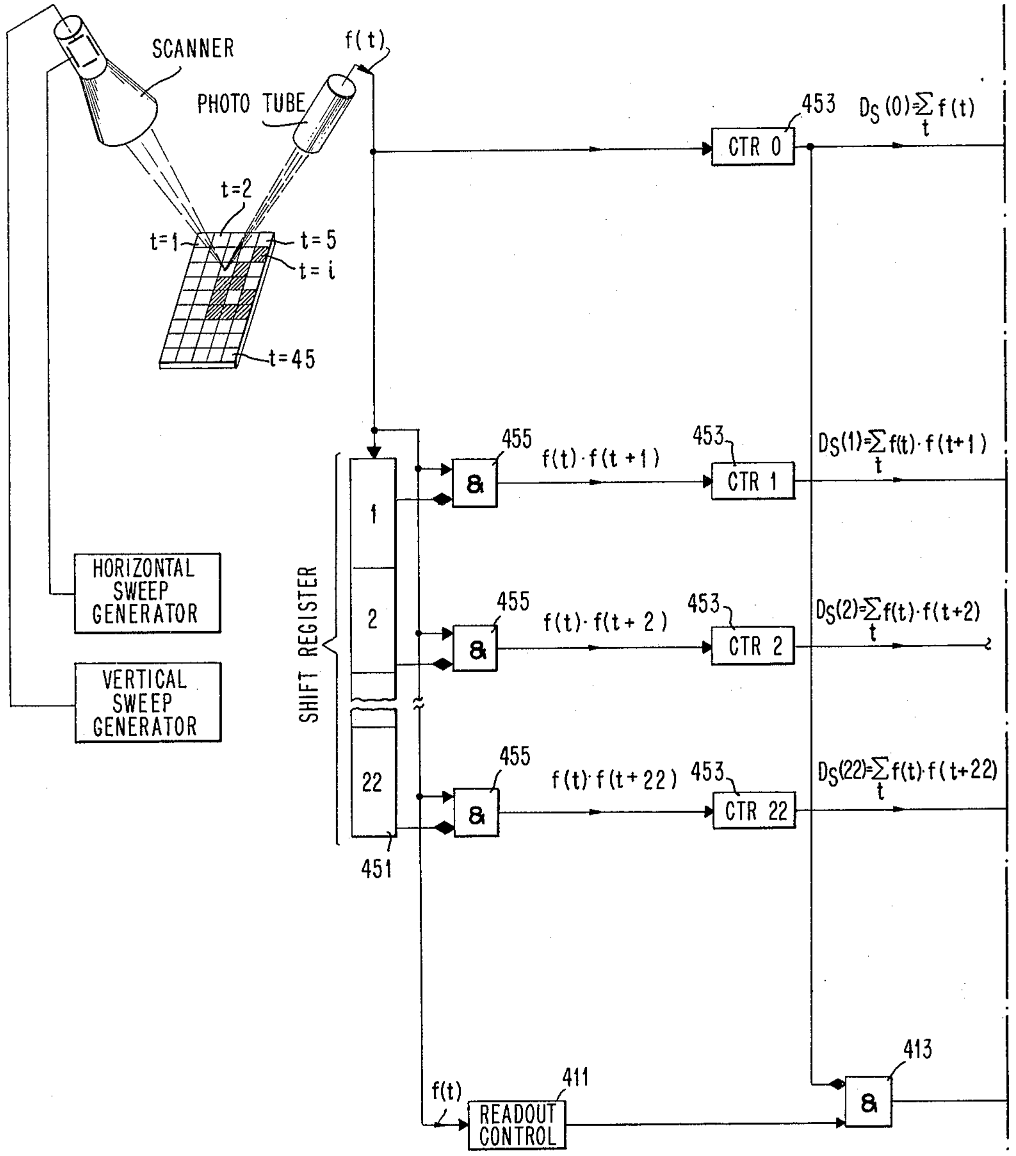
Figure 46:
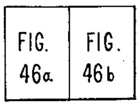

FIGURES 25–33 are schematic diagrams showing the basic digital circuits used in FIGURES 34, 35 and 46.

Figure 34B:
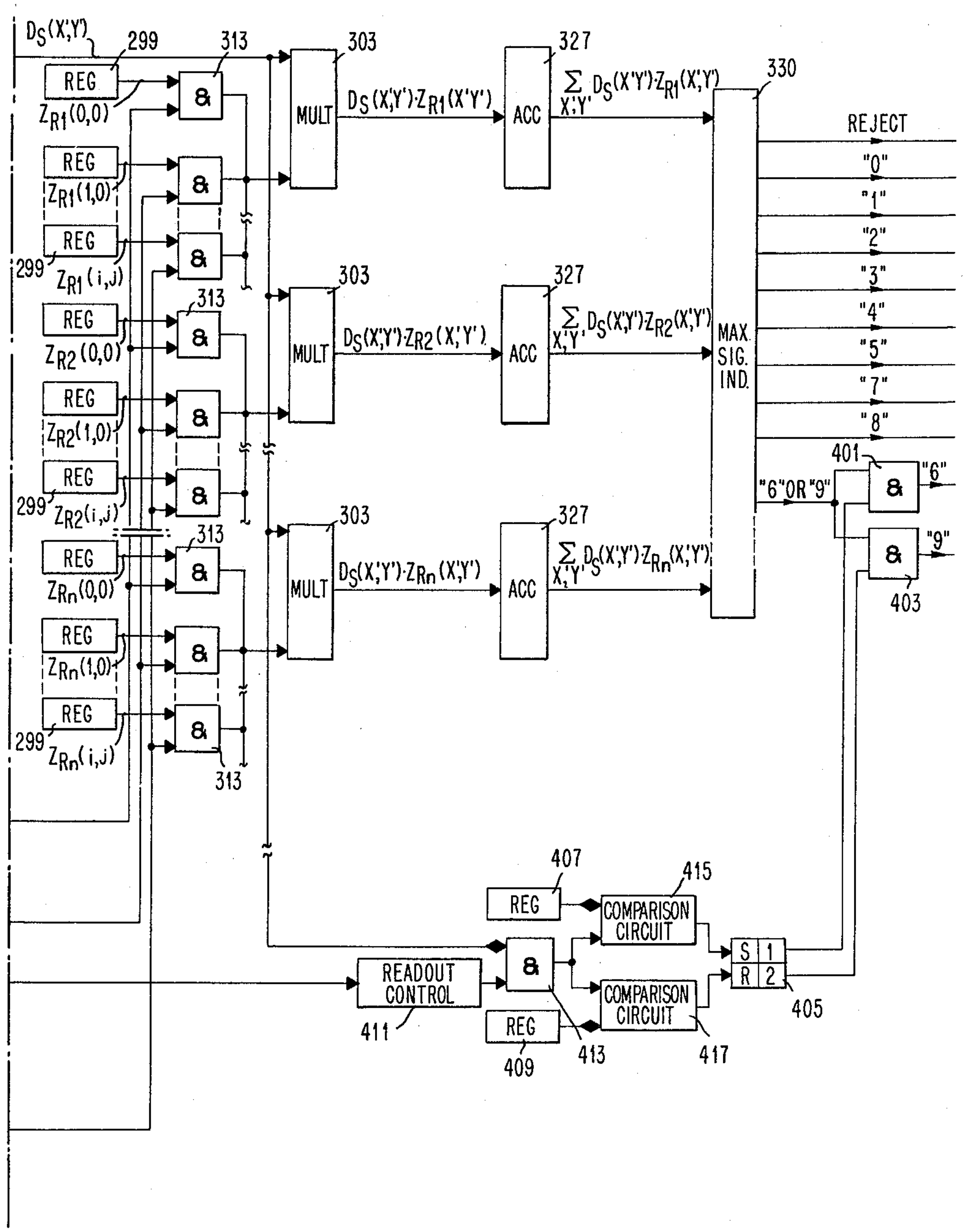

FIGURE 34 shows the relationship of FIGURES 34*a* and 34*b*.

FIGURES 34*a* and 34*b* comprise a functional diagram of one embodiment of the invention.

FIGURE 35 shows the relationship of FIGURES 35*a*–35*g*.

FIGURES 35*a*–35*g* comprise a schematic diagram of the embodiment of FIGURE 34.

FIGURES 36–43 are diagrams showing the operation of the shift registers in the diagram in FIGURE 35.

FIGURE 44 is a diagram showing the results of the operation of the shift registers in FIGURE 35.

Figure 45B:
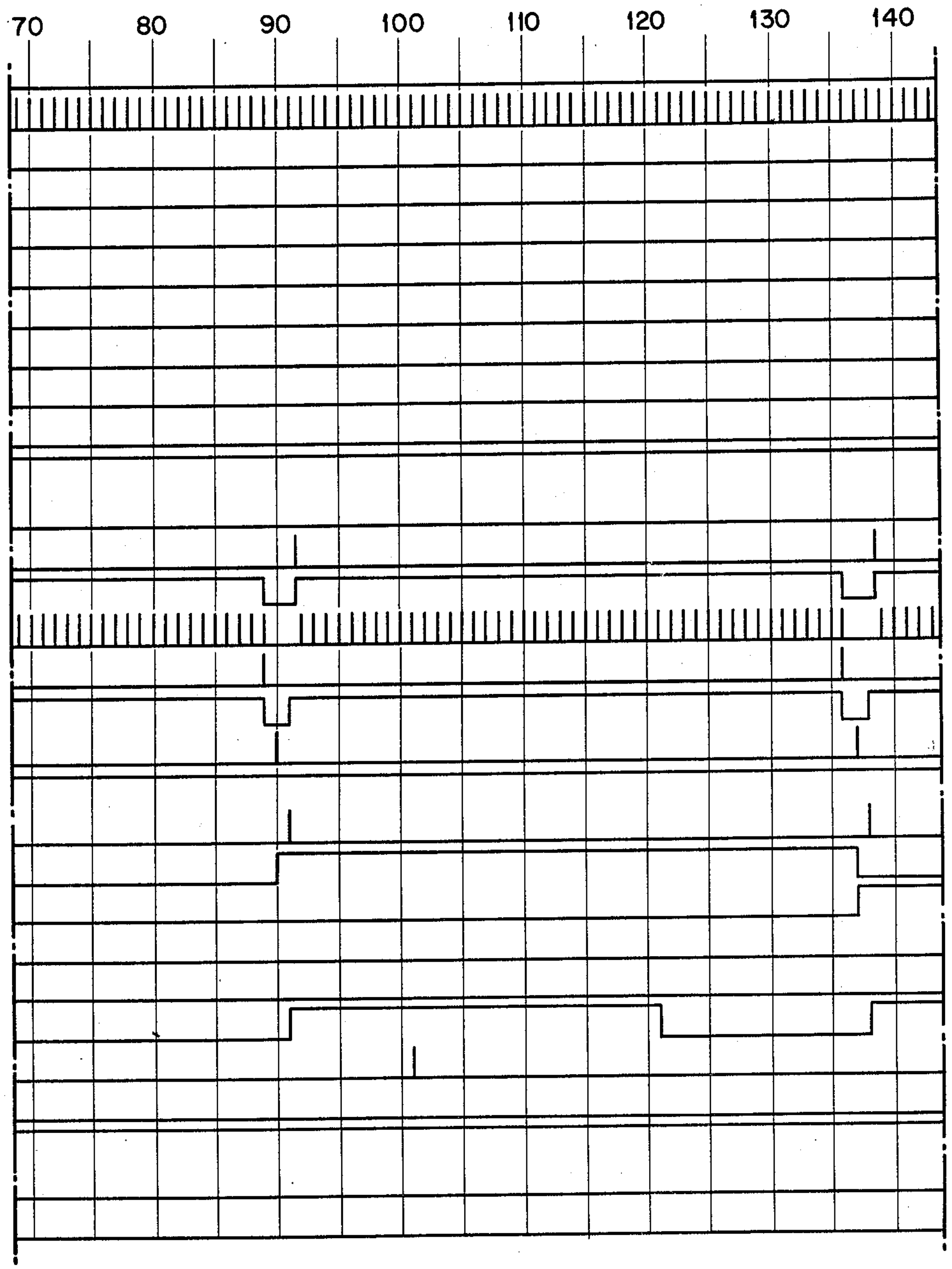
Figure 45C:
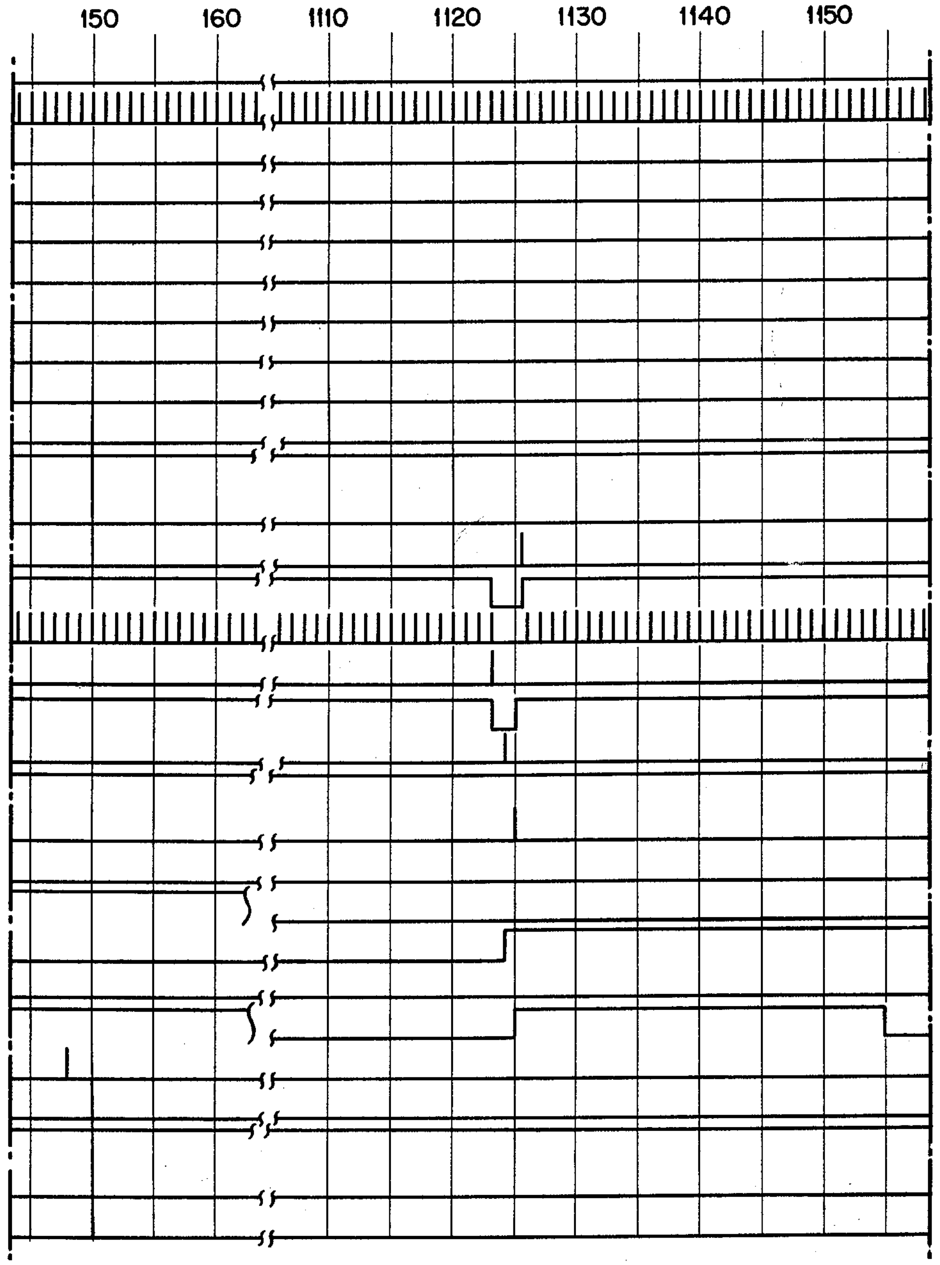
Figure 45D:
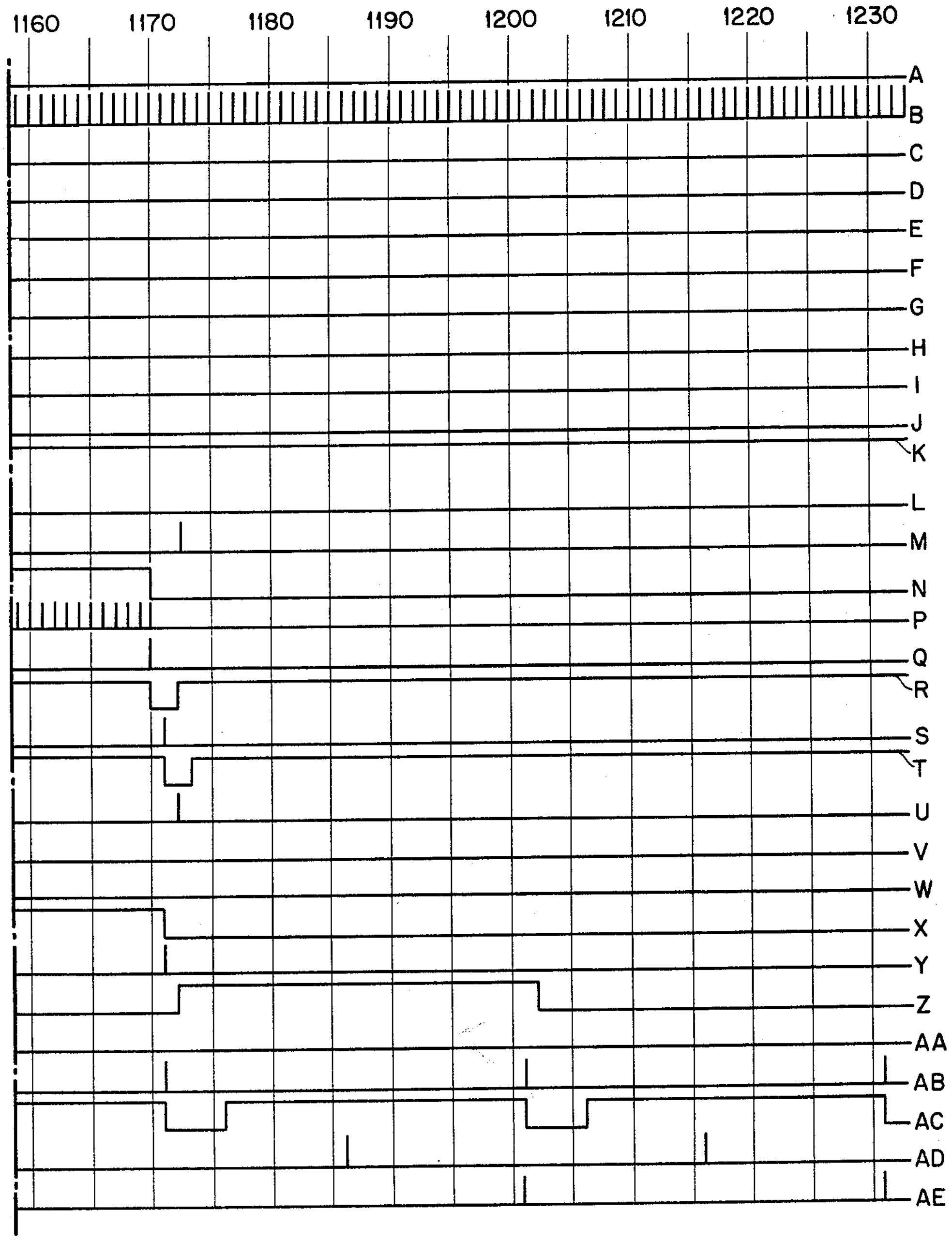

FIGURE 45 shows the relationship of FIGURES 45*a*–45*d*.

FIGURES 45*a*–45*d* comprise a timing diagram showing the operation of the system in FIGURE 35.

Figure 46B:
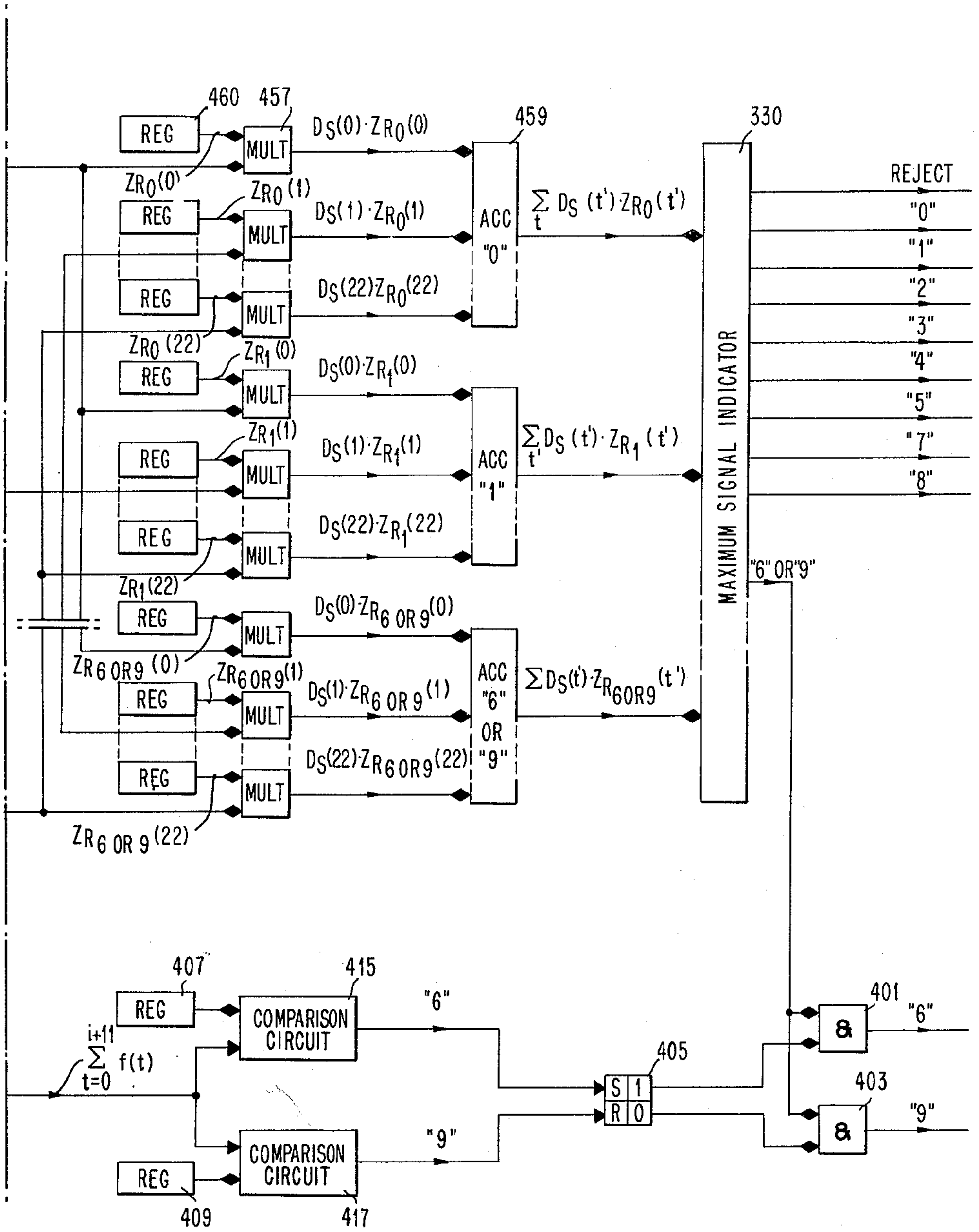

FIGURE 46 shows the relationship of FIGURES 46*a* and 46*b*.

FIGURES 46*a* and 46*b* comprise a functional diagram of a second embodiment of the invention.

Figure 47:
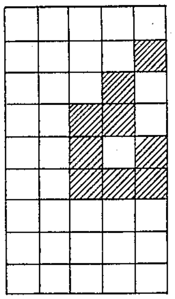
Figure 48:
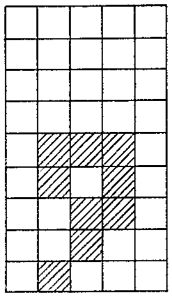

FIGURES 47 and 48 are diagrams illustrating the time-varying generation of the autocorrelation function for the reference patterns "6" and "9."

Figure 1:
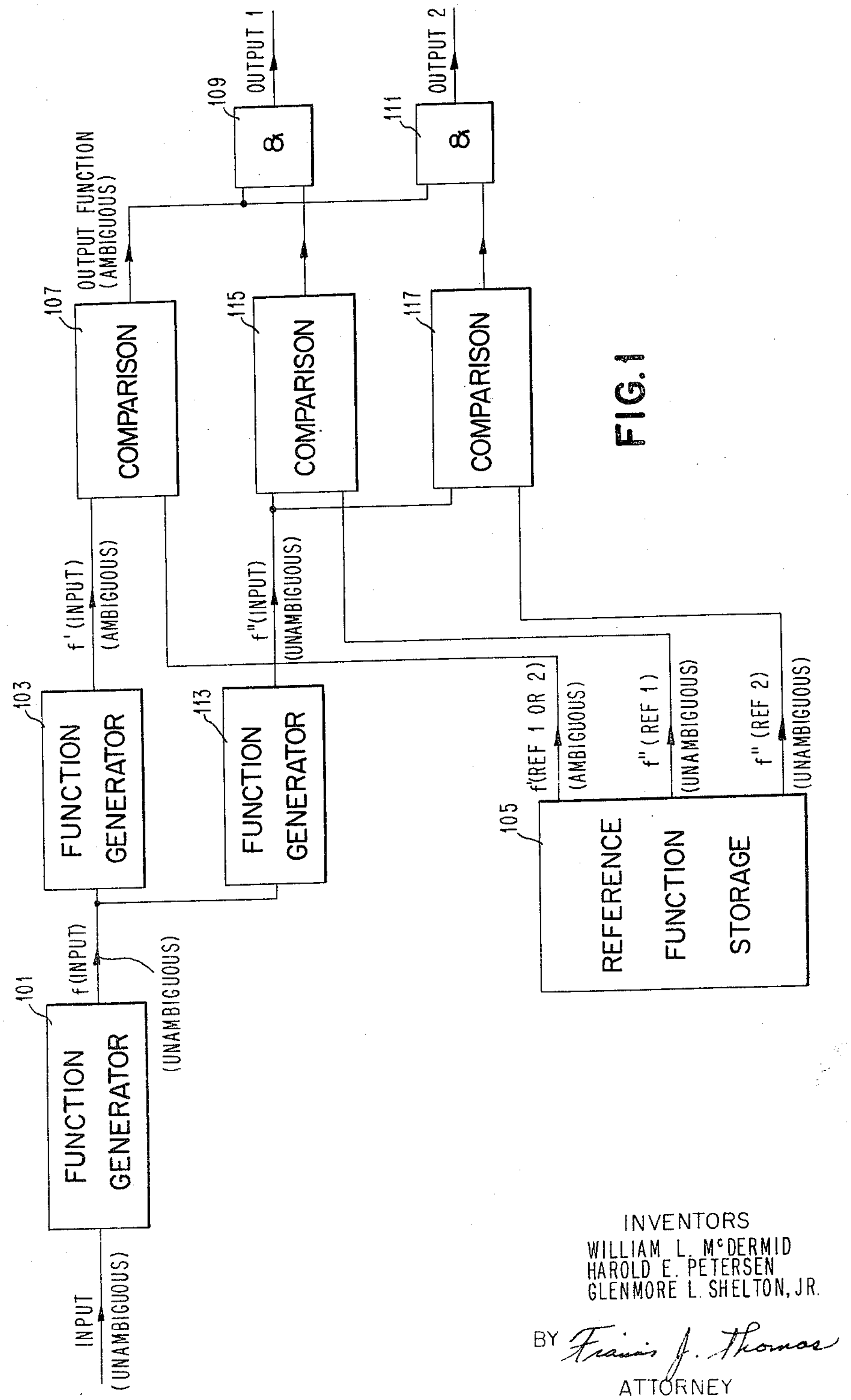
FIGURE 1 is a basic block diagram of an unambiguous identification system.

An unambiguous identification system is shown in FIGURE 1. The applied input, of necessity, is unambiguous in some respects. The input can be applied to a function generator 101 as shown to provide an unambiguous function $f$(input). This function generator could be an analog to digital converter, a logarithmic generator, or any other function generator that provides an unambiguous output for each distinct input. The purpose of this generator is to make the input compatible with the rest of the circuitry. If the input signal is of the proper form to be used by the subsequent circuitry, the function generator 101 may be eliminated altogether. The unambiguous function $f$(input) is then applied to a second function generator 103 of the type that provides an ambiguous output for two or more possible inputs. Autocorrelation function generators, integrators, and differentiators may generate the same output function for two or more distinct input functions.

An ambiguous reference function $f'$(ref 1 or 2) which is stored in a reference function storage circuit 105 is compared to the ambiguous input function $f'$(input) in a comparison circuit 107. If this comparison provides an indication of similarity an ambiguous output function is applied to two "and" gates 109 and 111. The final determination of the identity of the input relies on a second comparison of some unambiguous function of the input to some unambiguous function of each reference function. A function generator 113 can be used to provide an unambiguous function $f''$(input) to comparison circuits 115 and 117. The function $f''$(input) can be generated by a simple selection circuit which provides an unambiguous part of the input as its output. Similar unambiguous reference functions $f''$(ref 1) and $f''$(ref 2) are also applied to the comparison circuits 115 and 117, one of which provides a conditioning signal to an "and" gate 109 or 111 to unambiguously identify the input.

Figure 2:
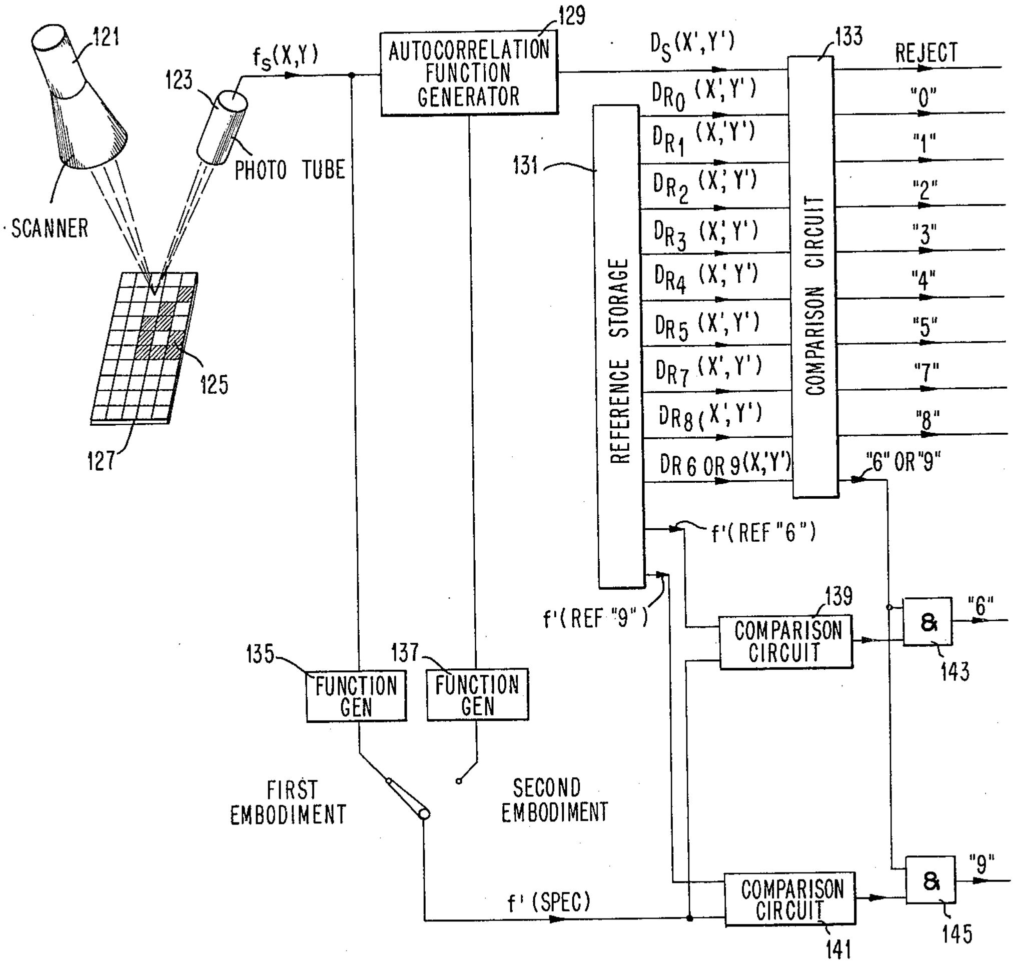
FIGURE 2 is a block diagram of unambiguous specimen identification systems.

FIGURE 2 is a more detailed block diagram showing two embodiments of specimen identification systems. A flying spot scanner 121 and phototube 123 provide a function $f_S(x,y)$ of the specimen 125 located in a matrix 127. An autocorrelation function generator 129 generates the function $D_S(x',y')$ which, in the case of certain specimens, is ambiguous. In these embodiments, Arabic numerals "0" through "9" are to be identified and the numerals "6" and "9" are presumed to provide ambiguous autocorrelation functions.

A reference storage circuit 131 provides autocorrelation functions $D_R(x',y')$ for each reference. In the case of "6" and "9," a single function $D_R$"6" or "9" $(x',y')$ is provided. A comparison circuit 133 provides an indication of the identity of the specimen for all unambiguous cases and provides indication of a "6" or "9" for the ambiguous patterns.

In one embodiment, a function generator 135 is used to provide an unambiguous function $f'$(spec) from the function $f_s(X,Y)$. In a second embodiment a function generator 137 generates an unambiguous function $f'$(spec) of an unambiguous portion of the autocorrelation function of the specimen. These embodiments are described below in greater detail with respect to FIGURES 34 and 46, respectively.

The unambiguous function $f'$(spec) is applied to two comparison circuits 139 and 141. Similar unambiguous functions $f'$(ref 6) and $f'$(ref 9) are applied to the appropriate comparison circuits 139 and 141 respectively.

One comparison circuit provides a conditioning signal to its corresponding "and" gate 143 or 145 to provide an unambiguous indication of the specimen.

In order to provide a clear illustration of the principles of the invention which are embodied in the accompanying detailed descriptions, the manual generation of autocorrelation functions and some of the associated theory are described below.

The autocorrelation function is a measure of the correlation of a function with itself and is generated by comparing the specimen to be autocorrelated with itself, shifted in all directions and distances.

FIGURES 3 through 10 illustrate a method of generating the autocorrelation function in FIGURE 11 for a typical pattern "3." In the following description, the patterns are comprised of 15 discrete areas on a 3 x 5 matrix for simplicity of arithmetic. In practice, this invention is designed to be used to identify specimens comprising many discrete areas on a large matrix.

Figures 3, 4, 5, 6, 7, 8, 9, 10, 11:
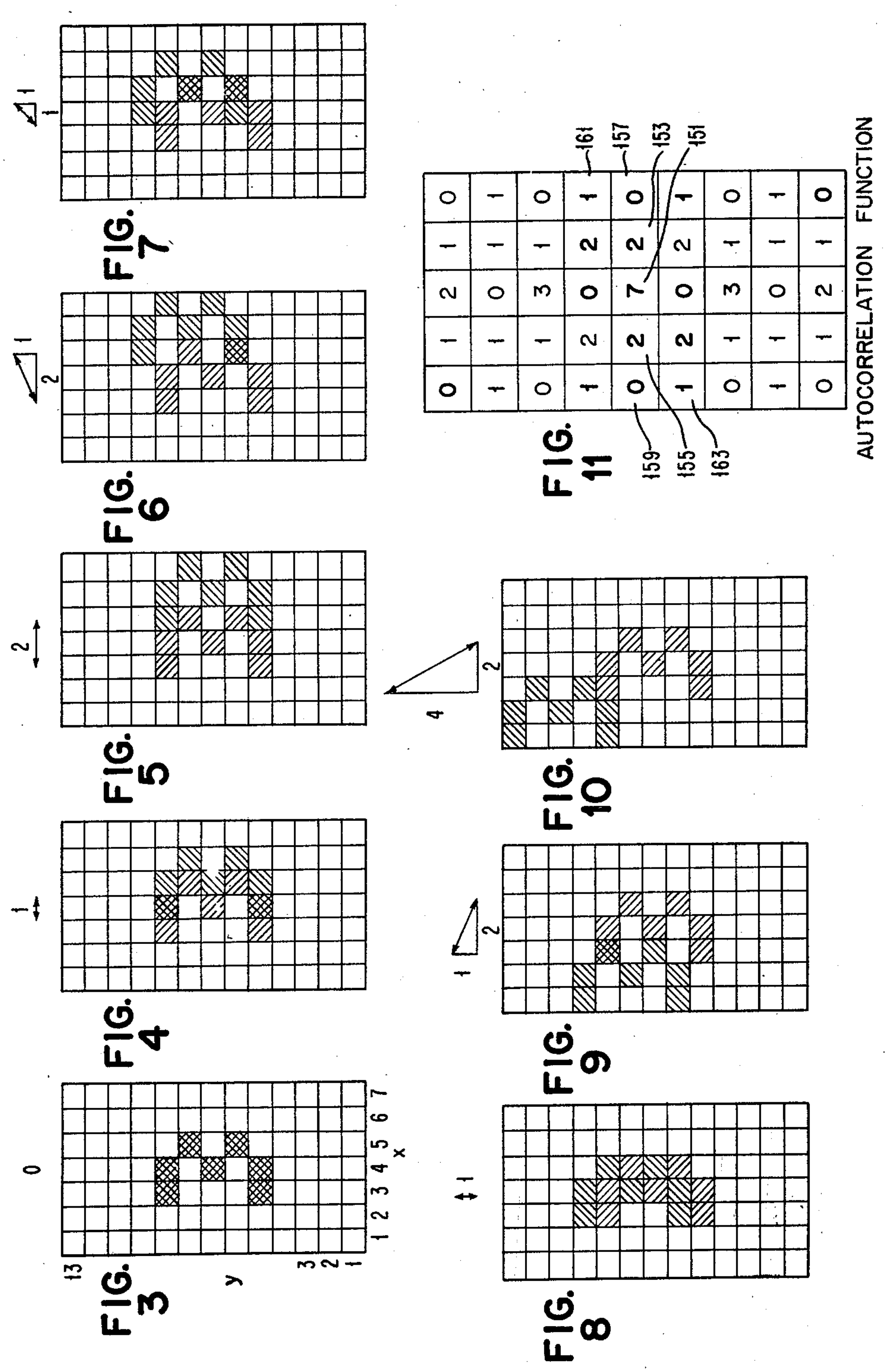
FIGURES 3–10 are a set of explanatory diagrams showing a procedure for generating the autocorrelation function of a typical pattern.
FIGURE 11 is a chart showing the autocorrelation function generated following the procedure in FIGURES 3–10.

The pattern "3" formed by slant-left lines is common to FIGURES 3 through 10; the pattern formed by slant-right lines is shifted to various positions in the figures. FIGURE 3 illustrates the "0-shift" pattern, and hence, the slant-left and slant-right patterns are superimposed. If the discrete areas of the matrix are considered to have $x$ and $y$ coordinates, as shown in FIGURE 3, $f(x,y)$ is "1" for $(x=3, y=9)$; $(x=4, y=9)$; $(x=5, y=8)$; $(x=4, y=7)$; $(x=5, y=6)$; $x=4, y=5)$; and $(x=3, y=5)$. For all other values of $x$ and $y$, $f(x,y)=0$. The autocorrelation function $D(x',y')$ is determined by the equation:

$$D(x',y')=\sum_{x,y} f(x,y)f(x+x',\ y+y')$$

In the "0-shift" condition (FIGURE 3), $x'=y'=0$ and the sum is merely a count of the number of areas that are filled by the pattern, as the product $$f(x,y)\cdot f(x+0,\ y+0)=1$$

whenever $f(x,y)=1$. This sum is "7" for the pattern in FIGURE 3, and it is placed in the "0-shift" position 151 in the table in FIGURE 11. FIGURE 4 illustrates the conditions present for a shift of one unit to the right designated as $(x'=1,\ y'=0)$, which causes a "2" to be placed at the corresponding position 153 of the table in FIGURE 11 as there are two coincident areas on the matrix. Position 153 is displaced one unit to the right of position 151 to correspond to a shift of one unit to the right of the pattern in FIGURE 4. A "2" is also placed in position 155 of the table as a shift to the left of one unit $(x'=-1,\ y'=0)$ obviously produces the same result as a shift to the right of one unit $(x'=1,\ y'=0)$. FIGURE 5 illustrates the conditions present for $(x'=2,\ y'=0)$ which provides a "0" at location 157 on FIGURE 11 (and also position 159, corresponding to $(x'=-2,\ y'=0)$. In a similar manner, positions 161 and 163 of the table are filled with "1's" as determined by FIGURE 6. FIGURES 7 through 10 illustrate the conditions present for several other combinations of $x'$ and $y'$. Using this procedure, the entire autocorrelations table of FIGURE 11 may be filled in for the typical pattern "3."

Figure 14:

FIGURES 12–14 shows ten Arabic numeral patterns on 3 x 5 matrices; their autocorrelation functions; their normalized autocorrelation functions; and their normalized "second-difference" autocorrelation functions. All functions are shown in abbreviated form, omitting the redundant "reflected" portions.

The normalized function $Z_{Rn}(x',y')$ of the reference "$R_n$" is generated using the formula:

$$Z_{Rn}(x',y')=\frac{D_{Rn}(x',y')}{\left[\sum_{x',y'} D^2_{Rn}(x',y')\right]^{1/2}}$$

A calculation for the pattern "1" provides a divisor of $$(1^2+2^2+3^2+4^2+5^2+4^2+3^2+2^2+1^2)^{1/2}=85^{1/2}=9.22$$

which is divided into 1, 2, 3, 4 and 5 to obtain 0.1085, 0.2169, 0.3254, 0.4339 and 0.5423, respectively. The division must be computed using the redundant numbers that are not shown on FIGURES 12–14 as well the numbers shown.

One of the "discriminating" functions, the normalized "second-difference" function $Y_{Rn}(x',y')$ of the reference "R," is obtained using the formula:

$$Y_{Rn}(x'\ y')=\frac{E_{Rn}(x',y')}{\left[\sum_{a,b} F^2_{Rn}(a,b)\right]^{1/2}}$$

where:

$$E_{Rn}(x'y')=\sum_{x',y'} L_{x',y'}(x',y')\cdot D_{Rn}(x',y')$$

$$F_{Rn}(a,b)=\sum_{x',y'} M_{x',y'}(x',y')\cdot D_{Rn}(x',y')$$

$$L_{0,0}(x',y')=\begin{matrix}
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&1&0&0&0&0&0&0\\
0&0&0&0&0&2&-8&2&0&0&0&0&0\\
0&0&0&0&1&-8&20&-8&1&0&0&0&0\\
0&0&0&0&0&2&-8&2&0&0&0&0&0\\
0&0&0&0&0&0&1&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0
\end{matrix}$$

$$M_{0,0}(x',y')=\begin{matrix}
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&-1&0&0&0&0&0&0\\
0&0&0&0&0&-1&4&-1&0&0&0&0&0\\
0&0&0&0&0&0&-1&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0
\end{matrix}$$

The subscripts for L and M indicate the position on the 13 x 17 matrix that the non-zero portions fills. For example, subscripts (0,0) indicate the non-zero portion of the matrix is centered as shown above whereas subscripts (2,−3) would indicate that all non-zero elements are shifted up two positions and to the left three positions. The L matrix is the autocorrelation function of the M matrix.

A sample calculation to obtain the 0.297 at position 175 of the normalized "second-difference" autocorrelation function for the pattern "1" follows. The autocorrelation function is centered on a 13 x 17 matrix as follows:

$$D_{R1}(x',y')=\begin{matrix}
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&1&0&0&0&0&0&0\\
0&0&0&0&0&0&2&0&0&0&0&0&0\\
0&0&0&0&0&0&3&0&0&0&0&0&0\\
0&0&0&0&0&0&4&0&0&0&0&0&0\\
0&0&0&0&0&0&5&0&0&0&0&0&0\\
0&0&0&0&0&0&4&0&0&0&0&0&0\\
0&0&0&0&0&0&3&0&0&0&0&0&0\\
0&0&0&0&0&0&2&0&0&0&0&0&0\\
0&0&0&0&0&0&1&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0
\end{matrix}$$

The denominator $$\left[\sum_{a,b} F_{R1}{}^2(a,\ b)\right]^{1/2}$$

is determined as follows:

$$F_{R1}(0,0)\ \text{equals}\ (4)(5)+(-1)(4)=12$$

All products other than $$D_{R1}(0,0)\cdot L_{0,0}(0,0)D_{R1}(0,1)\cdot L_{0,0}(0,1)$$

and $$D_{R1}(0,-1)\cdot L_{0,0}(0,-1)\ \text{equal 0.}$$

Similarly, $$F_{R1}(0,1)=F_{R1}(0,-1)=(4)(4)+(-1)(3)+(-1)(5)=8$$

$$F_{R1}(0,2)=F_{R1}(0,-2)=(4)(3)+(-1)(2)+(-1)(4)=6$$
$$F_{R1}(0,3)=F_{R1}(0,-3)=4(2)+(-1)(1)+(-1)(3)=4$$
$$F_{R1}(0,4)=F_{R1}(0,-4)=4(1)-1(2)=2$$
$$F_{R1}(0,5)=F_{R1}(0,-5)=-1(1)=-1$$
$$F_{R1}(1,0)=F_{R1}(-1,0)=(-1)(5)=-5$$
$$F_{R1}(1,2)=F_{R1}(1,-2)=F_{R1}(-1,2)=F_{R1}(-1,-2)=(-1)(3)=-3$$
$$F_{R1}(1,3)=F_{R1}(1,-3)=F_{R1}(-1,3)=F_{R1}(-1,-3)=(-1)(2)=-2$$
$$F_{R1}(1,4)=F_{R1}(1,-4)=F_{R1}(-1,4)=F_{R1}(-1,-4)=(-1)(1)=-1$$

The denominator is finally determined as:

$$[12^2+2(8)^2+2(6)^2+2(3)^2+2(2)^2+2(-1)^2+2(-5)^2+4(-4)^2+4(-3)^2+4(-2)^2+4(-1)^2]^{1/2}=556^{1/2}=23.58$$

Each numerator, $E_{R1}(x',y')$ is obtained by multiplying $L_{x',y'}(x',y')$ by $D_{R1}(x'y')$ point by point, and summing over $x',y'$. In order to obtain the number at position 175, which corresponds to ($x'=0$, $y'=4$), the matrix $L_{0,4}(x',y')$ is multiplied point by point by $D_{R1}(x',y')$ and summed. This results in $(20\times1)+(-8\times2)+(1\times3)=7$. The remaining products are zero.

The resulting number for position 175 of the normalized "second-difference" autocorrelation function is thus:

$$\frac{7}{23.58}=0.297$$

Since the L matrix is a basic 5 x 5 matrix surrounded by zeros and the autocorrelation function matrix is a basic 5 x 9 matrix surrounded by zeros, the normalized "second-difference" autocorrelation function matrix is a basic 9 x 13 matrix surrounded by zeros. The redundant "reflected" portions of the matrix are not shown in FIGURES 12–14. When the normalized "second-difference" autocorrelation function $Y_{Rn}(x',y')$ of the reference patterns R*n* are used in the specimen identification apparatus comparison sums $S_{S,Rn}(x',y')$ are developed by the formula:

$$S_{S,Rn}(x',y')=\sum_{x',y'}D_S(x',y')\cdot Y_{Rn}(x',y')$$

In this case $Y_{Rn}(x',y')$ replaced $Z_{RN}(x',y')$ in the formula previously discussed. Since $D_S(x',y')$ is zero for $x'>\pm2$ or $y'>\pm4$, all products $D_S(x',y')\cdot Y_{RN}(x',y')$ are zero in these cases. For this reason, only the portion of $Y_{Rn}(x',y')$ within the heavy lines (FIGURES 12–14) is used in the apparatus.

The use of "second-difference" functions improve discrimination due to the negative components in the M matrix. Another class of functions, the "smoothing" functions, does not improve discrimination, but improves stability of recognition of poor specimens, such as those with addition or deletions noise, those with or without serifs, etc. These functions are determined by the preceding formulas for $Y_{Rn}(x',y')$, replacing the M matrix with a matrix (S) having no negative elements and replacing the L matrix with a matrix (R) derived as the autocorrelation function of the S matrix. One of the "smoothing" functions, the "averaging" function, uses the following S matrix;

$$S_{0,0}(x',y')=\begin{matrix}
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&1&0&0&0&0&0&0\\
0&0&0&0&0&1&1&1&0&0&0&0&0\\
0&0&0&0&0&0&1&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0
\end{matrix}$$

The autocorrelation function of the S matrix provides the following R matrix:

$$R_{0,0}(x',y')=\begin{matrix}
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&1&0&0&0&0&0&0\\
0&0&0&0&0&2&2&2&0&0&0&0&0\\
0&0&0&0&1&2&5&2&1&0&0&0&0\\
0&0&0&0&0&2&2&2&0&0&0&0&0\\
0&0&0&0&0&0&1&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0\\
0&0&0&0&0&0&0&0&0&0&0&0&0
\end{matrix}$$

When identifying specimens using "averaging" functions of the autocorrelation function comparison, the $Y_{Rn}(x',y')$ formula is converted to the following formula for $W_{Rn}(x',y')$:

$$W_{Rn}(x',y')=\frac{B_{Rn}(x',y')}{\left[\sum_{a,b}C^2_{Rn}(a,b)\right]^{1/2}}$$

where $$B_{Rn}(x',y'=\sum_{x',y'}R_{x',y'}(x',y')\cdot D_{Rn}(x',y')$$

and $$C_{Rn}(a,b)=\sum_{x',y'}S_{x',y'}(x',y')\cdot D_{Rn}(x',y')$$

The comparison sums $S_{S,Rn}(x',y')$ are then developed by the formula:

$$S_{S,Rn}(x',y')=\sum_{x',y'}D_S(x',y')\cdot W_{Rn}(x,y')$$

Autocorrelation function comparison provides accurate and stable identification of specimens.

The sums $S_{S,Rn}$ obtained using the data of FIGURE 34 and discussed above are shown in FIGURE 15*a* where the normalized autocorrelation function $Z_{Rn}(x',y')$ of the reference patterns are used, and in FIGURE 15*b* where the normalized "second-difference" autocorrelation function $Y_{Rn}(x',y')$ of the reference patterns are used. The largest sums are developed in each case when the input pattern matches the reference pattern, but when "second-difference" autocorrelation comparison is used, a larger ratio is obtained between the closest and second-closest matches.

FIGURE 16 shows the results obtained when using autocorrelation function comparison of ideal input specimens and input specimens containing deletion and addition noise with reference patterns. In this case, the patterns are divided into a larger number of discrete areas than the patterns used in the preceding description. The preceding description is simplified in this manner. In practice, the invention is used with patterns having a number of discrete areas of the order shown in FIGURE 16. The data below the patterns is the measure of similarity of the specimen to three reference patterns (A, B and R) and was obtained by further normalizing the sum $S_{S,Rn}(x',y')$ obtained using normalized autocorrelation function $Z_{Rn}(x',y')$ comparison. Patterns A, B and R, which are similar in structure, were chosen to show the stability of autocorrelation function comparison under adverse conditions.

The functional and schematic diagrams include several symbols for circuits (such as flip-flops, "and" gates, etc.) and functional blocks (such as registers, multipliers, etc.) which are explained in detail with respect to FIGURES 17 through 33.

FIGURES 17 through 24 show the basic digital symbols used in the schematic diagrams. Two binary conditions labelled "1" and "0" where "1" indicates the presence of a signal and "0" indicates the lack of a signal. R. K. Richards, Digital Computer Components and Circuits, 1957 published by Van Nostrand, provides a basic introduction to digital circuits and schematic diagrams of circuits that could be used in this invention.

Figure 17:
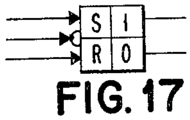

FIGURE 17 shows a basic bistable circuit, which is referred to as a flip-flop. The flip-flop is set by applying a "1" signal to the set (S) input. This provides a "1" signal at its "1" output and a "0" signal at its "0" output. This circuit is reset by applying a "1" signal to the reset (R) input, thus providing a "0" signal at the "1" output and a "1" signal at the "0" output. There is no effect on the circuit if an "S" input is applied when a circuit is already set, or if an "R" input is applied when previously reset. The third input is called a "complement" input and operates to reverse the condition of the circuit when a "1" signal is applied. If the circuit were set before the application of a complement signal, it would be reset by the signal. Similarly, if the circuit were reset before the application of this signal, it would be set by the signal.

Figure 18:
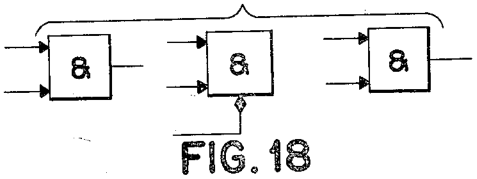
Figure 19:
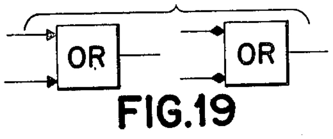

An "and" gate, as shown in FIGURE 18, provides a "1" output if all inputs received "1" signals at the same time. Three types of "and" gates are shown. An "or" gate, as shown in the two symbols in FIGURE 19 provides a "1" output if any "1" input is present. In all other cases, both the "and" gate and the "or" gate provides a "0" output.

Figure 20:
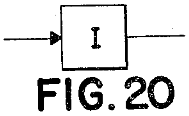

An inverter, as shown in FIGURE 20, reverses the input. If a "1" is applied, a "0" is developed as an output; if a "0" is applied, a "1" is developed.

Figure 21:
Figure 22:
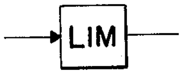

FIGURE 21 shows a symbol for conventional amplifier, and FIGURE 22 shows the symbol for a limiter.

Figure 23:

A delay circuit is shown in FIGURE 23. Signals applied to this circuit are passed after a period of time without being affected in shape or amplitude.

Figure 24:
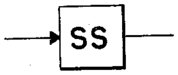

FIGURE 24 shows the symbol for a single-shot multivibrator. This circuit generates a rectangular gate output when a "1" signal is applied at its input. The output gate has an amplitude and polarity of a "1" signal and a duration dependent upon the circuit constants.

The input leads to the digital circuits are terminated in either an arrow or a diamond. An arrow indicates that either a pulse or the leading edge of a gate signal is required. A diamond indicates that a gate signal is required—for example, when used on connection with "and" gate, the diamond indicates the input to be a conditioning gate signal.

Figure 25:
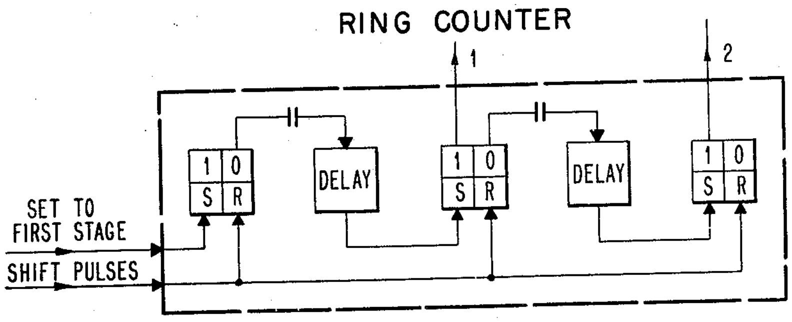

A ring counter is shown in FIGURE 25. Only one flip-flop of this counter is set at any time. At each application of a shift-pulse, the flip-flop previously set is reset and, after a delay, the adjacent, higher-order, flip-flop is set. An additional input is provided to set the lowest order flip-flop before the application of shift pulses. A more detailed description of the operation of a ring counter is found in a book authored by R. K. Richards entitled Arithmetic Operations in Digital Computers, 1955, published by Van Nostrand, Library of Congress Classification QA 76.R5, on pages 205–208.

Figure 26:
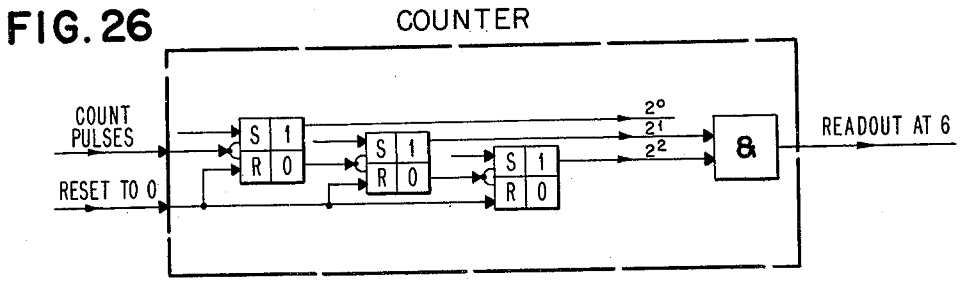

FIGURE 26 shows a series of flip-flop circuits that are connected to form a counter. Count pulses are serially applied to the complement input of the lowest order flip-flop. The counter may be reset to 0 by the application of "1" signals to all "R" inputs, providing a "0" signal at each flip-flop "1" output. The first count pulse applied to the complement input sets the lowest-order flip-flop providing a "1" at its output. Since the "0" output of this flip-flop is transferred from a "1" signal to a "0" signal, there is no effect on the adjacent flip-flop. The second applied count pulse resets the lowest-order flip-flop, providing a "0" signal at its "1" output lead and a "1" signal to the complement input of the adjacent flip-flop, transferring its condition. At this time, the $2^0$ and the $2^2$ output leads contain "0" signals and the $2^1$ output lead contains a "1" signal, indicating a total count 010, which is the binary representation of the decimal digit 2. As successive count pulses are applied, the output total increases until a total of 111 is obtained (after the 7th input pulse). The next (8th) count pulse applied causes an output total of 000 and succeeding pulses cause a repetition of the preceding operation. The counter need not be originally set to 000, but may be reset to any other number by applying "1" signals to the appropriate "S" and "R" inputs. When it is desired to provide a counter read-out signal for a particular count, an "and" gate is connected to the appropriate flip-flop outputs, depending upon the read-out count desired. In FIGURE 26, a read-out of 6 is indicated; thus the $2^1$ and $2^2$ inputs are applied to the "and" gate. This causes an output signal to be generated when the counter stores a count of either 6 or 7, as in those two cases the $2^1$ and $2^2$ leads contain "1" signals. When it is desired that the counter read out at 6 only, the $2^0$ signal is inverted and applied to the "and" gate. In this case the "and" gate has "1" signals applied to it at a count of 6 only because the $2^0$ signal is a "0" at this time, which after inversion provides the required "1" signal to operate the "and" gate. This could be accomplished without the use of an inverter if the third input to the "and" gate were taken from the "0" output of the lowest-order flip-flop.

Figure 27:
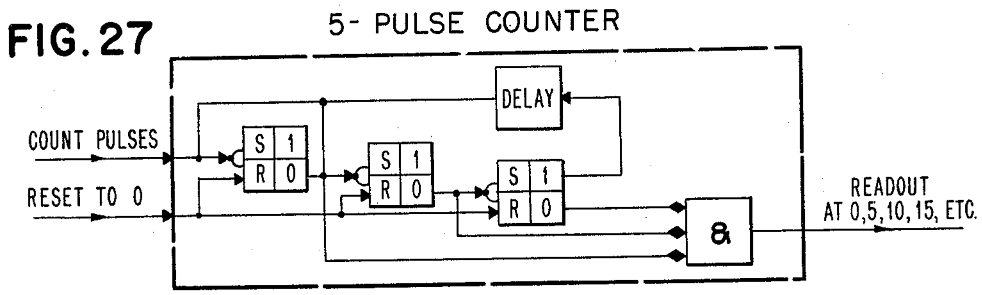

Referring next to FIGURE 27, there is shown a 5-pulse counter which provides an output for every fifth input count pulse. The "and" gate in this counter has signals applied to it from the "0" outputs of each of the flip-flops, thus the "and" gate provides an output signal when all flip-flops are reset. A reset to "0" signal is applied to the counter to reset all flip-flops. As count pulses are applied, the counter operates in a manner similar to the counter of FIGURE 26, except that, at a count of 4, a signal is delayed and fed back to the complement input of the 2 lower-order flip-flops. Thus, the fourth count pulse which initially resets the two lower-order flip-flops and sets the highest-order flip-flop, causes a signal to be fed back to the two-lower-order flip-flops, setting them. The fifth count pulse applied to the circuit of FIGURE 27 causes all flip-flops to be reset which provides an output from the "and" gate. In a similar manner, the tenth, fifteenth, etc. pulses applied to this counter cause outputs from the "and" gate.

Figure 28:
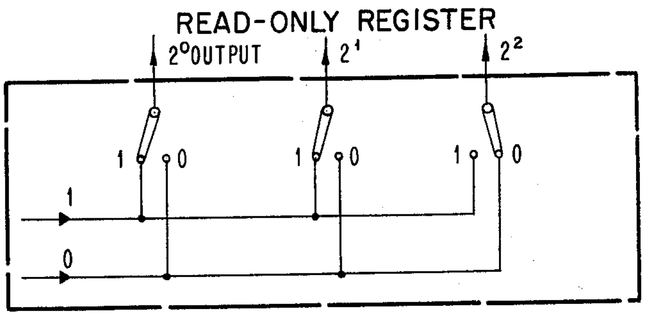

In FIGURE 28 there is shown a read-only register which provides "1" outputs on various leads dependent upon the setting of switches. The register (as shown) stores the binary number 011.

Figure 29:
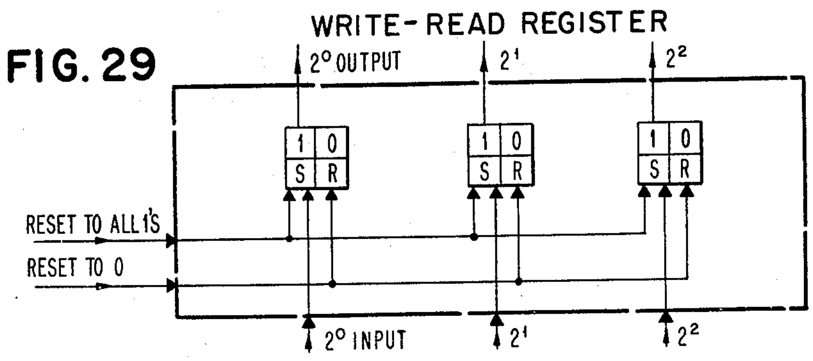

FIGURE 29 shows a write-read register. This register is reset to "0" by the application of a pulse to the flip-flop reset inputs; reset to all "1's" by the application of a pulse to all flip-flop set inputs; or reset to any other number by the application of pulses to the appropriate set and reset inputs of the flip-flops. A number is written into the register by the parallel application of pulses on the appropriate signal input leads. For example, if it were desired to write the number 101 into the register, the register would be previously reset to "0" and then a "1" signal would be applied on the $2^2$ and $2^0$ inputs. A "0" signal would be applied on the $2^1$ input. The register output, taken from the "1" outputs of the flip-flops, indicates the binary number stored in the register.

Figures 30, 31:
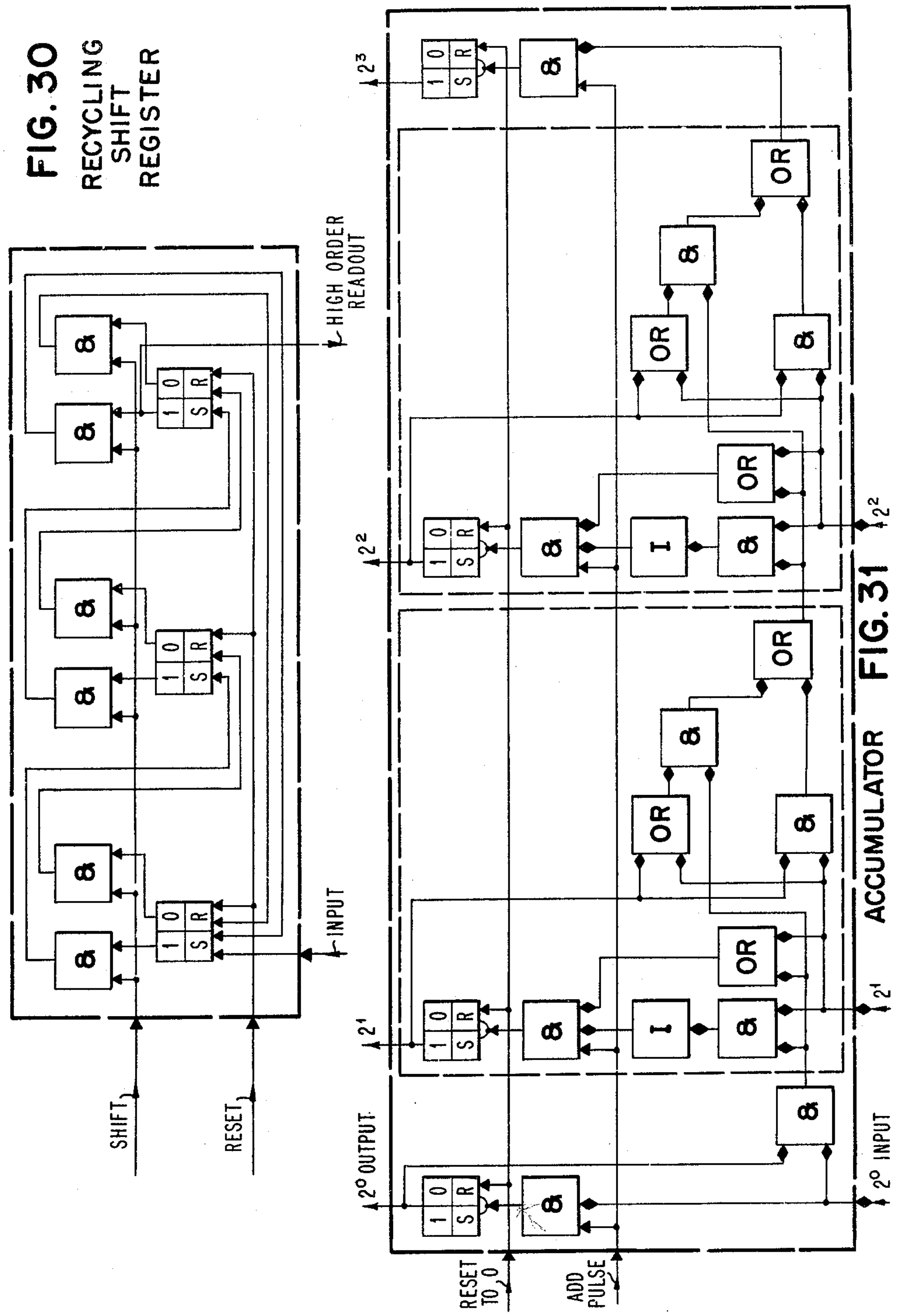

A recycling shift register is shown in FIGURE 30. This register is comprised of a group of shift register "sections" in tandem. The previously-cited R. K. Richard's text entitled Arithmetic Operations in Digital Computers contains an explanation of these and other shift register sections on pages 144–148. A reset input is applied to each flip-flop in the register. The data input to the shift register is applied serially to the set input of the lowest-order flip-flop. Shift pulses are applied to the shift register in between each input data bit. These pulses condition the "and" gates which cause the data stored in each flip-flop to be transferred to the next highest order flip-flop. Since this is a recycling shift register, the output of the highest output order flip-flop is fed back to the lowest-order flip-flop. In this manner, the data that is placed in the shift register is recycled by the application of subsequent shift pulses. A high order read-out is provided to indicate the highest order bit in the register. In this manner, data stored in the register can be read out serially merely by applying a succession of shift pulses.

An accumulator is shown in FIGURE 31. This accumulator is of the type shown on FIGURE 4–22 (page 110) and described in the previously cited R. K. Richard's text entitled Arithmetic Operation in Digital Computers. A reset input is applied to each flip-flop in the accumulator. The binary word (parallel) to be accumulated and an "add" pulse are applied simultaneously and the binary word is added to the previously stored sum. This circuit is explained in detail in the reference.

The subtracter shown on FIGURE 32 is similar to the subtracter shown and described in the previously-cited R. K. Richard's text entitled Arithmetic Operation in Digital Computers. The half subtracters shown on FIGURE 32 follow the binary subtraction table 4–III, on page 115 of the reference. The half adder shown on FIGURE 32 is identical to the circuit in the reference in FIGURE 4–3 (*c*) on page 86. FIGURE 32 shows only two stages of the subtracter in detail. The third stage is shown as a block which is presumed to include all the circuits in the second stage. Since the binary subtracter output indication for negative differences is in the complement form, the borrow from the highest order full subtracter indicates the sign of the difference—a "1" indicates a negative difference, a "0" indicates a positive difference.

FIGURE 33 shows an add-"1" register. This register may be reset to 0 by the application of a pulse to the reset input of each flip-flop. A number to be stored in the register is applied in parallel to the set inputs of the flip-flops in a manner similar to the write-read register in FIGURE 29. The add "1" register increases its total by "1" when a signal is applied on the add "1" input. In this respect, the add-1 register operates in a manner similar to the counter in FIGURE 26, as the "0" output of each flip-flop is applied as the "complement" input of the adjacent flip-flop.

A multiplier that is suitable to be used in the schematic diagrams is shown in FIGURE 5–1 (page 139) and explained in the previously cited R. K. Richard's text entitled Arithmetic Operation in Digital Computers.

FIGURE 34 is a functional diagram of an electronic embodiment of the invention. A specimen 201 on a matrix 203 is scanned by a flying-spot scanner 205. A phototube 207 develops a signal $f(x,y)$ indicative of the specimen. Any means of converting the specimen to electrical information could be used. In this case, the scanner and phototube illustrate one means of obtaining an electronic indication of the specimen.

The phototube 207 output is stored in two recycling shift registers 243 and 245. A clock 246 controls the timing of the circuits. At time "1*a*" a pulse is applied to the cycle control circuit 248 which supplies a series of cycling pulses to the shift registers 243 and 245 to sequentially shift the data in each register completely through the register and return the data to its original position. An "and" gate 255 and counter 257 develop the "zero-shift" autocorrelation function $D_S(0, 0)$ which is applied to a group of multipliers 303. At time "1*b*" a pulse is applied to appropriate "and" gates 313 to cause the normalized autocorrelation function of the references R1, R2 . . . R*n* . . . for $x'=0$, $y'=0$, designated $Z_{R1}(0, 0)$, $Z_{R2}(0, 0)$, . . ., $Z_{Rn}(0, 0)$ . . ., which are stored in register 299, to be applied to the appropriate multipliers 303. The products $$D_S(0,0)\cdot Z_{R1}(0,0), D_S(0,0)\cdot Z_{R2}(0,0)\ . . .$$

$D_S(0, 0)\cdot Z_{Rn}(0, 0)$, . . . are developed by the multipliers and applied to a group of accumulators 327. At time "1*c*," a pulse is applied to a shift control circuit 328, which causes the data in shift register 245 to be shifted one position. The shift registers are again recycled at time "2*a*" and the counter develops an output $D_S(1, 0)$ which at time "2*b*" is multiplied by $Z_{R1}(1, 0)$, $Z_{R2}(1,0)$, . . . $Z_{Rn}(1, 0)$, . . . to develop products $D_S(1, 0)\cdot Z_{R1}(1, 0)$, $D_S(1, 0)\cdot Z_{R2}(1, 0)$, . . ., $$D_S(1,0)\cdot Z_{Rn}(1,0), . . .$$

These products are applied to accumulators 327 where they are added to the previously stored products. In a similar manner, the remaining products are developed and applied to the accumulators. After all products have been developed, the accumulator outputs represent $$\sum_{x',y'} D_S(x',y')\cdot Z_R(x',y')$$

for each reference R. This sum has been previously defined as $S_{S,Rn}(x',y')$.

A maximum signal indicator 330 selects the largest accumulator output as an indication of the identity of the specimen or provides a "reject" indication if the ratio of the largest sum to the second largest sum is insufficient.

The maximum signal indicator produces a single ambiguous output for "6" or "9" which is applied to two "and" gates 401 and 403. Control signals from a flip-flop 405 condition one "and" gate and inhibit the other "and" gate to provide an unambiguous output indication.

Many unambiguous characteristics of the specimen or of a function of the specimen are available for use in discriminating between a "6" and a "9." In the embodiment shown in FIGURE 34, discrimination is based on the number of specimen bits scanned from the time of the first specimen bit ($t_i$) until an arbitrary later time ($t_i+11$). Specimens "6" and "9," if located in matrix 203 at the position in which the "6" is shown in FIGURE 34 provide the following binary data when scanned:

| | | | | | | | | | |
|---|---|---|---|---|---|---|---|---|---|
| 6 | 00000 | 00001 | 00010 | 00110 | 00101 | 00111 | 00000 | 00000 | 00000 |
| 9 | 00000 | 00111 | 00101 | 00011 | 00010 | 00100 | 00000 | 00000 | 00000 |

The first specimen bit for the "6" occurs at time 10 and the number of specimen bits occurring up to and including $t_{10+11}$ equals four. The first specimen bit for the "9" occurs at time 8 and the number of specimen bits occurring up to and including $t_{8+11}$ equals six. The bit counts are independent of the position of the specimens on the matrix because the count is terminated at time $t_{i+11}$ where $i$ is related to the occurrence of the first specimen bit.

In FIGURE 34, a register 407 stores a "4" corresponding to the bit count for a "6" from time 1 through time $i+11$. The output of "and" gate 255 during the first cycle of operation is merely the serial binary representation of the specimen because the shift registers 243 and 245 contain identical data. The first output bit from "and" gate 255 during the first cycle of operation (time $i$) is used to initiate a readout control circuit 411. This circuit generates a sample pulse at time $i+11$ to condition an "and" gate 413. The output of counter 257 then passes to a pair of comparison circuits 415 and 417 where counter output is compared to the reference numbers stored in registers 407 and 409. These comparisons determine the condition of flip-flop 405 which, in turn, causes either "and" gate 401 or "and" gate 403 to operate. Thus, the otherwise ambiguous identification of a "6" or "9" is made unambiguous by the use of an unambiguous characteristic of the specimen itself.

FIGURE 35 shows an electronic embodiment of a pattern identification device capable of identifying a 3 x 5 pattern 201 on a 5 x 9 matrix 203. The specimen 201 is serially scanned by a flying spot scanner 205 and a phototube 207. A book authored by V. K. Zworykin and E. G. Ramberg entitled Photoelectricity and its Application, 1949, published by John Wiley, QC715.Z8 describes a flying spot scanner and associated sweep circuits on pages 369–375.

The phototube output is presumed to be of sufficient amplitude to operate the subsequent circuitry. A photomultiplier or other suitable means of amplification is not shown as it is considered to be obvious to one skilled in the art to provide the necessary basic circuits to produce adequate signal levels. Similarly, no amplifiers are shown in any logic circuits, with the exception of circuit output drivers.

FIGURE 45 shows several waveshapes that pertain to the circuit shown in FIGURE 35. The waveshape labels correspond to similarly labelled points and leads on FIGURE 16.

A start pulse (waveshape A) initiates the operation of the pattern identification circuit. This pulse causes a single shot gate generator 209 to produce a conditioning gate on lead 211 that is one unit wide. One unit of time is defined as being the time between adjacent clock pulses (waveshape B). The first clock pulse occurring after start pulse A is thus passed through "and" gate 213 as waveshape C. This pulse serves several functions, one of which is to trigger the vertical sweep generator 204 which generates the vertical sweep (waveshape D) for the flying spot scanner 205. Since the matrix 203 is considered to have five discrete positions along each horizontal row, and nine discrete horizontal rows, the flying spot scanner sweeps horizontally nine times during each vertical sweep. Each horizontal sweep (waveshape F) is five units of time long. A five-pulse counter 215 provides a "1" output when registering a count of 0. This counter is reset to 0 by waveshape C. Another counter 217 which is also reset by waveshape C, provides a "1" output on lead 219 to "and" gate 221 when its count is lower than 8. Waveshape C triggers the first horizontal sweep for the scanner by setting counter 215 to 0, which provides a "1" output through "or" gate 223 to horizontal sweep generator 225. The fifth clock pulse B after waveshape C causes counter 215 to count past its maximum of four and the counter again registers 0, which provides a "1" output to start the second horizontal sweep (see waveshape E). In the same manner, the following horizontal sweeps are initiated. The beginning of the ninth horizontal sweep supplies the eighth pulse to counter 217 causing the counter to register 8, which terminates the conditioning gate ("1" output) for "and" gate 221. This terminates the scanner operation by causing 0 signal on lead 219 to inhibit "and" gate 221, which removes clock pulses B from the input of counter 215.

Waveshape C also sets flip-flop 227 (through "or" gate 223) which conditions "and" gate 229. Clock pulses which are delayed one-half unit by delay 231 are also applied to "and" gate 229. The clock pulses passed by this "and" gate (waveshape G) condition "and" gate 231 to enable it to pass the video output of the phototube 207 at intervals during the sweep of the scanner. Waveshape H shows the approximate video output of the phototube for the input specimen "3." The one-half unit delay 231 causes the phototube output to be sensed as the scanning beam is approximately at the center of each area of matrix 203. Waveshape I indicates the signal present at the output of "and" gate 231 for an input specimen "3."

A counter 233 is reset to "0" by waveshape C. This counter provides two outputs; one at a count of "44" and one at a count of "45." The 45th clock pulse passed by "and" gate 229 provides an output from counter 233 that resets flip-flop 227, thus inhibiting "and" gate 229 and preventing further passage of video by "and" gate 231. Since the counter 233 is read-out to reset flip-flop 227 at a count of "45" there are 45 intervals of time during which the flip-flop is set and "and" gate 229 is conditioned. The forty-five pulses from "and" gate 229 (waveshape G) are also applied to another "and" gate 235. The forty-fifth of these pulses is inhibited by waveshape K, which is a 1½ unit inhibit signal begun by the counter "read-out at 44" (waveshape J). The output of "and" gate 235 is delayed one-half unit by delay 237 to provide a pulse train (waveshape L) that is in phase with the clock pulses (waveshape B).

Two 45-position shift registers 243 and 245 are each reset by waveshape C. The 44 pulses in waveshape L are applied through "or" gates 247 and 249 to shift the registers 44 times. Since the shift pulses (waveshape L) are in phase with the clock pulses (waveshape B), the shifts occur between successive video pulses from "and" gate 231. Thus, one-half unit after the first video signal (from the first area of matrix 203) is passed through "and" gate 231 into the first positions of the shift registers 243 and 245, the first of the 44 shift pulses (waveshape L) shifts this data into the second order of each shift register. Another one-half unit later, the video signal corresponding to the second area of matrix 203 is placed into the lowest order of each shift register. After 44 successive shifts the 45 video representations of the discrete areas of matrix 203 are stored in each shift register.

Figure 36:
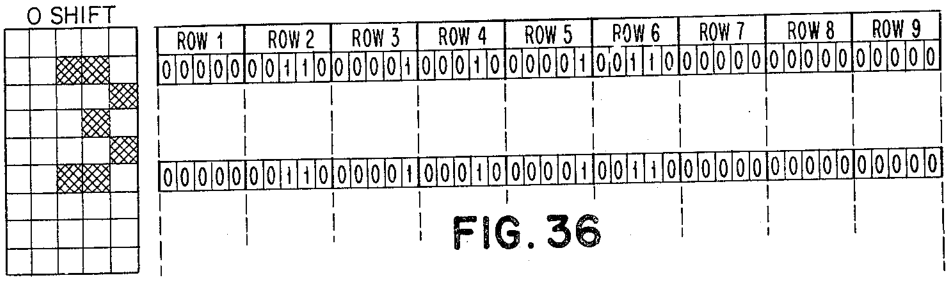
Figure 37:
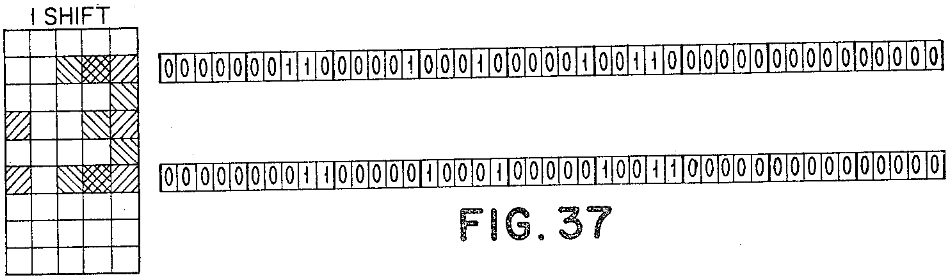
Figure 38:
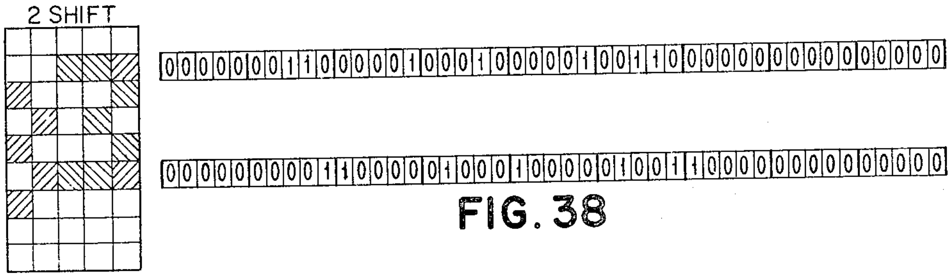
Figure 39:
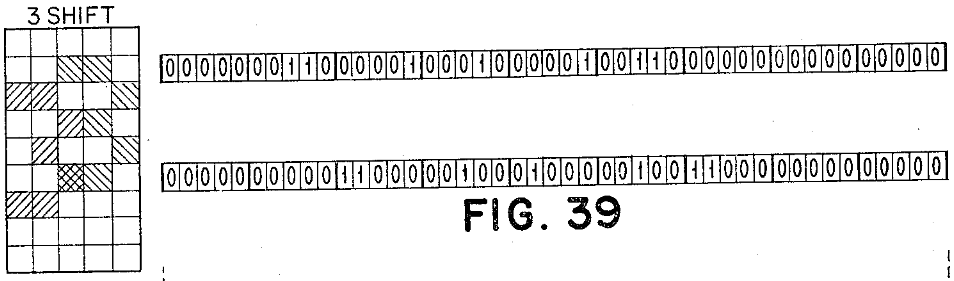
Figure 40:
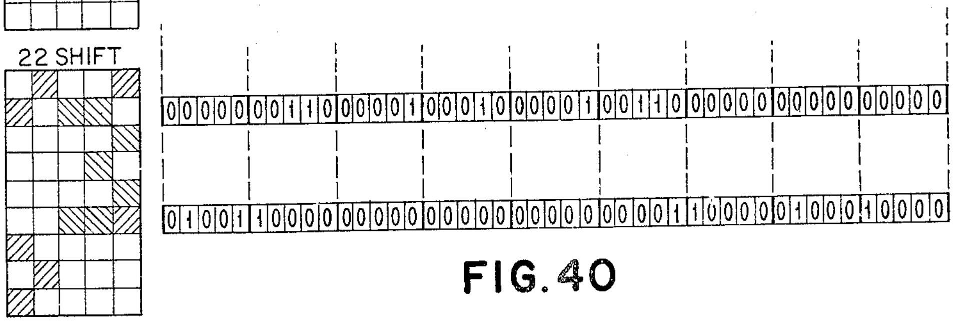

FIGURES 36–43 show the subsequent operation of the shift registers 243 and 245 and their associated circuitry in developing the autocorrelation sums. Following this paragraph will be a detailed electrical description of the operation of the shift registers. Each of FIGURES 36–43 show two 45-bit binary words indicating the bits stored in the shift registers 243 and 245 as the autocorrelation function is generated. The upper binary word is the same in all figures and represents the data in shifting register 243 corresponding to an uncentered input specimen "3" indicated on the matrices in FIGURES 36–43 by "slant-left" lines. The lower binary word indicates the data in shift register 245. This word is obtained by shifting the data in the upper binary word by the amount indicated. The shift registers described are the "closed" type, where bits in the last position of the register are shifted into the first position. The "slant-right" lines in the matrices show the positions of the shifted specimen "3" corresponding to the lower binary word. The bits in the upper word are compared with the bits in the lower word and a count made of the number of coincident bits. This count provides the data for the autocorrelation table of FIGURE 44. FIGURE 36 shows the condition of the shift registers during the initial operation, after being filled with the binary data pertaining to the input specimen "3" (as described in the last paragraph). There are seven coincidence bits, providing the "7" at the center (position 0) of FIGURE 44. FIGURE 37 shows the condition of the shift registers during the second operation—the lower binary word is shifted one position. This corresponds to shifting the input specimen to the right one unit. Note the shifted specimen (slant-right lines) on the matrix is partially on the left side of the matrix. There are now two coincident bits (bit number 4 in row 2 and bit number 4 in row 6), providing the "2" at position 1 of FIGURE 44. FIGURE 38 shows the conditions present after two shifts, indicating 0 coincident bits, providing the "0" at position "2" of FIGURE 44. As the shifting is continued (after three shifts) the shifted specimen takes the shape of the "3" on the left side of the matrix, one row lower than the unshifted (short-left lines on the matrix) specimen (FIGURE 39). After three shifts, there is one coincident bit (bit number 3 of row 6), providing the "1" at position 3 of FIGURE 44. Continued shifting provides the remainder of the data for the table in FIGURE 44. FIGURE 40 shows the conditions present after twenty-two shifts. The lower word in FIGURE 40 shows three bits (number 2 and 5 of row 1 and number 1 of row 2) that have entered the left end of the word from the right. The shifted specimen (slant-right lines) has begun to enter at the top of the matrix, corresponding to bits entering the left end of the lower word. There are no coincident bits after twenty-two shifts, providing a "0" at position 22 of the table in FIG- URE 44 (corresponding to shifting the specimen to the right two units and down four units). FIGURE 41 shows the conditions that would be present after twenty-three shifts, providing 0 coincident bits. This corresponds to a shift to the left two units and down five units, which is comparable to the shifting to the left two units and up four units, because the matrix has nine rows. On the matrix of FIGURE 41, bit 246 is shifted into bit 248 (left two units and down five units), and bit 250 is shifted into bit 252 (left two units and up four units). The choice of left two units and up four units was made to enable the data to be entered into the table of FIGURE 44 at position 23. The 23rd and all subsequent shifts provide data for the upper portion of the table of FIGURE 44. Due to symmetry of the table, this data is redundant. FIGURE 40 shows the conditions that would be present after 44 shifts, providing a "2" at position 44 of the table of FIGURE 44. Finally, FIGURE 43 shows that forty-five successive shifts would provide the same result as was obtained before shifting (FIGURE 36). The same autocorrelation results are obtained (FIGURE 44) by this method as were obtained (FIGURE 11) by the more straight forward method outlined with respect to FIGURES 3–10. If input specimens of size "$m$" by "$n$" are to be identified, the input matrix must be of size $2m-1$ by $2n-1$ (or larger).

Figure 35B:
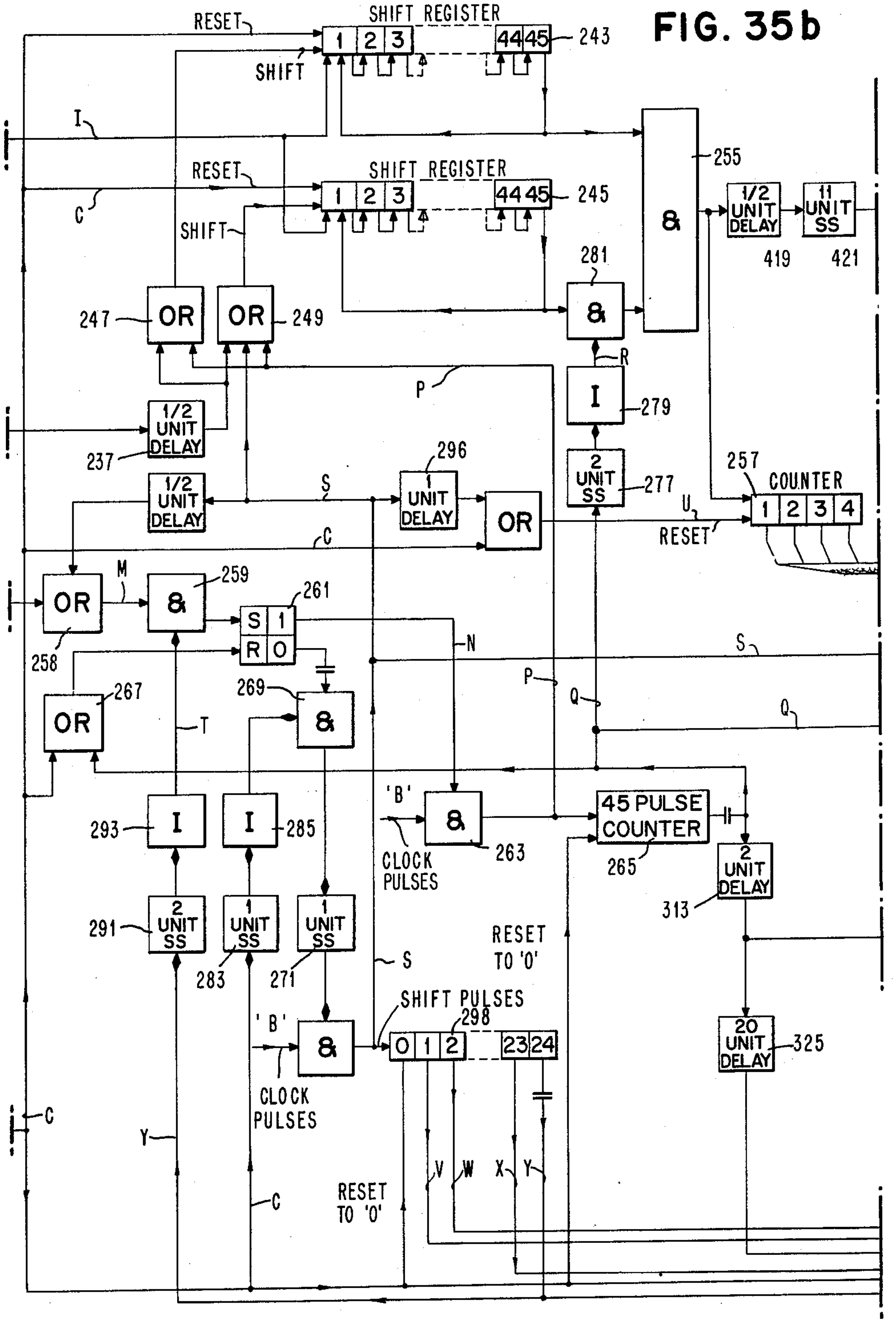

The operation of the shift registers and their associated circuitry to sequentially develop the 23 nonredundant sums indicated in the table of FIGURE 42 follows. The sums are accumulated in counter 257 (FIGURE 35*b*). The counter 233 "read-out at 45" is passed through "or" gate 258 (first pulse of waveshape M) and through "and" gate 259 to set flip-flop 261, which provides a conditioning signal (waveshape N) for "and" gate 263. The function of "and" gate 259 is explained below. The succeeding 45 clock pulses are passed through this "and" gate (waveshape P) and through "or" gates 247 and 249 to simultaneously shift each register 243 and 245 forty-five times. Since the output of the 45th position of storage is fed-back to the first position of storage in each shift register, each register returns to its initial condition after the 45 successive shifts. As the registers are shifted, an "and" gate 255 passes count pulse to counter 257 whenever the bits in the 45th order of the registers are "1's." Since identical video data was applied to both shift registers, the counter 257 records the sum of video bits during this stage of operation. The operation of two-unit single shot 277, inverter 279 and "and" gate 281 is explained below.

A 45-pulse counter 265 provides an output waveshape Q which is fed through "or" gate 267 to reset flip-flop 261, thus inhibiting the operation of "and" gate 263 after 45 pulses have passed. As flip-flop 261 is reset, a pulse is applied through "and" gate 269 one-unit single shot 271. The output of this single-shot conditions "and" gate 273 which passes the subsequent clock pulse. "And" gate 269 is inhibited for one unit of time after the occurrence of waveshape C through the action of one unit single shot 283 and inverter 285. This insures that no signal (waveshape S) will be generated when flip-flop 261 is initially reset (by waveshape C).

Waveshape S is applied through "or" gate 249 to shift the data in shift register 245 one position. This corresponds to shifting the pattern 201 on matrix 203 one unit as explained above. Waveshape S is also applied through a one-half unit delay 287, "or" gate 258, and "and" gate 259 to set flip-flop 261 for the second phase of operation (waveshape N). Delay 287 insures that the flip-flop 261 is not reset before register 245 is shifted. Thus, the registers 243 and 245 are shifted 45 times to cause a sum of coincidence of "1" signals to be accumulated in counter 257, then counter 245 is shifted one position, and each counter is again shifted 45 times. In this manner, the autocorrelation sums (FIGURE 44) are sequentially obtained.

Waveshape S also conditions "and" gate 295 to pass the accumulated total in counter 257 to the subsequent stages and after a delay of one unit in delay 296 resets counter 257 (waveshape U). This delay 296 insures that the counter 257 output will be passed to the subsequent stages before the counter is reset.

The output of the 45-pulse counter 265 (waveshape Q) initiates the operation of a two unit single shot 277 which provides a positive gate to inverter 279. The inverter output (waveshape R) inhibits the operation of "and" gate 281 during the time that shift register 245 is shifted one unit (by waveshape S). This prevents a possibly erroneous signal from being applied through "and" gate 255 to counter 257 during this shift.

A ring counter 298 provides timing for the subsequent circuits. This counter provides a "1" output on only one output lead at a time. The counter is set to its zero output by waveshape C. An output is developed from its first stage (waveshape V) after the first occurrence of waveshape S. Successive inputs step the counter through its 24 positions. Waveshape W is developed by the second input to the ring counter; waveshape X by the 23rd input; and waveshape Y by the 24th input. One of the functions of waveshape Y is to trigger 2-unit single-shot 291 which provides an output through inverter 293 to inhibit "and" gate 259 (waveshape T). This stops the automatic recycling of flip-flop 261 and shift registers 243 and 245 after 23 input character shifts have been completed.

The sums accumulated in counter 257 are passed through "and" gate 295 at the appropriate time to register 297. The number stored in this register is simultaneously multiplied by multiplier 303 by a number stored in one read-only register 299 of each of the nine 23-register groups 301. The first number stored in register 297 is multiplied by the number stored in the "1" register —0 299 in "1" multiplier 303. This product is stored in the "1" accumulator 327. At the same time, "2" multiplier 303 multiplies the number stored in register 297 by the number stored in "2" register —0 299 and applies the product to the "2" accumulator 327. Simultaneously, the number stored in register 297 is multiplied by the number stored in the appropriate registers 299 and the products stored in the appropriate accumulator 327. The second number stored developed by counter 257, indicating the autocorrelation sum for a shift of one unit, is subsequently stored in register 297 and simultaneously multiplied by the number stored in "1" register —1, "2" register —1, etc. through "0" register —1. Nine multipliers are used in this embodiment; one for each of the characters to be identified. (One multiplier serves for both "6" and "9"). If serial multiplications were to be used, only one multiplier would be needed. Since 23 individual autocorrelation sums are computed when a 5 x 9 matrix is used; 23 registers 299 are used in each group 301. The numbers stored in registers 299 are indicated in the tables in FIGURE 12. Either the normalized autocorrelation function numbers or the normalized "second-difference" autocorrelation function numbers may be stored in registers 299. The appropriate numbers for storage in the registers are dependent upon the order of generation of sums in counter 257 by the circuit of FIGURE 35*a–b*. FIGURE 44 shows the autocorrelation function for the pattern "3" with its elements labelled "0," "1," "2," etc., through "44," indicating their order of generation. The number labelled "0" is placed in "3" register —0, the number labelled "1" is placed in "3" register —1, etc. through "22" which is placed in "3" register —22. All numbers must be doubled except the numbers placed in the "1" register —0, "2" register —0, etc., through "0" register —0 to account for the reflected numbers corresponding to 23, 24, 25, etc., through 44 shifts which are not developed by the circuit of FIGURE 35 as they are the same as the numbers developed by the first 22 shifts. The data in FIGURE 44 must be normalized for autocorrelation function comparison. When "second-difference" discrimination is used, the data must reflect this operator. "And" gates 313 are provided to select the appropriate registers 299. The ring counter 298 controls the timing of the operation of "and" gates 323, insuring that the numbers in the "1" register —0, "2" register —0, etc. are applied to the multipliers 303 after generation of the 0-shift autocorrelation sum; the numbers in the "1" register —1, "2" register —1, etc. are applied after generation of the 1-shift autocorrelation sum; etc., until finally, the numbers in the "1" register —22, "2" register —22, etc. are applied after the 22-shift (final) autocorrelation sum is obtained. Waveshape Q resets register 297 one unit of time before waveshape S conditions "and" gate 295 to pass the accumulated sum from counter 257 to the register. One unit of time later than waveshape S (due to the two unit delay 313 operating on waveshape Q), a 30-unit single shot 315 provides a conditioning level (waveshape Z) to "and" gate 317. The multiplier outputs are added to the associated accumulators 327 twenty units of time after "and" gate 317 is conditioned due to the action of delay 325. This delay provides time for the multipliers to develop their outputs. The twenty-fourth sum (caused by the twenty-third shift) accumulated in counter 257 is not used. Its development is automatic due to the use of a 24 level ring counter 298. This sum is disregarded because only 23 autocorrelations sums are needed with a 5 x 9 input matrix 203. This sum is passed by "and" gate 317 to the multiplier, but there are no registers to provide the second factor required for multiplication, so the product is zero and does not affect the sums in accumulators 327.

Figure 35C:
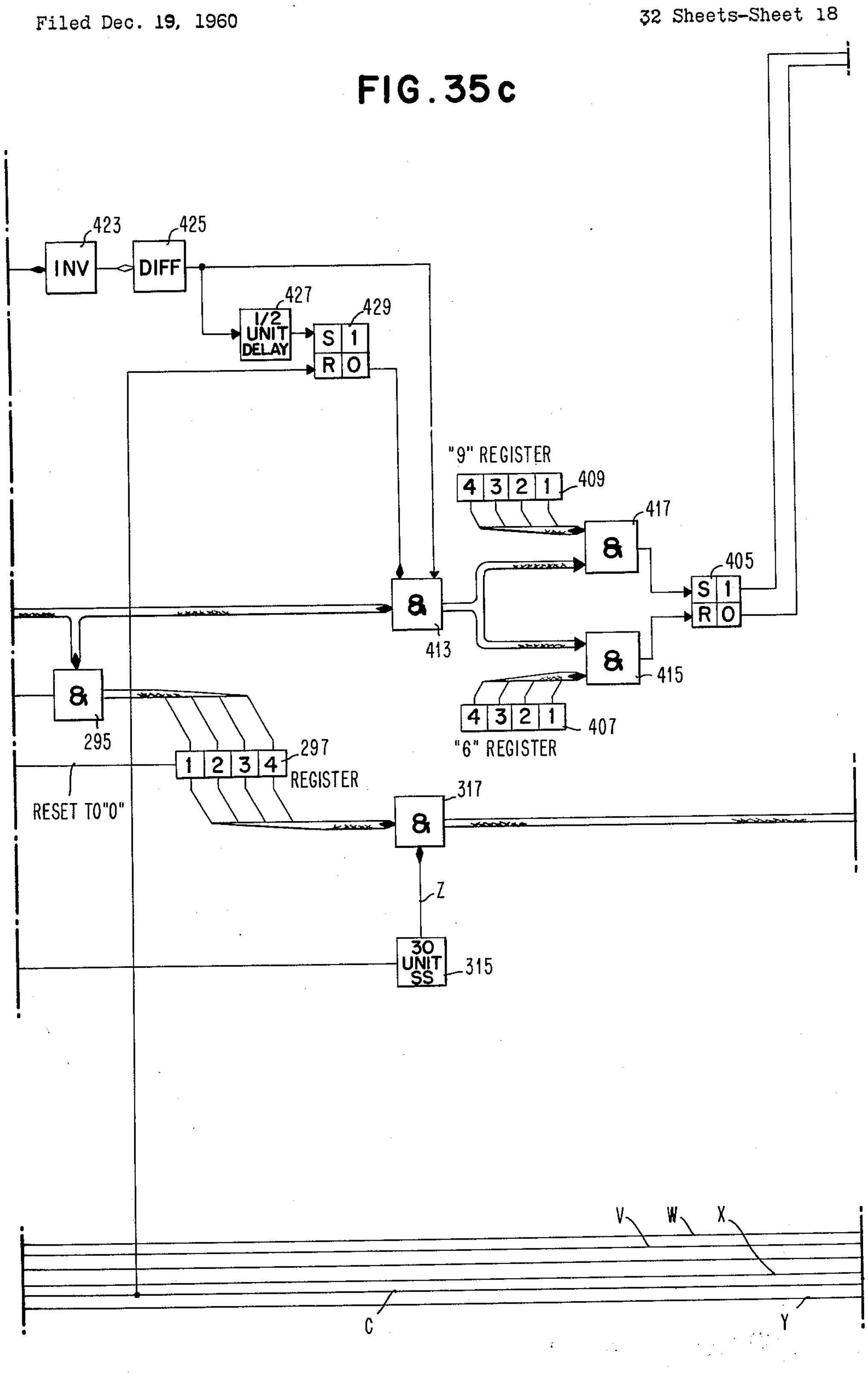
Figure 35D:
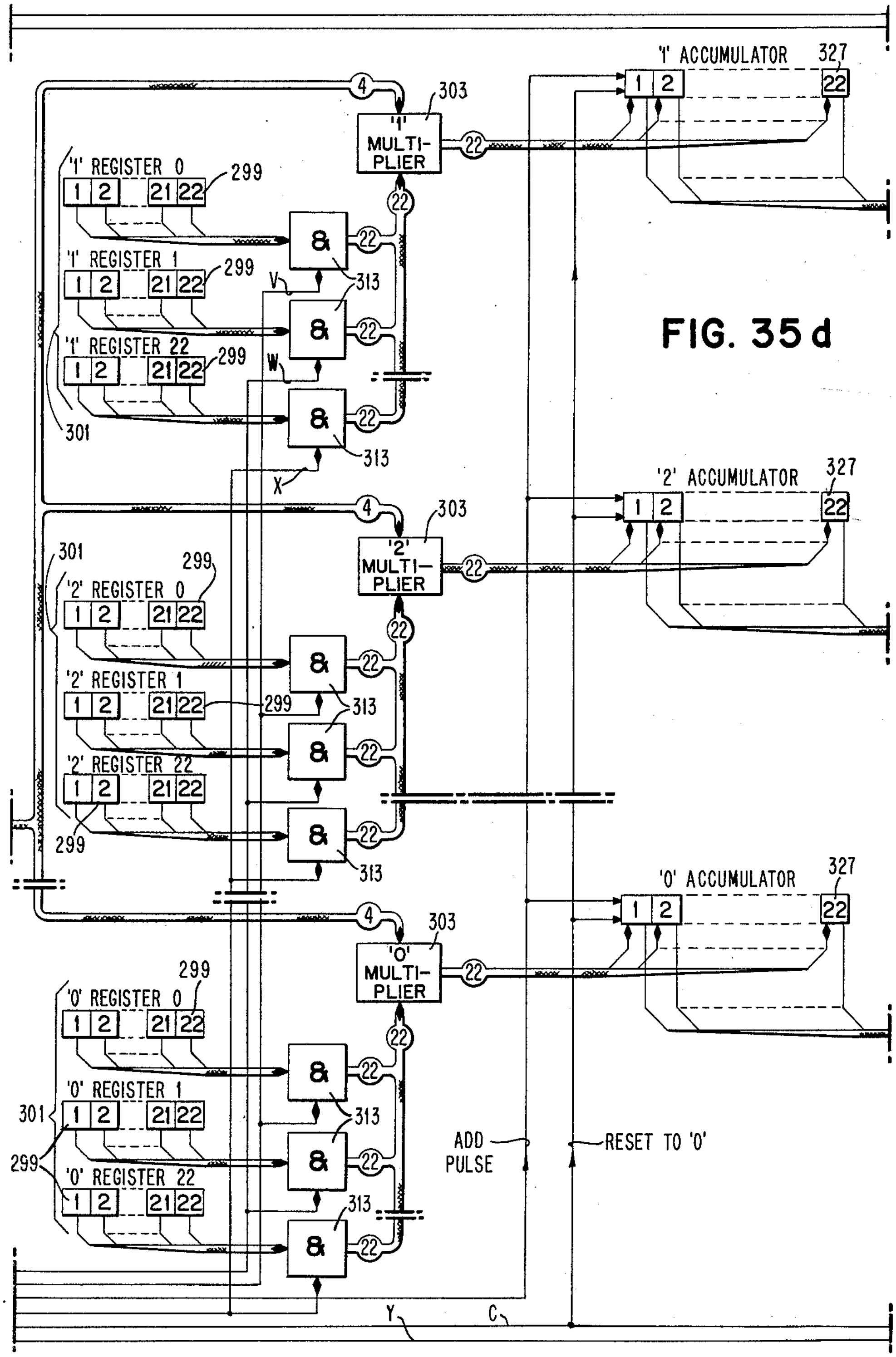
Figure 35E:
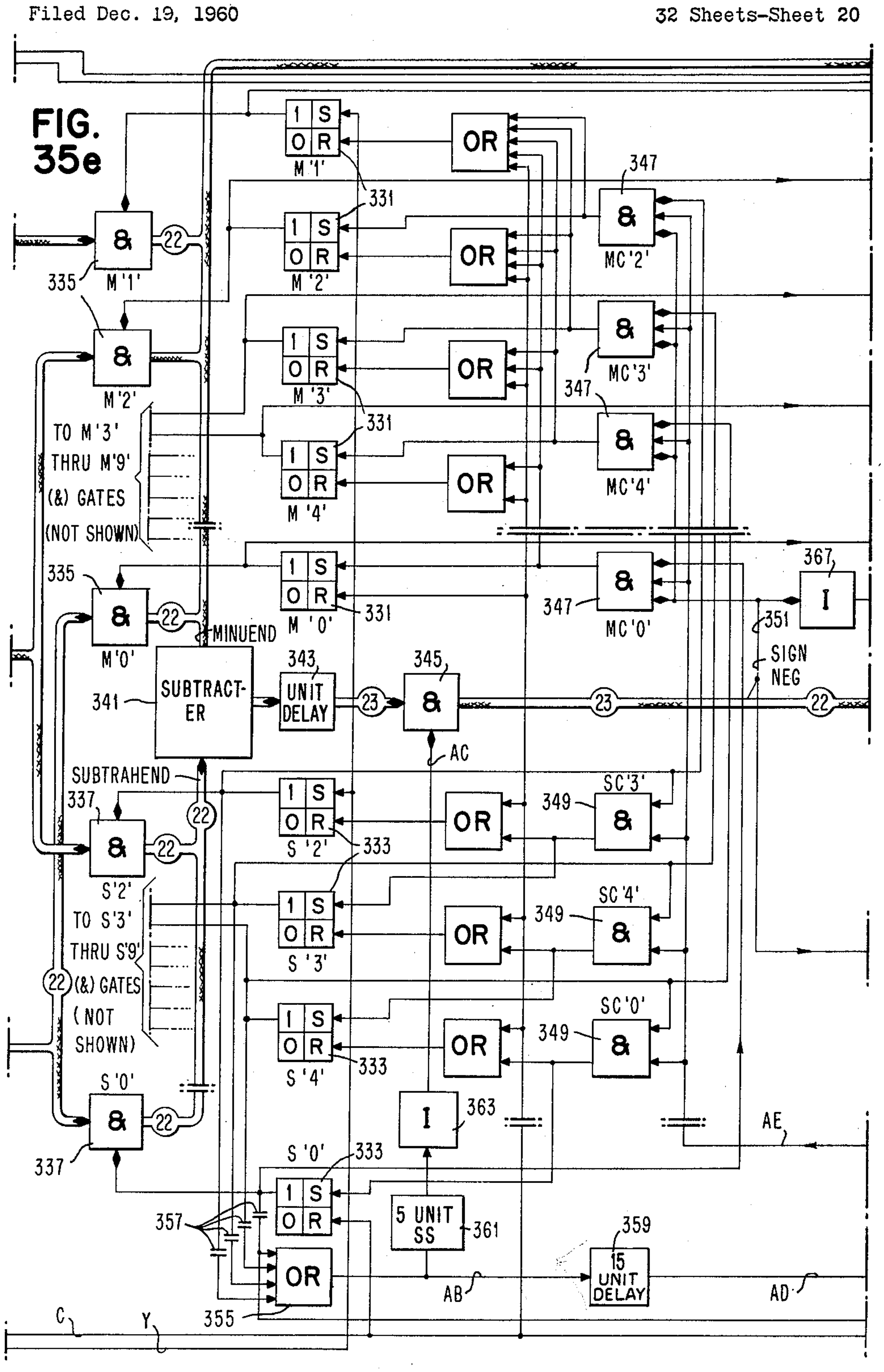
Figure 35F:
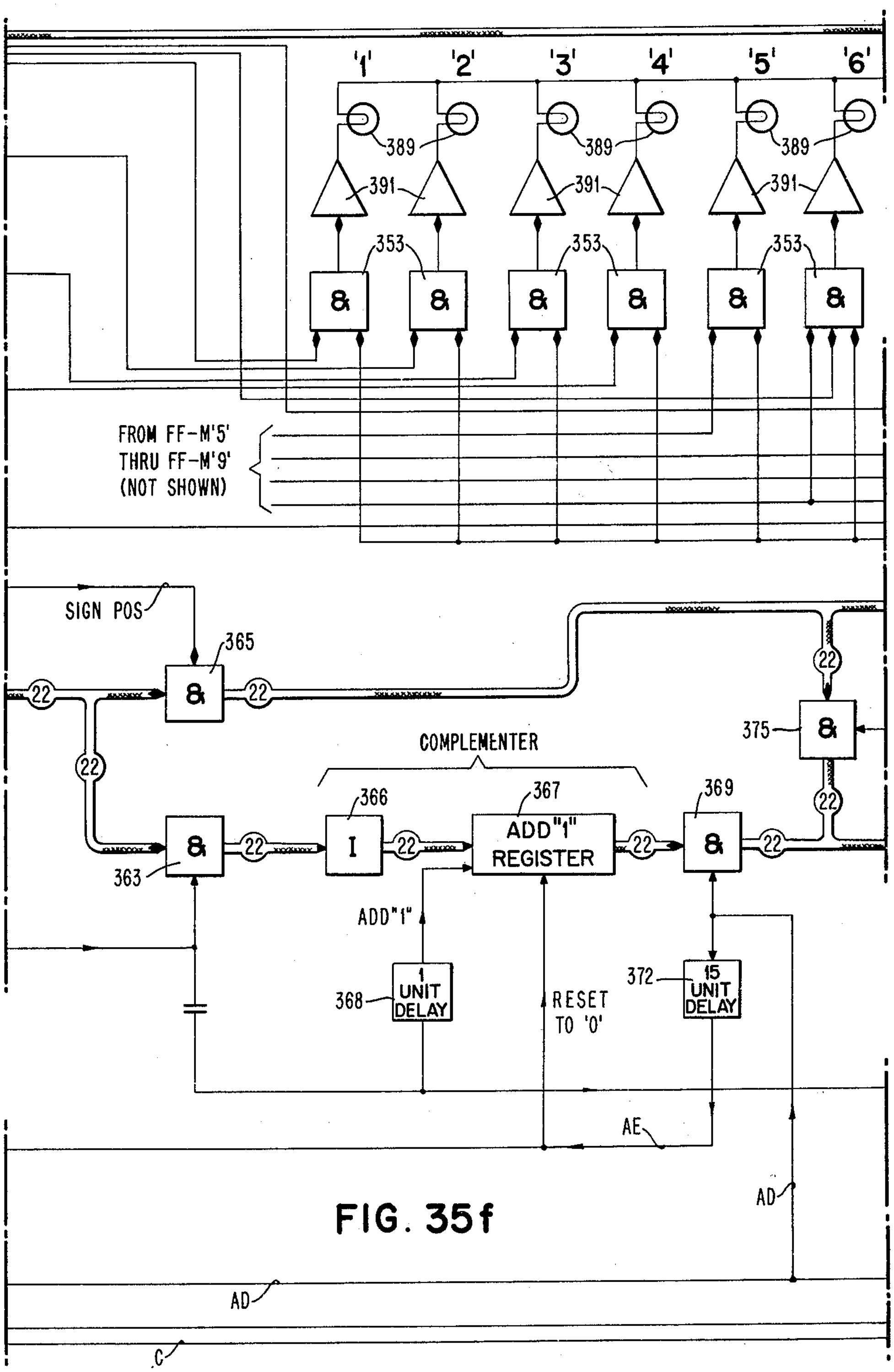
Figure 35G:
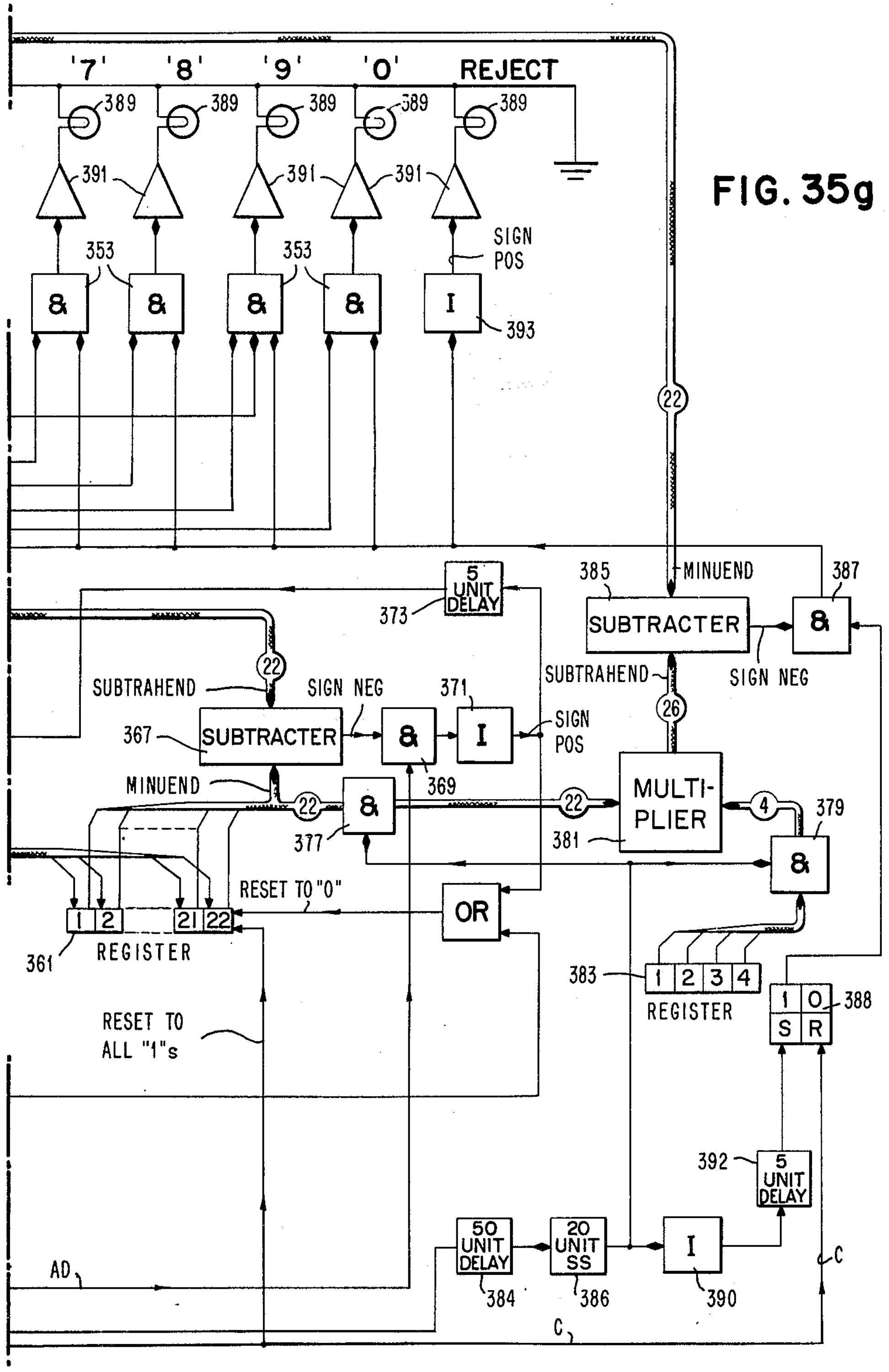

The maximum signal indicator circuits on FIGURES 35*e*, 35*f*, and 35*g* have two functions: first, to determine which accumulator 327 has the largest sum after the termination of the multiplications and second, to indicate whether the difference between the largest accumulated number and the next largest accumulated number is sufficiently great to indicate definite, unambiguous, identification.

This determination is made on a ratio basis—a reject is indicated when the second-largest accumulated sum is within a pre-established percentage of the largest accumulated sum. Nine minuend flip-flops 331 and eight subtrahend flip-flops 333 control nine minuend "and" gates 335, and eight subtrahend "and" gates 337 respectively. (No "6" circuits are used; the "9" circuits operate for "6" or "9"). A subtractor 341 sequentially compared the numbers in the accumulators 327, under the control of the minuend and subtrahend "and" gates 335 and 337. During the first subtraction, the number stored in the "2" accumulator is subtracted from the number stored in the "1" accumulator. If the subtrahend is smaller than the minuend (providing a positive difference), the subtrahend is replaced by the number stored in the "3" accumulator. This is continued until a subtrahend larger than the minuend develops a negative difference from the subtrahend. If this occurs, the number in the subtrahend is placed in the minuend and the subtrahend contains the number stored in the next-higher-numbered accumulator. For example, if the "1" accumulator contains a number larger than the "2" accumulator, but smaller than the "3" accumulator, during the first subtraction the number in the "2" accumulator is subtracted from the number in the "1" accumulator, indicating a positive difference. The number in the "3" accumulator then becomes the subtrahend of a second subtraction from the number in the "1" accumulator. Since this subtraction provides a negative difference, the third subtraction uses the number in the "3" accumulator as the minuend and the number in the "4" accumulator as the subtrahend. This continues until the number in the "0" accumulator is the subtrahend of a subtraction from a number from one of the other accumulators. Since each subtraction that provides a negative remainder causes the subtrahend to become the minuend of the subsequent subtraction, the number in the minuend (after all subtractions are completed) is the largest number in the accumulators 327.

This procedure is accomplished in the circuity of FIGURE 35*e* in the following manner. Waveshape Y from the 24th element of ring counter 298 sets the M"1" and S"2" flip-flops 331 and 333 which have outputs which condition the M"1" and S"2" "and" gates 335 and 337. These two "and" gates apply the number in the "1" accumulator 327 to the minuend input of subtracter 341 and the number in the "2" accumulator 327 to the subtrahend input of the subtracter. The subtracter output is applied through a one unit delay 343 and an "and" gate 345 to the subsequent circuits. The operation of the one unit delay and "and" gate will be explained below. Waveshape AE which is developed in the subsequent circuitry provides a pulse to the circuits of FIGURE 35 to indicate that the operations of the subsequent circuitry are completed and the next subtraction is to take place. The generation of waveshape AE will be explained below. The minuend and subtrahend of the next subtraction depends upon whether the result of the previous subtraction was positive or negative. The output of the S"2" flip-flop 333 is applied to the MC"2" (minuend control) "and" gate 347 and the SC"3" (subtrahend control) "and" gate 349. Waveshape AE is applied to all "and" gates 347 and "and" gates 349. The "sign-negative" lead 351 is applied to all "and" gates 347. The MC"2" "and" gate 347 is conditioned only when the difference of the previous subtraction is negative. Regardless of the sign of the difference of the previous subtraction, SC"3" "and" gate is conditioned. This output sets the S"3" flip-flop 333 and resets the S"2" flip-flop 333. This causes the subsequent subtraction to use the next subtrahend in order. If the difference of any subtraction is negative, in addition to substituting subtrahends, a new minuend is provided. The new minuend is the subtrahend of the previous subtraction, as explained above. In this case, the substitution of minuends is caused by the operation of the MC"1" "and" gate 347 when a negative sign is developed by the first subtraction. This operation continues as described above until the S"0" flip-flop 333 is set, causing the number in the "0" accumulator 327 to be used as a subtrahend of the subtraction. If this subtraction provides a positive difference indicating that the minuend is larger than the subtrahend, the minuend flip-flop 331 that is set during this subtraction provides an indication of the largest number in the accumulators 327. If the remainder of the last subtraction is negative, the S"0" flip-flop 333 output, the sign negative signal on lead 351 and waveshape AE cause the MC"0" "and" gate 347 to set minuend flip-flop M"0." Each minuend "and" gate 347 output in addition to setting the appropriate minuend flip-flop 331, provides a reset signal to all lower order minuend flip-flops 331. All minuend flip-flops 331 and subtrahend flip-flop 333 are initially reset by waveshape C. Each minuend flip-flop 331 provides a "1" output to one of "and" gates 353 as an indication of the accumulator 327 having the highest number stored (FIGURES 35*f* and 35*g*).

"Or" gate 355 (FIGURE 35*e*) has a pulse output (waveshape AB) as any subtrahend flip-flop 333 is set. The output of the subtrahend flip-flops is converted into a pulse by the operation of capacitors 357. This output is applied through a 15 unit delay 359 to the subsequent circuitry on FIGURE 35*f* and also to 5-unit single-shot 361. The output gate of this single-shot is applied through inverter 363 as waveshape AC to inhibit "and" gate 345. The 5-unit single-shot and associated circuitry inhibits the subtracter output during the time that it is developing its output. One unit delay circuit 343 overcomes the effect of the inherent delays of "or" gate 355, 5-unit single-shot 361, and inverter 363, insuring that the subtracter output will be inhibited until completely developed.

A comparison circuit, shown primarily on FIGURES 35f and 35g, detects the difference between the largest and second largest sums in accumulators 327 (FIGURE 35d), and indicates a reject if the ratio between these numbers is insufficient. As each subtraction is performed by subtracter 341, the difference obtained is compared to a difference obtained by previous subtraction and the smaller of these differences is stored for the subsequent comparisons to be made from subsequent subtractions. If the output of subtracter 341 is negative, indicating the subtrahend to be larger than the minuend, the comparison circuit stores the output of subtracter 341. No comparison is necessary in this case, as the smallest difference from the largest number used as a minuend by subtracter 341 up to the time that a negative difference is detected is always the difference between the minuend and subtrahend of the subtraction that caused the negative difference. If, however, the output of subtracter 341 is positive, it is necessary for the comparison circuit to store the difference of this subtraction only if this difference is smaller than any previous difference from the same minuend in subtracter 341. A register 361 (FIGURE 35g) is used as a storage element for the comparison circuit. If the output of subtracter 341 is negative, "and" gate 363 (FIGURE 35f) passes this output to a complementer comprised of a bank of inverters 366 (one for each bit of the twenty-two bit data) and an add "one" register 367. The complementer is necessary because the output of substracter 341 is in the complement form when negative. It is well known that to convert a number in the "2's" complement to the actual number, it is necessary to invert each bit and add one. The addition of "1" occurs one unit of time after the subtracters 341 output is passed through "and" gate 345 due to the operation of 1-unit delay 368. This delay provides sufficient time for the register 367 to accept its input from inverters 366. The output of the "add-1" register 367 is passed through "and" gate 369 to register 361 at the occurrence of waveshape AD which occurs 15 units of time after waveshape AB due to the operation of delay 369. This delay provides adequate time for the addition of "1" in register 367. Waveshape AE occurs 15 units of time after waveshape AD due to delay 372 and is used to reset register 367 and the previously discussed "and" gate 347 and 349 (FIGURE 35e). If the output of subtracter 341 is positive, "and" gate 365 (FIGURE 35f) is used to pass the subtracter output to the comparison circuit. "And" gate 365 requires a "sign-positive" input which is developed by inverter 367 (FIGURE 35e) from the "sign-negative" output of the subtracter. The output of "and" gate 365 is applied to a subtracter 367 where it is the subtrahend of the subtraction from the number previously stored in register 361. Waveshape C resets register 361 to all "1's" before it is used in the comparison circuits. The only output of subtracter 367 that is used is the sign bit. At the occurrence of waveshape AD, "and" gate 369 passes this output to inverter 371 which generates a "1" signal if the sign of the subtraction is positive. A positive sign at the output of inverter 371 indicates that the new difference obtained from subtracter 341 (FIGURE 35e) is smaller than the number stored in register 361 (FIGURE 35g). This output is delayed by five-unit delay 373 and applied to condition "and" gate 375 (FIGURE 35f). Delay 373 provides adequate time for register 361 to be reset to "0" before storing the new number. "And" gate 375 then passes the output of subtracter 341 to register 361. After all subtractions in subtracter 341 have been terminated, register 361 maintains the difference between the largest and second largest sums at accumulator 327. Then, the ratio between the largest and second largest sums is calculated and a determination made whether to accept the largest sum as an indication of the input specimen or to indicate a reject. Multiplier 381 develops the product of the number stored in register 361 and a constant stored in register 383. The multiplier inputs are applied for 20 units of time beginning 50 units of time after the S-"9" flip-flops 333 (FIGURE 35f) is set due to the action of delay 384 and single-shot 386. The delay provides adequate time for the last subtraction in subtracter 341 (FIGURE 35f) and stabilization of the comparison circuits on FIGURES 35f and 35g; the single-shot 386 provides sufficient time for multiplier 381 operation. The result of this multiplication is used as the subtrahend of the subtraction in subtracter 385 from the largest sum in accumulators 327. The only output of subtracter 385 that is used is the sign of the difference. If this sign is negative, indicating that the difference stored in register 361 is larger (after multiplication by the constant stored in register 383) than the largest sum in accumulators 327, reject is indicated. The "sign-negative" output of subtracter 385 is passed by "and" gate 387 to "and" gates 353 to condition them, providing an indication of the input specimen by way of lighting one of lamps 389. Flip-flop 388, provides the conditioning signal for "and" gate 387 while it is set. The flip-flop is set five units of time after the termination of the multiplier conditioning gate generated by single-shot 386 due to the action of inverter 390 and delay 392. The flip-flop is reset by waveshape C. Amplifiers 391 provide the required power to operate the lamps. If the output of subtracter 385 is positive indicating an insufficient difference between the largest and second largest sums in accumulators 327, the output of "and" gate 387 inhibits the operation of "and" gates 353. In this case, inverter 393 (FIGURE 35g) provides a "1" output to operate the reject lamp.

When the M "9" flip-flop 331 is set, a conditioning signal is applied to both the "6" and "9" "and" gates 353. These "and" gates have a third input under the control of a flip-flop 405 (FIGURE 35c). A "9" is indicated when flip flop 405 is set; a "6" when reset. The unambiguous control function circuits that distinguish a "6" from a "9" are predominately shown in FIGURE 35c. The output of "and" gate 255 is applied through a ½ unit delay 419 to trigger an 11-unit single shot circuit 421 (FIGURE 35b). The single shot circuit generates a positive gate which is applied through an inverter 423 as a negative gate to a differentiator 425. The differentiator output consists of a negative pulse when the single shot is triggered and a positive pulse at the termination of its output gate. The positive pulse which is generated eleven units of time after the single shot is triggered is applied through a ½ unit delay 427 to set a flip-flop 429. This flip-flop is reset at time 0 by waveshape C and this provides a positive level from its "1" output from time 0 until 11½ units of time after the single shot 421 is triggered. Since the single shot is triggered ½ unit of time after the first "and" gate 255 output, the flip-flop provides a positive level at its "0" output from time 0 until 12½ units of time after the first output pulse from "and" gate 255. This positive level is applied to condition an "and" gate 413 which passes the counter 257 (FIGURE 39b) output to two "and" gates 415 and 417. The third input to "and" gate 413 is a pulse from differentiator 425 occurring 11½ units of time after the first output pulse from "and" gate 255. The purpose of the delay 427 and the flip-flop 429 is to permit the output of inverter 257 to pass to "and" gates 415 and 417 during the first cycle of operation of the shift registers 243 and 245. During this cycle of operation, the counter 257 is merely summing the bits comprising the specimen. Therefore the "and" gate 413 passes the specimen bit count at a time $i+11\frac{1}{2}$ (where the first specimen bit occurs at time $i$). The "and" gates 415 and 417 compare the specimen bit count with reference pattern bit counts stored in two registers 415 and 417 to control the operation of flip-flop 405 which, in turn, provides signals to distinguish between "6" and "9." Register 407 stores 0100 (corresponding to a four-bit count for a "6") and register 407 stores 0110 (corresponding to a six-bit count for a "9").

The control circuits for removing the ambiguity between a "6" and a "9" in the embodiment described above are controlled by a simple function of the specimen itself: the number of specimen bits up to and including 11 units of time after the occurrence of the first specimen bit. Many other unambiguous functions are available. It is not necessary to generate the control function during the first cycle of operation as the elements of the autocorrelation function are generated unambiguously during the subsequent cycles. Only the final autocorrelation function elements are ambiguous.

The embodiment described above provides one means of unambiguously identifying specimens while retaining the advantages of autocorrelation function comparison.

A functional diagram of a second embodiment of the invention is shown in FIGURE 46. This embodiment is similar in many respects to the embodiment shown in FIGURE 34, in that both embodiments show a specimen identification system utilizing autocorrelation function comparison and include a circuit to distinguish between a "6" and a "9." Similar circuits are labelled with the same reference numbers in FIGURES 34 and 46. In the first embodiment, each element of the autocorrelation function of the specimen is completely generated in sequence. In the second embodiment the elements of the function are generated simultaneously resulting in a higher speed system.

The autocorrelation function of the specimen is generated serially in the embodiment in FIGURE 46. The phototube 207 output is applied to a shift register 451 and as the specimen is scanned, the shift register is filled in the same manner that shift registers 243 and 245 (FIGURE 34) are filled. Shift register 451 is not of the recycling type used in the first embodiment, but rather shifts its data through and out of the highest (22nd) order. Twenty-three counters 453 are associated with the shift registers. One counter sums the unshifted specimen bits that are applied to the register. The remaining counters sum the outputs of associated "and" gates 455. Two inputs are applied to each "and" gate: the unshifted specimen bits and the output of an order of the shift register.

If the specimen bits that are serially applied to the input of the shift registers 451 are considered as a function of time where the first bit is scanned at time 1, the second bit at time 2, etc. through time 45, then the output of the phototube 207 equals $f(t)$; the output of the first order of the shift register equals $f(t+1)$; etc. through the output of the 22nd order of the register which equals $f(t+22)$. The counter outputs represent the sum of the products of $f(t)$ and $f(t+t')$ where $t'=0$, 1, 2, etc. through 22. These outputs, after a sufficient period of time, represent the elements of the autocorrelation function of the specimen and can be defined as:

$$D_S(t')=\sum_t f(t)f(t+t')$$

The elements of the autocorrelation function $D_S(t')$ of the specimen are multiplied in multipliers 457 by the corresponding elements of the autocorrelation patterns $D_R(t')$ of the reference patterns and all products pertaining to a particular reference pattern are summed in an accumulator 459. The elements of the autocorrelation patterns $D_R(t')$ of the reference patterns are stored in registers 460. The elements of the autocorrelation patterns of the reference patterns are modified to incorporate normalization factors, and if desired, an additional operator to provide identification based on a function of the autocorrelation function. Such a function can be a discriminating function such as the "second-difference" function or a smoothing function such as the averaging function. If the elements as modified, are defined as $Z_{Rn}(t')$ or $Y_{Rn}(t')$ which correspond to $Z_{Rn}(x',y')$ and $Y_{Rn}(x',y')$ which are previously defined, the multipliers and accumulators generate outputs:

$$S_{S,\,Rn}\sum_{t'} D_S(t')Z_{Rn}(t')$$

or:

$$S_{S,\,Rn}\sum_{t'} D_S(t')Y_{Rn}(t')$$

An output for each distinct reference R is thus generated and applied to the maximum signal indicator 330. (A single output for "6" and "9" is generated.) The maximum signal indicator provides an indication of the specimen. If the specimen is either a "6" or a "9," an ambiguous output indication is applied to "and" gates 401 and 403 which, in combination with their associated circuitry, provide an unambiguous indication of the identity of the specimen.

The ambiguity between a "6" and a "9" is removed by utilizing an unambiguity of the autocorrelation function that is present before the function is completely (ambiguously) generated. FIGURES 47 and 48 indicate the counter outputs at various times for sample specimens "6" and "9" respectively. The vertical scale represents time and the horizontal scale indicates the associated counter and is labelled $t'$ where $t=0$ pertains to the counter generating $D_S(0)$, $t'=1$ pertains to the counter generating $D_S(1)$, etc. The sample specimens "6" and "9" respectively are shown at random locations in a matrix.

A triangle is shown surrounding that portion of the charts during which the counter outputs ($t'$) may change. All counter outputs are zero until the first non-zero specimen bit is scanned. This occurs at time $i$ which in the case of the randomly located "6" occurs at time 10 and in the case of the "9," at time 22. Since the last non-zero bit of both the "6" and "0" occurs twenty times units after the first non-zero bit, the autocorrelation function elements are completely generated at time $i+20$ (time 25 for the "6" and time 42 for the "9"). Twenty three counters are provided to account for 3 x 5 specimens which have their upper-left and lower right corners filled, such as the specimen "8" (FIGURE 12$c$). The vertical location of the triangles in FIGURES 47 and 48 is dependent upon the location of the specimen on the matrix.

The autocorrelation functions for the "6" and "9" are ambiguous when completely generated. The incomplete functions shown within the triangles are unambiguous and suggest a variety of methods for distinguishing between the specimens. For example, at time $i+10$, the output of counter 2 is zero for a "6" and 2 for a "9." This distinction can be used to distinguish between specimens. The system shown in FIGURE 46 samples the output of counter 0 at time $i+11$ and identifies the specimen as a "6" if the counter output equals four and as a "9" if the counter output equals six. A readout control circuit 411 conditions an "and" gate 413 to pass the counter output to two comparison circuits 415 and 417 in the manner described with respect to FIGURE 34.

Two embodiments of specimen identification systems utilizing autocorrelation function comparison have been shown and described as examples of methods and apparatus for overcoming ambiguity in systems using ambiguous function generation. In both embodiments an unambiguous characteristic or function of the input specimen is used to distinguish between specimens whose autocorrelation functions are ambiguous. In the first embodiment, the autocorrelation function of the specimen is generated element by element; in the second embodiment the elements of the function are simultaneously generated. Both embodiments include circuits for utilizing an unambiguous characteristic of the input specimen or its autocorrelation function for distinguishing the specimens.

While the invention has been particularly shown and described with reference to preferred embodiments thereof, it will be understood by those skilled in the art that various changes in form and details may be made therein without departing from the spirit and scope of the invention.

What is claimed is:

1. An apparatus for generating an unambiguous output in a system that generates an ambiguous output function as a function of unambiguous intermediary functions of the applied input function comprising in combination: means for generating the unambiguous intermediary functions of the input function; means for generating a control function which function is dependent upon an unambiguous characteristic of an intermediary function; means for generating the ambiguous output function from the intermediary functions; and means responsive to the output function and the control function for generating an unambiguous output.

2. An apparatus for indicating the reference pattern that is similar to a specimen in a specimen identification system utilizing comparison of a function of the specimen $f(s)$ to functions of reference patterns $f(r)$ where at least one plurality of said functions of the reference patterns $f(r)$ are identical, comprising, in combination: means for generating said function of the specimen $f(s)$; means for comparing said function of the specimen $f(s)$ with said functions of reference patterns $f(r)$ to uniquely identify said specimen when the specimen is similar to a reference pattern whose function $f(r)$ is unique, and to ambiguously identify the specimen to be similar to one of a plurality of reference patterns having identical functions $f(r)$ when unique identification is not indicated; means for generating a second function of the specimen $f'(s)$ that is unique for all specimens that are similar to any reference pattern in a plurality of reference patterns having identical functions $f(r)$; and means for comparing said second function of the specimen $f'(s)$ with second functions $f'(r)$ of said identified plurality of reference patterns, to uniquely identify the specimen.

3. A specimen identification apparatus comprising, in combination: means for generating a function dependent upon the autocorrelation function of the specimen; means for comparing said function with functions dependent upon autocorelation functions of reference patterns to identify those specimens whose autocorrelation functions are unique; means for generating a unique second function dependent upon the specimen; and means for comparing said second function with unique second functions dependent upon those reference patterns having common autocorrelation functions.

4. A specimen identification apparatus comprising, in combination: means for generating a function dependent upon the autocorrelation function of the specimen; means for comparing said function with functions dependent upon autocorrelation functions of reference patterns to identify those specimens whose autocorrelation functions are unique; means for generating a unique second function dependent upon the autocorrelation function of the specimen; and means for comparing said second function with unique second functions dependent upon autocorrelation functions of those reference patterns having common autocorrelation functions.

5. A specimen identification apparatus comprising in combination: means for generating the autocorrelation function of the specimen; means for comparing said function with functions dependent upon autocorrelation functions of reference patterns to identify those specimens whose autocorrelation functions are unique; means for generating a unique second function dependent upon the specimen; and means for comparing said second function with unique second functions dependent upon those reference patterns having common autocorrelation functions.

6. A specimen identification apparatus comprising, in combination: means for generating the autocorrelation function of the specimen; means for comparing said function with functions dependent upon autocorrelation functions of reference patterns to identify those specimens whose autocorrelation functions are unique; means for generating a unique second function dependent upon the autocorrelation function of the specimen; and means for comparing said second function with unique second functions dependent upon autocorrelation functions of those reference patterns having common autocorrelation functions.

7. A specimen identification apparatus comprising, in combination: input means including a surface light scanning device and a light-sensitive device having an output f(x,y) indicative of the specimen; means for generating an autocorrelation function $D_S(x',y')$ of the specimen indication f(x,y); means for storing normalized autocorrelation functions $Z_R(x',y')$ of reference patterns R; means for developing the sums $$\sum_{x',y'} D_S(x',y')Z_R(x'y')$$

of the point-by-point products of the autocorrelation function of the specimen and the normalized autocorrelation functions of the reference patterns; maximum signal indicating means for providing an indication of the largest of the sums to identify the specimen when the specimen is similar to a reference pattern having a unique autocorrelation function; means for generating a second function of the specimen that is unique for all specimens that are similar to reference patterns that have a common autocorrelation function; means for comparing the second function of the specimen to second functions of the reference patterns; and means responsive to said maximum signal indicating means and said comparing means to identify the specimen when the specimen is similar to a reference pattern that does not have a unique autocorrelation function.

8. A specimen identification apparatus comprising, in combination: input means including a surface light scanning device and a light-sensitive device having an output $f(x,y)$ indicative of the specimen; means for generating an autocorrelation function $D_S(x',y')$ of the specimen indication $f(x,y)$; means for storing normalized "second-difference" autocorrelation functions $Y_R(x',y')$ of reference patterns R; means for developing the sums $$\sum_{x',y'} D_S(x',y')Y_R(x',y')$$

of the point-by-point products of the autocorrelation function of the specimen and the normalized "second-difference" autocorrelation functions $Y_R(x',y')$ of reference patterns R; maximum signal indicating means providing an indication of the largest of the sums to identify the specimen when the specimen is similar to a reference pattern having a unique autocorrelation function; means for generating a second function of the specimen that is unique for all specimens that are similar to reference patterns that have a common autocorrelation function; means for comparing the second function of the specimen to second functions of the reference patterns; and means responsive to said maximum signal indicating means and said comparing means to identify the specimen when the specimen is similar to a reference pattern that does not have a unique autocorrelation function.

9. A specimen identification apparatus comprising, in combination: means for generating electronic indications of discrete portions of the autocorrelation function of the specimen; means for storing electronic indications of corresponding discrete portions of normalized autocorrelation functions of reference patterns; means for accumulating the products of the portions of the autocorrelation functions of the specimen and the corresponding portions of the normalized autocorrelation functions of a reference, for each reference; maximum signal indicating means for indicating the largest accumulation to identify the specimen when the specimen is similar to a reference pattern having a unique autocorrelation function; means for generating a second function of the specimen that is unique for all specimens that are similar to reference patterns that have a common autocorrelation function; means for comparing the second function of the specimen to second functions of the reference patterns; and means responsive to said maximum signal indicating means and said comparing means to identify the specimen when the specimen is similar to a reference pattern that does not have a unique autocorrelation function.

10. A specimen identification apparatus comprising, in combination: means for generating electronic indications of discrete portions of the autocorrelation function of the specimen; means for storing electronic indications of corresponding discrete portions of normalized functions of autocorrelation functions of reference patterns; means for multiplying the portions of the autocorrelation function of the specimen by the corresponding portion of the normalized functions of autocorrelation function of each reference; means for accumulating the products of the portions of the autocorrelation functions of the specimen and the corresponding portions of the normalized functions of the autocorrelation function of a reference, for each reference; maximum signal indicating means for indicating the largest accumulation to identify the specimen when the specimen is similar to a reference pattern having a unique autocorrelation function; means for generating a second function of the specimen that is unique for all specimens that are similar to reference patterns that have a common autocorrelation function; means for comparing the second function of the specimen to second functions of the reference patterns; and means responsive to said maximum signal indicating means and said comparing means to identify the specimen when the specimen is similar to a reference pattern that does not have a unique autocorrelation function.

11. A specimen identification apparatus comprising, in combination: means for serially generating electronic indication of discrete portions of the autocorrelation function of the specimen; means for storing electronic indications of corresponding discrete portions of normalized discriminating functions of autocorrelation functions of reference patterns; means for multiplying each portion of the autocorrelation function of the specimen by the corresponding portion of the normalized discriminating functions of the autocorrelation function of each reference; means for accumulating the products of all portions of the autocorrelation function of the specimen and the corresponding portions of the normalized discriminating function of the autocorrelation function of a reference, for each reference; maximum signal indicating means for indicating the largest accumulation to identify the specimen when the specimen is similar to a reference pattern having a unique autocorrelation function; means for generating a second function of the specimen that is unique for all specimens that are similar to reference patterns that have a common autocorrelation function; means for comparing the second function of the specimen to second functions of the reference patterns; and means responsive to said maximum signal indicating means and said comparing means to identify the specimen when the specimen is similar to a reference pattern that does not have a unique autocorrelation function.

12. A specimen identification device comprising, in combination: means for generating the autocorrelation function of the specimen where at least one element of the autocorrelation function is generated serially; means for comparing the completely generated autocorrelation function of the specimen with functions dependent upon autocorrelation functions of reference patterns for identifying those specimens that are similar to reference patterns which have unique autocorrelation functions; means responsive to the generating means while at least one element of the autocorrelation function of the specimen is being generated to select data from the partially-generated function that is unique for all specimens that are similar to reference patterns having a common autocorrelation function; and means responsive to the comparing means and the selected data for identifying these specimens that are similar to reference patterns having common autocorrelation functions.

13. A specimen identification apparatus comprising, in combination: input means including a surface light scanning device and a light-sensitive device having an output $f(x,y)$ indicative of the specimen; means for generating an autocorrelation function $D_S(x',y')$ of the specimen indication $f(x,y)$ where at least one element of the function is generated serially; means for storing the elements of the normalized autocorrelation functions $Z_R(x',y')$ of reference patterns R; means for developing the sums $$\sum_{x',y'} D_S(x',y')Z_R(x',y')$$

of the point-by-point products of the autocorrelation function of the specimen and the normalized autocorrelation functions of the reference patterns; maximum signal indicating means for providing an indication of the largest of the sums to identify the specimen when the specimen is similar to a reference pattern having a unique autocorrelation function; means responsive to the generating means while at least one element of the autocorrelation function of the specimen is being generated to select data from the partially-generated function that is unique for all specimens that are similar to reference patterns that have a common autocorrelation function; and means responsive to said maximum signal indicating means and said selected data to identify the specimen when the specimen is similar to a reference pattern that does not have a unique autocorrelation function.

14. A specimen identification apparatus comprising, in combination: input means including a surface light scanning device and a light-sensitive device having an output $f(x,y)$ indicative of the specimen; means for generating an autocorrelation function $D_S(x',y')$ of the specimen indication $f(x,y)$ where at least one element of the function is generated serially; means for storing the elements of the normalized "second-difference" autocorrelation functions $Y_R(x',y')$ of reference patterns R; means for developing the sums $$\sum_{x',y'} D_S(x',y')Y_R(x',y')$$

of the point-by-point products of the autocorrelation function of the specimen and the normalized "second-difference" autocorrelation functions $Y_R(x',y')$ of reference patterns R; maximum signal indicating means providing an indication of the largest of the sums to identify the specimen when the specimen is similar to a reference pattern having a unique autocorrelation function; means responsive to the generating means while at least one element of the autocorrelation function of the specimen is being generated to select data from the partially-generated function that is unique for all specimens that are similar to reference patterns that have a common autocorrelation function; and mean responsive to said maximum signal indicating means and said selected data to identify the specimen when the specimen is similar to a reference pattern that does not have a unique autocorrelation function.

15. A specimen identification apparatus comprising, in combination: input means having an output $f(x,y)$ indicative of the specimen; means for generating an autocorrelation function $D_S(x',y')$ of the specimen indication $f(x,y)$; means for storing normalized autocorrelation functions $Z_R(x',y')$ of reference patterns R; means for developing the sums $$\sum_{x',y'} D_S(x',y')Z_R(x',y')$$

of the point-by-point products of the autocorrelation function of the specimen and the normalized autocorrelation functions of the reference patterns; maximum signal indicating means for providing an indication of the largest of the sums to identify the specimen when the specimen is similar to a reference pattern having a unique autocorrelation function; means for generating a second function of the specimen that is unique for all specimens that are similar to reference patterns that have a common autocorrelation function; means for comparing the second function of the specimen to second functions of the reference patterns; and means responsive to said maximum signal indicating means and said comparing means to identify the specimen when the specimen is similar to a reference pattern that does not have a unique autocorrelation function.

16. A specimen identification apparatus comprising, in combination: input means having an output $f(x,y)$ indicative of the specimen; means for generating an autocorrelation function $D_S(x',y')$ of the specimen indication $f(x,y)$; means for storing normalized "second-difference" autocorrelation functions $Y_R(x',y')$ of reference patterns R; means for developing the sums $$\sum_{x',y'} D_S(x',y')\,Y_R(x',y')$$

of the point-by-point products of the autocorrelation function of the specimen and the normalized "second-difference" autocorrelation functions $Y_R(x',y')$ of reference patterns R; maximum signal indicating means providing an indication of the largest of the sums to identify the specimen when the specimen is similar to a reference pattern having a unique autocorrelation function; means for generating a second function of the specimen that is unique for all specimens that are similar to reference patterns that have a common autocorrelation function; means for comparing the second function of the specimen to second functions of the reference patterns; and means responsive to said maximum signal indicating means and said comparing means to identify the specimen when the specimen is similar to a reference pattern that does not have a unique autocorrelation function.

17. A specimen identification apparatus comprising, in combination: input means having an output $f(x,y)$ indicative of the specimen; means for generating an autocorrelation function $D_S(x',y')$ of the specimen indication $f(x,y)$ where at least one element of the function is generated serially; means for storing the elements of the normalized autocorrelation functions $Z_R(x',y')$ of reference patterns R; means for developing the sums $$\sum_{x',y'} D_S(x',y')\,Z_R(x',y')$$

of the point-by-point products of the autocorrelation function of the specimen and the normalized autocorrelation functions of the reference patterns; maximum signal indicating means for providing an indication of the largest of the sums to identify the specimen when the specimen is similar to a reference pattern having a unique autocorrelation function; means responsive to the generating means while at least one element of the autocorrelation function of the specimen is being generated to select data from the partially-generated function that is unique for all specimens that are similar to reference patterns that have a common autocorrelation function; and means responsive to said maximum signal indicating means and said selected data to identify the specimen when the specimen is similar to a reference pattern that does not have a unique autocorrelation function.

18. A specimen identification apparatus comprising, in combination: input means having an output $f(x,y)$ indicative of the specimen; means for generating an autocorrelation function $D_S(x',y')$ of the specimen indication $f(x,y)$ where at least one element of the function is generated serially, means for storing the elements of the normalized "second-difference" autocorrelation functions $Y_R(x',y')$ of reference patterns R; means for developing the sums $$\sum_{x',y'} D_S(x',y')\,Y_R(x',y')$$

of the point-by-point products of the autocorrelation function of the specimen and the normalized "second-difference" autocorrelation functions $Y_R(x',y')$ of reference patterns R; maximum signal indicating means providing an indication of the largest of the sums to identify the specimen when the specimen is similar to a reference pattern having a unique autocorrelation function; means responsive to the generating means while at least one element of the autocorrelation function of the specimen is being generated to select data from the partially-generated function that is unique for all specimens that are similar to reference patterns that have a common autocorrelation function; and means responsive to said maximum signal indicating means and said selected data to identify the specimen when the specimen is similar to a reference pattern that does not have a unique autocorrelation function.

No references cited.